United States Patent
Dillon

(10) Patent No.: US 9,716,659 B2
(45) Date of Patent: Jul. 25, 2017

(54) SYSTEM AND METHOD FOR PROVIDING IMPROVED QUALITY OF SERVICE OVER BROADBAND NETWORKS

(71) Applicant: Hughes Newtwork Systems, LLC, Germantown, MD (US)

(72) Inventor: Douglas Dillon, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 685 days.

(21) Appl. No.: 13/962,883

(22) Filed: Aug. 8, 2013

(65) Prior Publication Data

US 2013/0322255 A1 Dec. 5, 2013

Related U.S. Application Data

(63) Continuation-in-part of application No. 13/428,323, filed on Mar. 23, 2012, now Pat. No. 9,240,950.
(Continued)

(51) Int. Cl.
*H04L 12/26* (2006.01)
*H04L 12/815* (2013.01)
(Continued)

(52) U.S. Cl.
CPC .......... *H04L 47/22* (2013.01); *H04L 41/5025* (2013.01); *H04L 43/0888* (2013.01); *H04L 43/10* (2013.01); *H04L 47/24* (2013.01)

(58) Field of Classification Search
CPC . H04L 47/10; H04L 12/4641; H04L 47/2441; H04L 47/805; H04L 67/322
See application file for complete search history.

(56) References Cited

U.S. PATENT DOCUMENTS 6,708,218 B1  3/2004  Ellington et al.
7,174,179 B2  2/2007  Krebs et al.
(Continued)

FOREIGN PATENT DOCUMENTS

EP   1772998 A2   4/2007

OTHER PUBLICATIONS

PCT/US13/54214 International Search Report and Written Opinion, Oct. 16, 2013.
(Continued)

*Primary Examiner* — Hong Cho
(74) *Attorney, Agent, or Firm* — Potomac Technology Law, LLC

(57) ABSTRACT

Systems and methods are provided for quality of service over broadband networks. A network device performs a probe transaction over a tunnel of a broadband network. Based on the probe transaction, parameters are determined reflecting tunnel performance, and, based on the parameters, target transmit and receive rates are determined for data communications over the tunnel. Based on the target transmit and receive rates, data communications to and from a first node of the network are regulated. When the tunnel comprises a peered tunnel, the regulation of received data communications comprises performing a set rate transaction with a peer second node of the network (the set rate transaction establishes a rate for data transmitted over the tunnel by the peer second node to the first node). When the tunnel comprises a peerless tunnel, the regulation of received data communications comprises shaping data traffic received by the first node over the tunnel.

18 Claims, 18 Drawing Sheets

Related U.S. Application Data

(60) Provisional application No. 61/680,959, filed on Aug. 8, 2012, provisional application No. 61/466,794, filed on Mar. 23, 2011.

(51) Int. Cl.
*H04L 12/851* (2013.01)
*H04L 12/24* (2006.01)

(56) References Cited

U.S. PATENT DOCUMENTS

| | | |
|---|---|---|
| 7,305,464 B2 | 12/2007 | Phillipi et al. |
| 7,493,383 B1 | 2/2009 | Mukerji |
| 7,573,821 B2 | 8/2009 | Chilukoor et al. |
| 7,616,585 B1 | 11/2009 | Kritov et al. |
| 7,778,176 B2 | 8/2010 | Morford |
| 7,925,281 B2 | 4/2011 | Cahn |
| 7,940,685 B1 | 5/2011 | Breslau et al. |
| 7,983,239 B1 | 7/2011 | Weinstein et al. |
| 8,239,570 B2 | 8/2012 | Beeston et al. |
| 2002/0009072 A1 | 1/2002 | Halme |
| 2002/0116501 A1 | 8/2002 | Ho et al. |
| 2005/0025090 A1 | 2/2005 | Klein et al. |
| 2006/0114875 A1 | 6/2006 | Wu et al. |
| 2008/0049753 A1* | 2/2008 | Heinze ............... H04L 12/5695 370/392 |
| 2008/0181108 A1 | 7/2008 | Hashmi et al. |
| 2009/0199290 A1 | 8/2009 | McCullough et al. |
| 2009/0216880 A1 | 8/2009 | Lepeska |
| 2010/0027545 A1 | 2/2010 | Gomes et al. |
| 2010/0118886 A1 | 5/2010 | Saavedra |
| 2010/0232294 A1 | 9/2010 | Samuels et al. |
| 2011/0231546 A1 | 9/2011 | Nathanson |
| 2012/0078994 A1 | 3/2012 | Jackowski et al. |
| 2012/0110152 A1* | 5/2012 | Wing ............... H04L 12/4633 709/223 |
| 2013/0322255 A1 | 12/2013 | Dillon |

OTHER PUBLICATIONS

USPTO, "International Search Report & Written Opinion", PCT App. No. PCT/US2014/050257, Nov. 18, 2014.

* cited by examiner

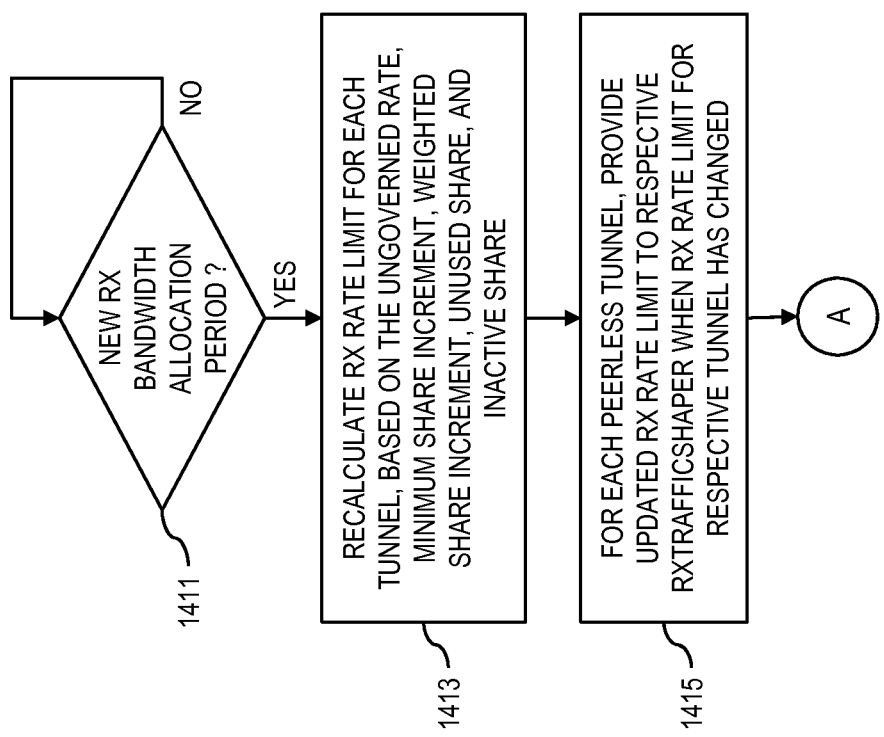

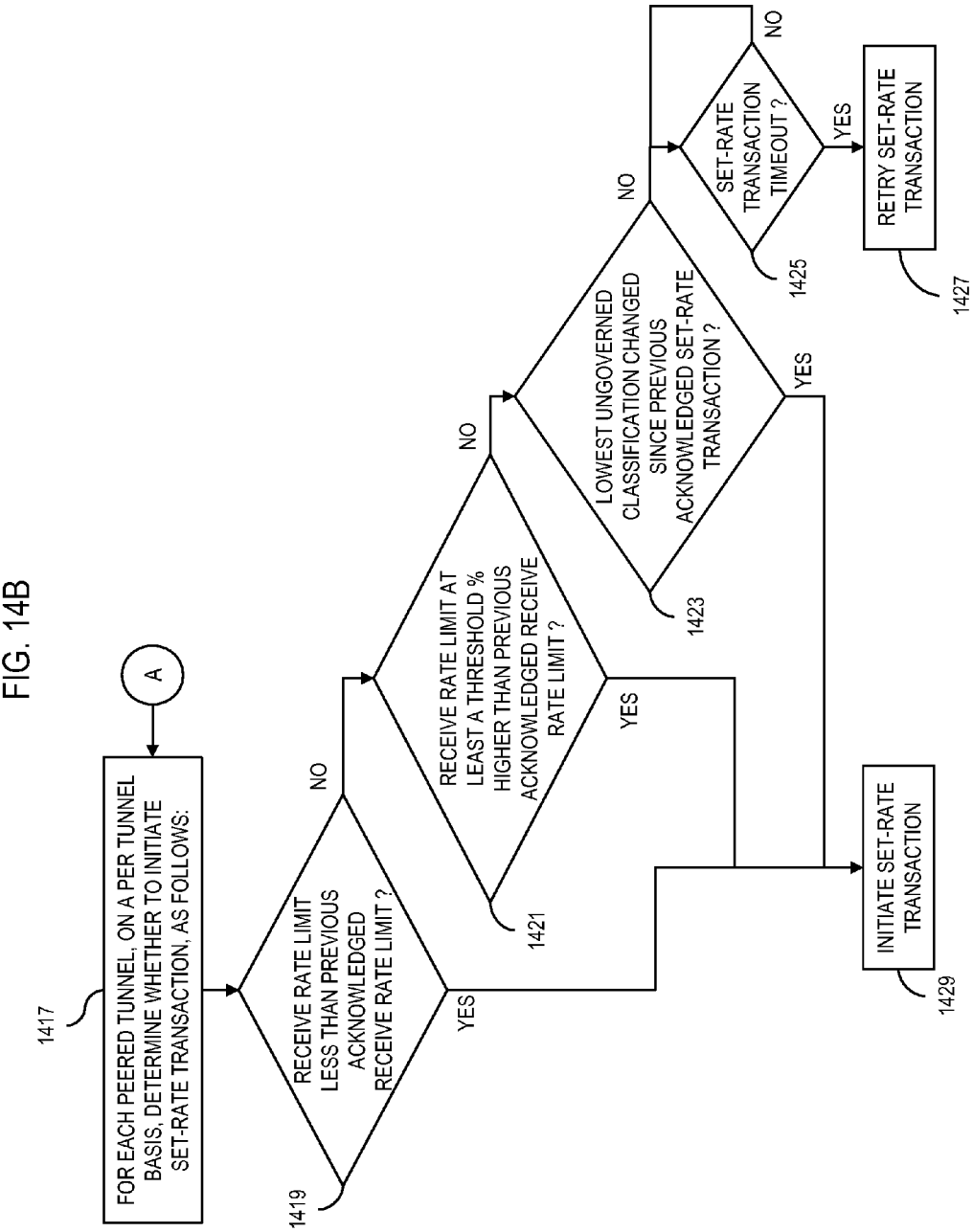

SYSTEM AND METHOD FOR PROVIDING IMPROVED QUALITY OF SERVICE OVER BROADBAND NETWORKS

RELATED APPLICATIONS

This application (1) is a Continuation-In-Part (CIP) of co-pending U.S. patent application Ser. No. 13/428,323 (filed Mar. 23, 2012) (hereinafter referred to as "the '323 application), which claims priority under 35 U.S.C. §119 based on U.S. Provisional Application Ser. No. 61/466,794, filed Mar. 23, 2011, the disclosures of which are incorporated herein by reference in their entireties; and (2) claims priority under 35 U.S.C. §119 based on U.S. Provisional Application Ser. No. 61/680,959 (filed Aug. 8, 2012).

BACKGROUND

Over a broadband network, such as a private enterprise broadband network or a public broadband network (e.g., the Internet), various kinds of traffic are processed with varying quality of service requirements. Such varying quality of service requirements in turn drive traffic prioritization requirements to ensure that data for applications requiring a higher quality of service receive priority treatment in order to deliver a certain minimum level of performance to the data flow. For example, a required bit rate, delay, jitter, packet dropping probability and/or bit error rate may be necessary for an application to operate at an acceptable performance level. This is especially true for real-time streaming applications, such as voice over IP, on-line gaming and IP-television applications, which typically require a fixed bit rate and are delay sensitive. Depending on the type of network, however, delivering the necessary quality of service requirements poses significant challenges.

In high performance broadband communications networks certain protocols or services can be offered that support the quality of service requirements of high priority, real-time traffic applications. For example, multiprotocol label switching (MPLS) is a current service offering in such high performance networks (e.g., in T1/E1, ATM Frame Relay and DSL networks), which supports quality of service requirements of such applications. MPLS directs data from one network node to the next based on short path labels, rather than long network addresses (e.g., the Internet), avoiding complex lookups in routing tables. MPLS services generally are significantly more expensive than the more typical consumer and small business Internet services, and thus can be cost prohibitive. Alternatively, constant or guaranteed minimum bit rate services are also available, and can solve quality of service requirements of real-time applications, but such services are similarly cost prohibitive.

The general protocols of the Internet, on the other hand, provide for more affordable broadband communications services, but are far less reliable. Unlike single-owner networks, the Internet is a series of exchange points interconnecting private networks, owned and managed by a number of different network service providers, and thus the behavior of the Internet is unpredictable. Further, conventional Internet routers and local area network (LAN) switches operate on a best effort basis, which generally does not support quality of service. Under a best effort delivery service, the network does not provide any guarantees for timing and order of data packet delivery, or any guarantees of data packet delivery at all—and thus do not generally provide any guaranteed quality of service or priority levels. In a best effort network, generally, all users obtain best effort service, meaning that they obtain unspecified variable bit rate and delivery time, depending on the current traffic load. The lack of reliability permits various error conditions, such as data corruption, packet loss and duplication, as well as out-of-order packet delivery. Since routing is dynamic for every packet and the network maintains no state of the path of prior packets, it is possible that some packets are routed on a longer path to their destination, resulting in improper sequencing at the receiver. Such networks, therefore, are generally unreliable for real-time applications, such as voice over IP.

In packet-switched networks (such as the Internet), quality of service is affected by various factors, such as: (1) low throughput, whereby, due to varying load from other users sharing the same network resources (e.g., congestion), the bit rate provided to a certain data stream may be too low if all data streams get the same scheduling priority; (2) dropped packets, whereby a router may fail to deliver packets (e.g., where the packet is corrupted or the routers buffers are full); (3) bit errors, whereby a packet may be corrupted by noise or interference; (4) latency, whereby a packet is delayed in reaching its destination (e.g., based on long queues or long routes due to congestion); (5) jitter, whereby packets from one source/application reach the destination with different delays, which delays can vary unpredictably and cause jitter; and (6) out-of-order packet delivery, whereby related packets from a single source/application are routed through a network over different paths and thus experience differing levels of delay resulting in the packets arriving at the destination in a different order from which they were sent (which requires special additional protocols responsible for rearranging out-of-order packets).

Further, a typical broadband connection communicates with a public network (e.g., the Internet) through an access network. The access network typically has a central office with DSL service that communicates data traffic, including voice traffic, having a digital subscriber line (DSL) access multiplexer (DSLAM). From the DSLAM the communications network, such as a broadband network, typically can fan out, such as over the described last-mile link, with twisted pairs to a DSL modem. Also, for example the communications network from the DSL modem can go to a router, such as a virtual private network (VPN) router, and to various devices communicating with the router. Additionally, the communications network can communicate with a host (e.g., over the Internet), which can communicate with a VPN gateway which can communicate with a data center. In the communications network, therefore, devices communicating with the VPN router can also communicate securely with devices associated with the data center.

With such broadband connections, however, congestion in the data flow likely can occur, such as at the router or the gateway, for example. One approach for dealing with significant congestion is to perform what is typically referred to as a random early drop, which is a dropping of data packets as a way of dealing with congestion. However, dropping of data packets, while possibly relieving congestion, typically can affect the quality of service for data transmission and reception. Thus, in a traditional approach, where congestion occurs in a communications network (e.g., over the Internet), latency in reception or transmission, while present, is typically resolved by the random early drop of data packets. For example, therefore, given that there is a limited throughput, when congestion occurs, sending data traffic in a downstream direction (e.g., from the Internet), to the DSLAM, the data traffic will typically back up in the DSLAM. Similarly, for example, as to congestion occurring resulting from sending data traffic in an upstream direction, such as from devices to the DSL modem, the data traffic will typically back up in the DSL modem. When the data traffic backs up, the data traffic typically is routed to a queue, and when the latency is relatively significant, the queue will typically overflow this queue and typically the result is the dropping of data packets.

What is needed, therefore, is an approach that achieves improved network performance (e.g., latency, jitter, throughput) through ordinary-grade (e.g., consumer-grade) broadband connections over conventional broadband networks, facilitating support of application-level quality of service traffic requirements (e.g., traffic requirements of real-time service applications, such as voice-over-IP (VOIP) services) through such ordinary-grade broadband connections over conventional broadband networks.

SOME EXAMPLE EMBODIMENTS

The present invention advantageously addresses the needs above, as well as other needs, by providing systems and methods that achieve improved network performance (e.g., latency, jitter, throughput) through ordinary-grade (e.g., consumer-grade) broadband connections over conventional broadband networks, facilitating support of application-level quality of service traffic requirements (e.g., traffic requirements of real-time service applications, such as voice-over-IP (VOIP) services) through such ordinary-grade broadband connections over conventional broadband networks. By way of example, systems and methods provide a relatively high level of quality of service (e.g., at MPLS or near MPLS service levels) over conventional DSL connections (e.g., consumer DSL services), such as to enhance application response-time performance and the ability to carry VOIP with good voice quality across conventional broadband connections. Further, embodiments of the present invention support peerless operation, which allows for active quality of service (QOS) management of data traffic over ordinary-grade broadband connections over conventional broadband networks (including split-tunnel connections—defined below), where traffic moves from servers on a public network (e.g., the Internet) down the broadband connection without being governed by any peer intermediary between the broadband connection and the public network. Additionally, embodiments of the present invention support multiple tunnels (e.g., separate streams of traffic), which share a broadband connection and provide prioritization within each stream. A typical example of multiple tunnels is a single IPSEC tunnel (which is peered), and a split-tunnel (which is peerless). Moreover, embodiments of the present invention provide for an IP-Flow based classifier (generally not requiring any configuration), which automatically classifies (and reclassifies as needed) end-user traffic to provide real-time treatment (as required), and to appropriately classify other applications (e.g., as Light-Interactive, Heavy-Interactive and Bulk-Transfer).

More specifically, embodiments of the present invention provide for automatic and dynamic measurement and adjustment of available capacity of a broadband connection. By way of example, embodiments of the present invention provide for the adjustment of data transmit rates across a broadband connection, adjustment of the transmission rate of a peer device via a VPN tunnel (e.g., an IPSEC tunnel) across a broadband connection, and performance of traffic shaping of received broadband traffic (e.g., broadband traffic received from the Internet via a peerless split tunnel). Further embodiments of the present invention provide for the determination of target and actual receive data rates for received broadband traffic (e.g., broadband traffic received from the Internet via a peerless split tunnel), and regulation of the rate of establishing network connections over one or more tunnels of a broadband network connection (e.g., new TCP connections generated based on web page links contained within an Internet site), based on the determined target receive data rate, for controlling traffic flow across the broadband connection. By way of example, such embodiments may regulate the rate of the establishment of such new network connections by means of the queuing of SYN packets, and controlling the release of the SYN packets from the Queue in order to maintain a desired rate for establishment of the data connections, in accordance with the determined target receive data rate. Further embodiments of the present invention provide for the control of TCP window sizes, and packet tossing (dropping of TCP packets), to regulate the receive data rates for received broadband traffic over a peerless tunnel. Accordingly, systems and methods are provided that enable application quality of service (e.g., latency, jitter, throughput) to be shaped across ordinary broadband networks, even those with dynamically changing available network capacity.

According to embodiments of the present invention, by way of example, a method comprises performing, by a first network device at a first node of a broadband network, a probe transaction over a tunnel within the broadband network. Based on the probe transaction, one or more parameters reflecting performance of data communications over the tunnel are determined. Based on one or more of the determined parameters, a target transmit rate and a target receive rate for the data communications over the tunnel are determined. Based on the target transmit rate, the rate of data communications transmitted over the tunnel from the first node are regulated, and, based on the target receive rate, the rate of data communications received over the tunnel by the first node are regulated. The tunnel comprises one of a peered tunnel and a peerless tunnel, wherein (1) the peered tunnel is configured for data communications between the first node and a peer second node of the broadband network, and (2) the peerless tunnel is configured for data communications between the first node and a non-peer second node. When the tunnel comprises the peered tunnel, the regulation of the rate of data communications received over the tunnel by the first node comprises performing a set rate transaction with the peer second node, wherein the set rate transaction establishes a rate for data communications transmitted over the tunnel by the peer second node to the first node. When the tunnel comprises the peerless tunnel, the regulation of the rate of data communications received over the tunnel by the first node comprises shaping data communications traffic received over the tunnel.

By way of further example, the probe transaction may be performed on a periodic basis for continued monitoring of data communications performance over the tunnel, and the parameters determined based on the probe transaction may comprise a measured one-way network latency in a transmit direction over the tunnel. In that context, the method further comprises, decreasing the target transmit rate when the measured one-way transmit latency parameter indicates that extra latency exceeds a predetermined threshold, and increasing the target transmit rate when offered data traffic exceeds the current target transmit rate. Further, the parameters determined based on the probe transaction may comprise a measured one-way network latency in a receive direction over the tunnel, and, in that context, the method further comprises decreasing the target receive rate when the measured one-way receive latency parameter indicates that extra latency exceeds a predetermined threshold, and increasing the target receive rate when offered data traffic exceeds the current target receive rate.

By way of further example, the shaping of data communications traffic received over the tunnel may be accomplished by one or more of insertion of extra target latency, adjustment of window sizing, control of new connection establishment, and packet dropping—wherein the adjustment of window sizing comprises actively controlling receive window sizes for transmission of data by remote hosts over the peerless tunnel to regulate throughput for the data communications received over the peerless tunnel; the control of new connection establishment comprises actively controlling the establishment of parallel connections via which remote hosts transmit data over the peerless tunnel to regulate throughput for the data communications received over the peerless tunnel; and the packet dropping comprises a systematic dropping of packets received from a respective host to signal the host to adjust its associated transmit rate. Further, when the tunnel comprises the peerless tunnel, the probe transaction may be performed on a periodic basis for continued monitoring of data communications performance over the peerless tunnel, and the parameters determined based on the probe transaction may comprise a measured one-way network latency in a receive direction over the peerless tunnel. In that context, the method further comprises: determining, based on the measured one-way network latency in the receive direction, the target receive rate for data communications over the peerless tunnel; controlling new connection establishment, and determining and setting receive window sizing, for data communications traffic being transmitted by one or more remote hosts over the peerless tunnel, based on the determined target receive rate for data communications over the peerless tunnel; determining whether an offered traffic load for transmission over the peerless tunnel by the one or more remote hosts exceeds the determined target receive rate for data communications over the peerless tunnel; and when the offered traffic load exceeds the determined target receive rate, increasing the target receive rate for data communications over the peerless tunnel, and adjusting the control of new connection establishment and the receive window sizing, for the data communications traffic being transmitted by the one or more remote hosts over the peerless tunnel, based on the increased target receive rate for data communications over the peerless tunnel.

According to further embodiments of the present invention, by way of example, an apparatus comprises at least one processor, and at least one memory including computer program code for one or more programs, the at least one memory and the computer program code configured to, with the at least one processor, cause the apparatus to perform at least the following functions. The apparatus performs a probe transaction over a tunnel within a broadband network. Further, based on the probe transaction, the apparatus determines one or more parameters reflecting performance of data communications over the tunnel, and, based on one or more of the determined parameters, the apparatus determines a target transmit rate and a target receive rate for the data communications over the tunnel. Based on the target transmit rate, the apparatus regulates the rate of data communications transmitted over the tunnel from a first node of the broadband network, and, based on the target receive rate, the apparatus regulates the rate of data communications received over the tunnel by the first node. Wherein the tunnel comprises one of a peered tunnel and a peerless tunnel, wherein (1) the peered tunnel is configured for data communications between the first node and a peer second node, and (2) the peerless tunnel is configured for data communications between the first node and a non-peer second node. When the tunnel comprises the peered tunnel, the regulation of the rate of data communications received over the tunnel by the first node comprises performing a set rate transaction with the peer second node, wherein the set rate transaction establishes a rate for data communications transmitted over the tunnel by the peer second node to the first node. When the tunnel comprises the peerless tunnel, the regulation of the rate of data communications received over the tunnel by the first node comprises shaping data communications traffic received over the tunnel.

By way of further example, the probe transaction may be performed on a periodic basis for continued monitoring of data communications performance over the tunnel, and the parameters determined based on the probe transaction may comprise a measured one-way network latency in a transmit direction over the tunnel. In that context, the apparatus is caused to further perform the following: decreasing the target transmit rate when the measured one-way transmit latency parameter indicates that extra latency exceeds a predetermined threshold, and increasing the target transmit rate when offered data traffic exceeds the current target transmit rate. Further, the parameters determined based on the probe transaction may comprise a measured one-way network latency in a receive direction over the tunnel, and, in that context, the apparatus is caused to further perform the following: decreasing the target receive rate when the measured one-way receive latency parameter indicates that extra latency exceeds a predetermined threshold, and increasing the target receive rate when offered data traffic exceeds the current target receive rate.

By way of further example, the shaping of data communications traffic received over the tunnel may be accomplished by one or more of insertion of extra target latency, adjustment of window sizing, control of new connection establishment, and packet dropping—wherein the adjustment of window sizing comprises actively controlling receive window sizes for transmission of data by remote hosts over the peerless tunnel, to regulate throughput for the data communications received over the peerless tunnel; the control of new connection establishment comprises actively controlling the establishment of parallel connections via which remote hosts transmit data over the peerless tunnel, to regulate throughput for the data communications received over the peerless tunnel; and the packet dropping comprises a systematic dropping of packets received from a respective host to signal the host to adjust its associated transmit rate. Further, when the tunnel comprises the peerless tunnel, the probe transaction may be performed on a periodic basis for continued monitoring of data communications performance over the peerless tunnel, and the parameters determined based on the probe transaction may comprise a measured one-way network latency in a receive direction over the peerless tunnel. In that context, the apparatus is caused to further perform the following: determining, based on the measured one-way network latency in the receive direction, the target receive rate for data communications over the peerless tunnel; controlling new connection establishment, and determining and setting receive window sizing, for data communications traffic being transmitted by one or more remote hosts over the peerless tunnel, based on the determined target receive rate for data communications over the peerless tunnel; determining whether an offered traffic load for transmission over the peerless tunnel by the one or more remote hosts exceeds the determined target receive rate for data communications over the peerless tunnel; and when the offered traffic load exceeds the determined target receive rate, increasing the target receive rate for data communications over the peerless tunnel, and adjusting the control of new connection establishment and the receive window sizing, for the data communications traffic being transmitted by the one or more remote hosts over the peerless tunnel, based on the increased target receive rate for data communications over the peerless tunnel.

Still other aspects, features, and advantages of the invention are readily apparent from the following detailed description and accompanying drawings, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 14A and 14B illustrate a flow chart depicting a receive bandwidth allocation process, in accordance with example embodiments.

DETAILED DESCRIPTION

Systems and methods for providing active quality of service (QOS) for application data transmissions over conventional broadband networks, based upon determined latency parameters, are disclosed. The determined latency parameters are used to determine target or adjusted transmit and receive rates for controlling traffic flow (e.g., based on the latency parameters), such as for dynamically adjusting the traffic rates across a broadband network connection (e.g., received traffic flow for broadband traffic received via peered and/or peerless tunnels over the network connection). The latency parameters may also or alternatively be used for regulating the rate of new network connections, such as for the control of traffic flow for received traffic over the broadband network connection (e.g., broadband traffic received via a peerless tunnel over the network connection, such as a split tunnel to a public network, such as the Internet). In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
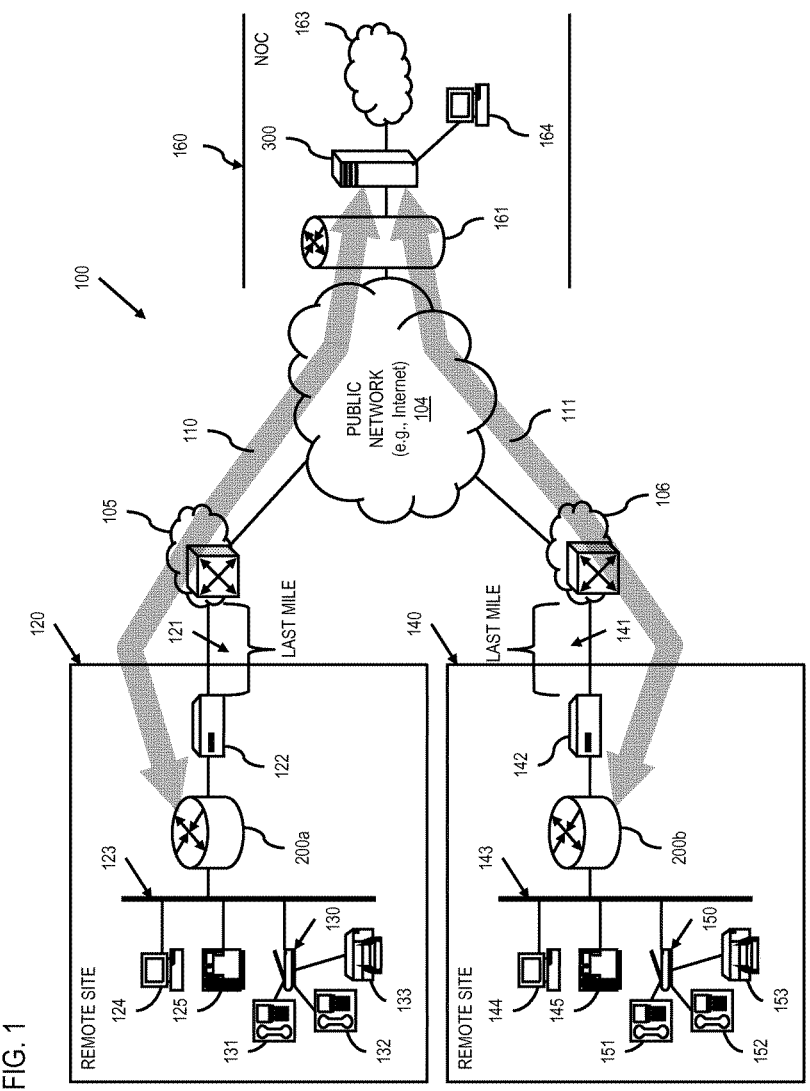
FIG. 1 illustrates a virtual private network system, in accordance with example embodiments.

FIG. 1 illustrates a virtual private network (VPN) system, in accordance with example embodiments. Virtual Private Networks (VPNs) are frequently used to connect an enterprise network to one or more remote sites. A VPN permits the establishment of an encrypted data connection between a central site and remote sites using a public network (e.g., the Internet) as an intermediary data link. A VPN allows devices within a remote site to seamlessly interact with devices in the central site or another remote site, as if they were locally situated. A VPN router is used to establish such a connection between a network at the remote site, and the central site, by providing secure broadband access to the end-users over a terrestrial broadband network. The VPN router traditionally connects to a VPN gateway at a Network Operations Center (NOC) through a third party Network Access Provider (NAP) network via a modem such as Digital Subscriber Line (DSL), T1, wireless, cable, etc. The type of modem, a component-off-the-shelf (COTS) device, installed at the remote site depends on, e.g., the customer requirements, cost, and service availability from various vendors in different geographical regions.

A service plan (e.g., DSL service plan) offered at the last mile of each enterprise site (i.e., the link connecting a DSL modem to a DSL Access Multiplexer (DSLAM)) can vary even within a single customer network, or even for a single site over time, say, due to modem retraining. For example, a customer network could have three service plans deployed in the network with different downlink/uplink speeds, such as (1.5 Mbps/384 Kbps), (1.5 Mbps/128 Kbps), or (768 Kbps/128 Kbps), for different remote sites in the customer network. Downlink/downstream refers to a transmission direction from the VPN gateway/DSLAM to the VPN router. Uplink/upstream refers to the transmission direction from the VPN router to the DSLAM/VPN gateway. This variation in the offered service plans is due to varying circuit characteristics, and the pricing from different DSL vendors in different geographical regions. To avoid over-driving a last-mile link, the effective throughput limits in each transmission direction must be established and obeyed. Otherwise, the overloaded last-mile link will cause increased latency and/or packet loss.

End-user traffic typically consists of: (1) real-time traffic such as voice, (2) interactive traffic such as web browsing and Point-Of-Sale (POS) transactions, and (3) bulk traffic such as FTP. When a VPN peer is given a mix of all types of traffic, real-time traffic gets the most preferential treatment followed by the interactive traffic. In order to provide QOS in such a system, it is well known to those skilled in the art that traffic needs to be classified and prioritized. However, since the last mile in a dedicated local loop network such as DSL operates at significantly lower link speeds compared to the rest of the network, it is important for VPN routers to limit the data throughput in order to ensure that uplink throughput does not exceed the uplink speed of the modem. Otherwise, data would pile up in a first-in-first-out (FIFO) fashion in VPN routers, causing increased latency for all packets and, if persistent, causing buffer overflows and packet losses. The net effect would be poor QOS despite the traffic classification and prioritization.

Since the real-time and interactive traffic is bidirectional, it therefore becomes equally important to limit the per-site throughput at the VPN gateway in the downlink direction to ensure that downlink throughput does not exceed the downlink speed at the last mile for the particular site. Otherwise, data would pile up in the DSLAM causing similar increased latency and, if persistent, packet loss. In summary, an end-to-end throughput limit configuration setup that matches the last mile link speeds is essential to guarantee QOS. However, since the last-mile link speeds are site-specific and time-varying, a priori throughput limit configuration at a VPN router, and at a VPN gateway, to match uplink and downlink speed of each remote site, respectively, is not practical in a large enterprise network. Typically, the throughput limits for a VPN router and a VPN gateway, if set, are set to default one-size-fits-all values to match the maximum available link speeds in the network. However, this approach can present problems. For example, a default per-site setting can be employed where the downlink throughput limit is set to 1.5 Mbps at the VPN gateway and the uplink throughput limit is set to 384 Kbps at the VPN router. In this case, a DSL modem having only a 768 Kbps downlink limit and a 128 Kbps uplink limit could be overdriven.

Therefore, one effect of congestion in data packet flow is initially not packet loss but is a change in the latency. And a significant consideration as to improving quality of service is that congestion typically results in packet loss. And another consideration is what an individual network user does as to data packet flow, such as a user on a broadband network, is usually not significant enough to drive the network into congestion. For example, assume the data flow that be accommodated at a time, such as by a modem in a network is 50,000 bytes, which is typical for a broadband network, and the transmit rate or the receive rate is 1.6 megabits per second, which is approximately 200K bytes per second. As such, when the queue fills up, such as at 250 milliseconds, for example, there will be 250 milliseconds of delay, and beyond that amount of delay the queue will overflow, resulting in data packets being dropped and being thrown away. Lower amounts of delay, for example, such as in the 30 millisecond range, can cause some fluctuations, such as jitter, but typically do not result in significant packet loss. One approach to addressing packet loss is to configure the speed or rate of the router to a set rate, so that the router will typically not process data packets faster than the configured speed, the rate typically being set in view of the storage capacity of an associated queue. However, such method can be limited in its ability to dynamically adjust to changes in flow rate, as well as be limited in dealing with priority levels of data packets.

Further, an advantageous method and apparatus of enhancing quality of service as to reducing packet loss and promoting priority traffic flow is described in the '323 application. In such system and method, for example, rather than configuring the rate or speed of the router to a set rate, the rate is read to dynamically set the rate to enhance quality of service. For example, the VPN router asks the DSL modem how fast it is going, and the DSL modem tells the VPN router its rate, and then the VPN router tells the VPN gateway how fast to go, so as to reduce the likelihood of overflowing the queue and to enhance control the data flow, to enable the data packets in the traffic flow to have a substantially consistent latency. Further, such a system and method, of reading the rate (as described in the '323 application) can enable a VPN router to query its DSL modem periodically for its link speeds and use the learned uplink speed to limit the throughput in the uplink direction, in combination with a system and method to convey the learned downlink speed to a VPN gateway to limit the throughput for each site in the downlink direction to match its downlink speed. Therefore, reading the rate works effectively and efficiently to dynamically adjust the rate of traffic flow with DSL modems that can advise the router of its rate.

In view of the foregoing, in a broadband VPN network, for example, the speed of the links after the last mile (i.e., backbone links) typically are so much faster than the speed of an individual broadband connection speed that: (1) responding to congestion in the backbone of the network by a single remote site does not materially change the congestion; and (2) congestion in the backbone of the network is primarily experienced as packet loss and not by significant changes in latency. As such, taking steps to respond to congestion is important as to enhancing quality of service, for network connections, such as broadband connections.

With reference to FIG. 1, the VPN system 100 includes a Network Operations Center (NOC) 160 and one or more remote sites. For the purpose of illustration, FIG. 1 depicts two remote sites 120 and 140. However, it will be appreciated that VPN system 100 can be configured with a single remote site or with more than two remote sites. The NOC 160 includes a router 161, a VPN gateway 300, an enterprise network 163, and a network manager apparatus 164. Router 161 routes data between the public network 104 (e.g., the Internet) and VPN gateway 300, which in turn, provides VPN access to enterprise network 163. The network manager apparatus 164 is connected to VPN gateway 300 via a management interface (e.g., dedicated network interface), and configures and monitors VPN routers 200a and 200b, and VPN gateway 300, as will be later described.

The remote site 120 includes a VPN router 200a, a Digital Subscriber Line (DSL) modem 122, and a local area network (LAN) 123. The LAN 123 interconnects VPN router 200a with various devices, such as a computer 124, a Point of Sale (POS) transaction machine 125, and an Analog Telephone Adapter (ATA) 130. The ATA 130 is a component that provides Voice over IP (VoIP) services with the enterprise network 163 (i.e., between remote site 120 and enterprise network 163). The ATA 130 allows connectivity of phone-related components, such as telephones 131 and 132, a fax machine 133, or any other components which connect over a phone line.

The DSL modem 122 provides connectivity between VPN router 200a and a Network Access Provider (NAP) network 105. The NAP network 105 includes various components, for example, a DSL Access Multiplexer (DSLAM), for connecting remote site 120 to the public network 104. DSL modem 122 is connected with NAP network 105 over a data link 121, which is commonly referred to as the last-mile link between NOC 160 and remote site 120. That is, in a DSL connection, the last-mile link is the link connecting the DSL modem to the DSLAM. In this case, last-mile link 121 is a 1.5 Mbps downlink, 384 Kbps uplink connection.

Thus, a tunnel 110 (e.g., an Internet Protocol Security (IPSEC) tunnel) is formed between NOC 160 and remote site 120, using the data connections therebetween. That is, data transmissions from remote site 120 to NOC 160 are encapsulated into IPSEC packets by VPN router 200a. The IPSEC packets are sent over the public network 104 and received by VPN gateway 300 at NOC 160, which de-encapsulates the IPSEC packets to obtain the data transmission. At the same time, data transmissions from NOC 160 to remote site 120 are also encapsulated into IPSEC packets, by VPN gateway 300. The IPSEC packets are sent over the public network 104 and received by VPN router 200a, which de-encapsulates the IPSEC packets to obtain the data transmission.

The remote site 140 includes a VPN router 200b, DSL modem 142, and a LAN 143. The LAN interconnects VPN router 200b with various devices, such as a computer 144, a POS transaction machine 145, and an ATA 150. The ATA 150 allows connectivity of phone-related components, such as telephones 151 and 152, a fax machine 153, or any other components which connect over a phone line. The DSL modem 142 provides connectivity between VPN router 200b and a NAP network 106. The NAP network 106 contains various components, for example, a DSLAM, for connecting remote site 140 to the public network 104. The DSL modem 142 can be connected with NAP network 106 over a data link 141, which is referred to as the last-mile link between NOC 160 and remote site 140. In this case, last-mile link 141 is a 768 Kbps downlink, 128 Kbps uplink connection. Thus, a tunnel 111 (e.g., an Internet Protocol Security (IPSEC) tunnel) is formed between NOC 160 and remote site 140, using the data connections therebetween.

The packets sent over tunnels 110 and 111 can be configured as standard Internet protocol (IP) packets according to a transmission control protocol (TCP) or a user datagram protocol (UDP). Additionally, according to example embodiments, the system 100 may incorporate a TCP Performance Enhancement Proxy (PEP). By way of example, the VPN routers 200a, 200b and the VPN gateway 300 may employ a TCP PEP that utilizes an optimized backbone protocol, referred to as the Terrestrial-Broadband Backbone Protocol (TBP), to carry TCP traffic across the terrestrial broadband network. The TBP automatically measures and adjusts to available capacity providing performance gains over native TCP across such DSL, EVDO, T1 and other networks (e.g., when operating over networks where there is congestion in the network beyond the last mile). TBP more effectively recovers from packet loss than native TCP. The enhanced PEP solution has TCP connections run with a maximum segment size (MSS) that can be efficiently carried by the underlying transport and which avoids packet fragmentation. When compared with native TCP, TBP makes TCP traffic operate with more consistent, and with better performance across broadband networks with congested last, middle and/or public network (e.g., Internet) hops.

Figure 2:
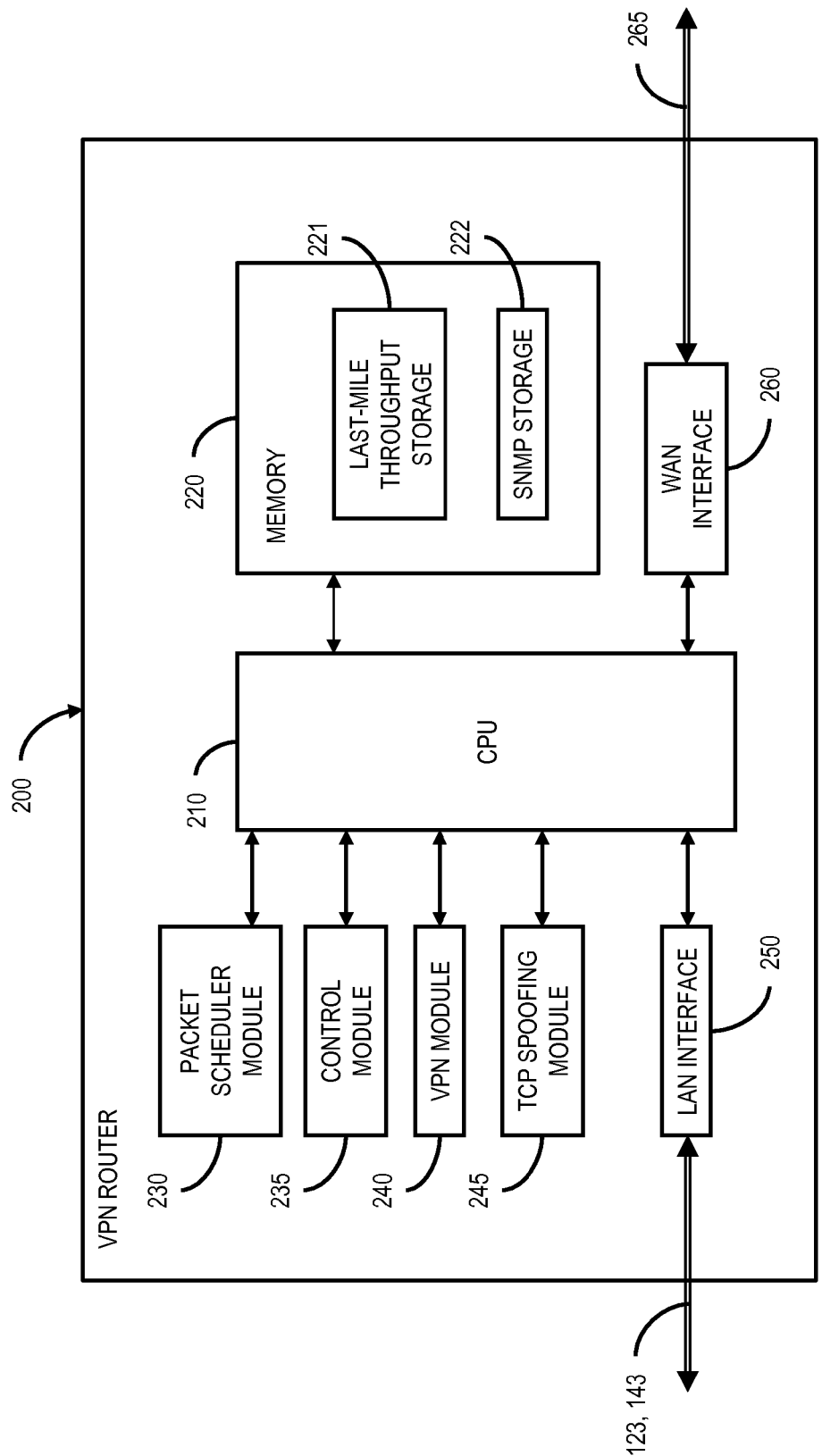
FIG. 2 illustrates a virtual private network router, in accordance with various example embodiments.

FIG. 2 illustrates a VPN router, such as the VPN routers 200a and 200b of the remote sites 120 and 140 (as depicted in FIG. 1). The VPN router 200 includes a CPU 210 and a memory 220. The memory 220 can include both flash memory and RAM, but can alternatively or additionally include other data storage such as ROM or hard disk. In certain embodiments, the memory 220 can include last-mile throughput storage 221 and SNMP storage 222. The last-mile throughput storage 221 can be utilized for storing the throughput characteristics of DSL modem 122, 142 and the calculated throughput limits of corresponding VPN router 200 and SNMP storage 222 is for storing SNMP content. The SNMP storage 222 can stores status/statistics information relating to polled SNMP variables of devices attached via LAN interface (e.g., ATA) or WAN interface (e.g., DSL modem 122, 142), which are periodically monitored by VPN router 200.

The VPN router 200 can also include a LAN interface 250 and a wide area network (WAN) interface 260. The LAN interface 250 is connected to the LAN 123, 143, such as an Ethernet network. As discussed above, the LAN 123, 143 is attached to networked devices including computer 124, 144, POS transaction machine 125, 145, and ATA 130, 150. However, it is appreciated that networked devices are not limited to such, but can also include, printers, scanners, copiers, VoIP devices, or any other network-enabled electronic device. These devices send and receive data over LAN 123, 143. Alternatively, it will be understood that any form of data connectivity other than a LAN can be used, as long as data is transferred between VPN routers 200a, 200b and the devices. The WAN interface 260 is connected to a data link 265, which connects VPN routers 200a, 200b with DSL modems 122, 142, respectively, as depicted in FIG. 1.

The VPN router 200 further includes a packet scheduler module 230, a control module 235, a VPN module 240 and a TCP spoofing module 245. The packet scheduler module 230 shapes outgoing traffic to be sent by VPN router 200, to optimize the uplink throughput over last-mile link 121, 141. These data packets are packets destined for the enterprise network 163, primarily sent by devices on LAN 123, 143.

The control module 235 controls the operation of VPN router 200, including various calculations such as the calculation or determination of throughput speed(s). VPN module 240 performs VPN functions according to, e.g., the IPSEC protocol. That is, VPN module 240 encapsulates and encrypts outgoing VPN packets, which are ultimately sent from VPN router 200 to VPN gateway 300 using WAN interface 260, and de-encapsulates and decrypts incoming VPN packets received from VPN gateway 300 by VPN router 200 using WAN interface 260. The TCP spoofing module 245 handles the TCP spoofing protocols. In various embodiments, the control module 235 carries out all functions performed by the VPN router 200. In further embodiments, other modules could be incorporated to carry out functions performed by the VPN router 200.

Figure 3:
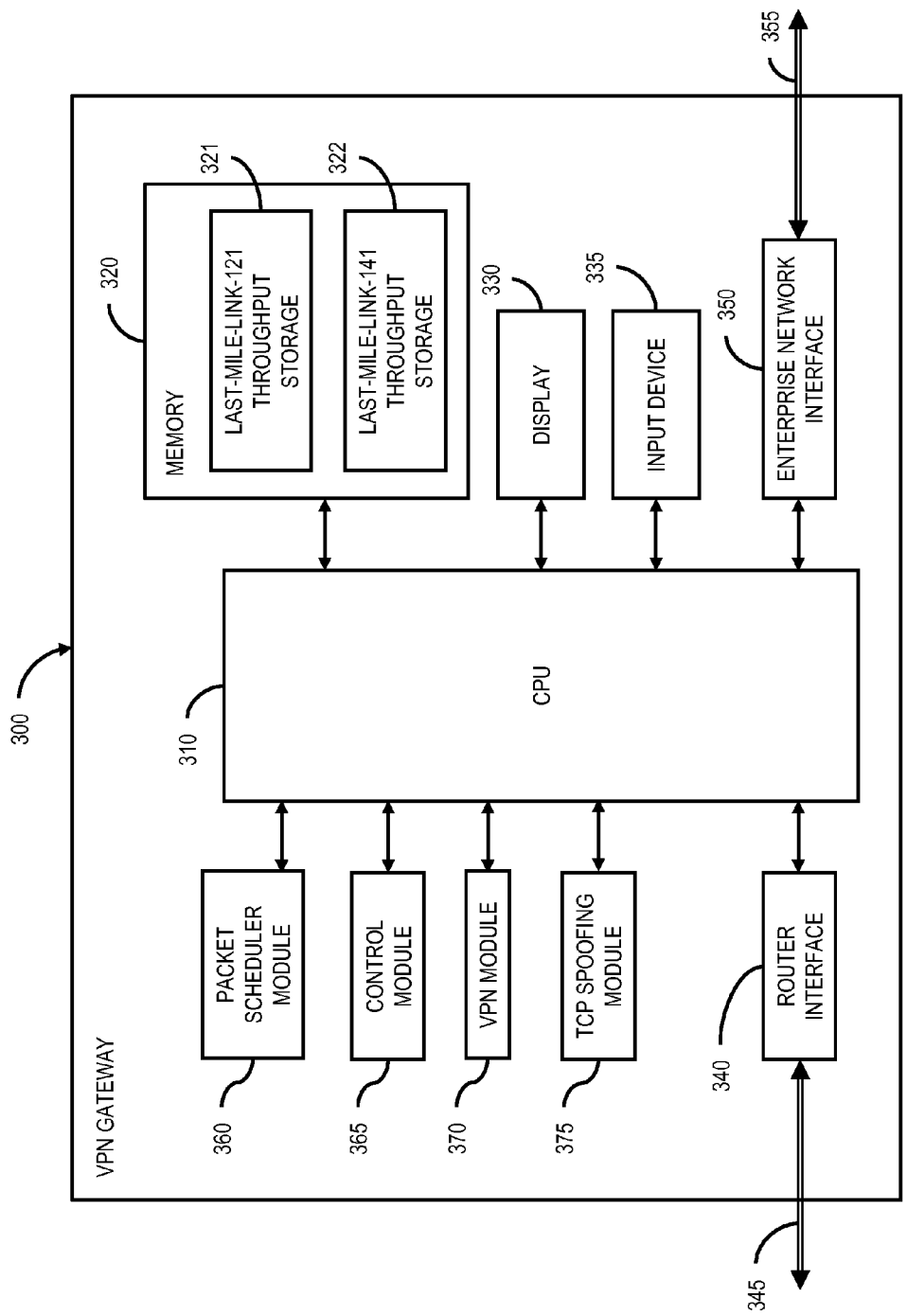
FIG. 3 illustrates a virtual private network gateway, in accordance with example embodiments.

FIG. 3 illustrates a VPN gateway 300, in accordance with example embodiments. The VPN gateway 300 includes a CPU 310 and a memory 320. The memory 320 includes last-mile-link-121 throughput storage 321 and last-mile-link-141 throughput storage 322. The storage 321 stores information relating to the throughput of last-mile link 121, while storage 322 stores information relating to the throughput of last-mile link 141. The VPN gateway 300 receives data from VPN router 200 for storing in storage 321 and 322, respectively, as will be later explained.

According to example embodiments, the memory 320 includes storage sections or modules associated with the number of remote sites involved in the VPN system. For example, with respect to the network 100, the memory 320 includes storage modules for the last mile links 121, 141—the last-mile-link-121 throughout storage 321 and the last-mile-link-141 throughput storage 322. As will be appreciated, such memory storage may be implemented in different memory components, in storage segments of a single memory, stored in a single memory based on indexing, etc. The VPN gateway 300 also includes a display 330 for displaying information to a user, and an input device 335 for a user to input information. The display 330 can include, for instance, a CRT or LCD monitor, but is not limited to such. Input device 335 can include a keyboard and/or a mouse, but is not limited to such. The VPN gateway 300 also includes a router interface 340 and an enterprise network interface 350. The router interface 340 connects VPN gateway 300 with router 161 using data link 345. The enterprise network interface 350 connects VPN gateway 300 with enterprise network 163 using data link 355. The data link 355 can be a network connection, but is not limited to such.

The VPN gateway 300 further includes a packet scheduler module 360, a control module 365, a VPN module 370 and a TCP spoofing module 375. The packet scheduler module 360 shapes outgoing traffic to be sent by VPN gateway 300 to VPN router 200 to optimize the downlink throughput over last-mile link 121, 141. These data packets are packets destined for remote site 120, 140, primarily sent by devices on enterprise network 163. The control module 365 controls the operation of VPN gateway 300, including various calculations or determinations, such as the calculation or determination of throughput speeds. The VPN module 370 performs VPN functions according to, e.g., the IPSEC protocol. That is, the VPN module 370 encapsulates and encrypts outgoing VPN packets, which is ultimately sent from VPN gateway 300 to VPN router 200 using router interface 340, and de-encapsulates and decrypts incoming VPN packets received from VPN router 200 by VPN gateway 300 using router interface 340. The TCP spoofing module 375 handles the TCP spoofing protocols. In certain embodiments, the control module 365 carries out all functions performed by the VPN gateway 300. In other various embodiments, other modules or controllers can be configured to carry out functions performed by the VPN gateway 300.

As depicted in FIG. 1, the remote sites 120 and 140 have different DSL service plans connecting to the same VPN gateway in NOC 160, for example. It is can be important to restrict the throughput limit in each direction (i.e., downlink and uplink) through last-mile links 121 and 141 of remote sites 120 and 140, respectively, to make sure that each throughput does not exceed the maximum speeds of DSL modems 122 and 142. That is, the VPN router 200 must ensure that their respective uplink throughputs do not exceed the uplink speeds of DSL modems 122 and 142, respectively. At the same time, the VPN gateway 300 must ensure that the downlink throughputs to remote sites 120 and 140 do not exceed the downlink speeds of DSL modems 122 and 142, respectively. Throughput must be restricted so that packets are not lost due to buffer overflow, or delayed significantly by queuing up in the DSL modem and DSLAM. Accordingly, in accordance with example embodiments, periodically determining network latency parameters, and dynamically adjusting rates of data flow in the transmit and receive directions based on such determined latency parameters, significantly enhances network quality of service for data transmission and reception and minimizes packet loss in a cost efficient and effective manner. For example, based on periodically determined network latency parameters, transmit and receive rates may be dynamically set and adjusted as between a router and a peer device over a peered network tunnel interfacing the router and the peer device. Further, also based on periodically determined network latency parameters, data traffic receive rates may be dynamically set and adjusted for data traffic received over a peerless network tunnel, such as by regulating the rate of establishment of new network connections for receipt of such peerless data traffic, by setting and adjusting window sizes to control rate at which peerless hosts send the data packets, by performing packet tossing (e.g., methodically dropping packets to signal the peerless hosts to slow down packet transmissions), and by injecting extra latency in network transmissions.

As will be appreciated, a module or component (as referred to herein) may be composed of software component (s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components.

Figure 4:
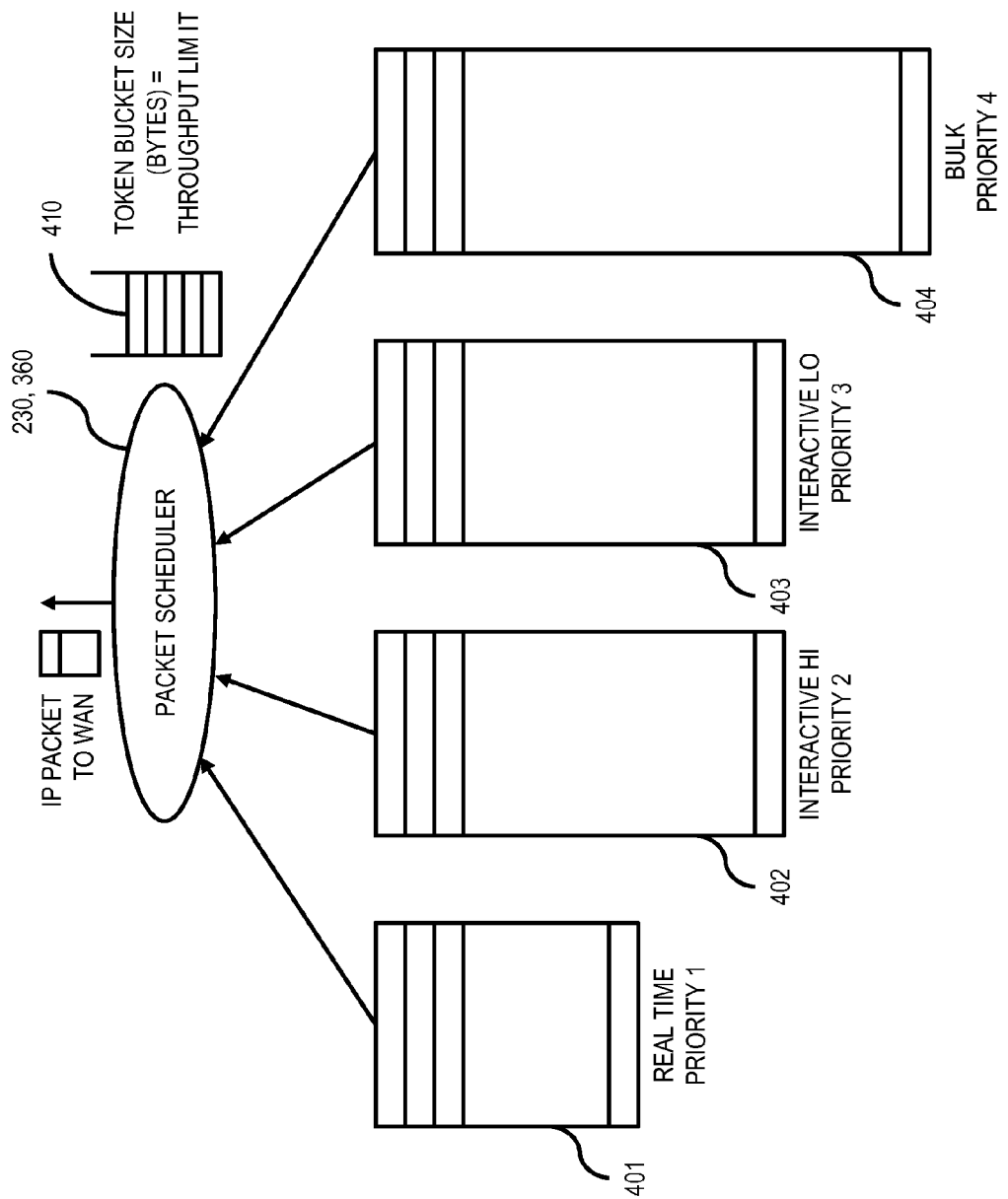
FIG. 4 illustrates an example packet scheduler operation, in accordance with example embodiments.

FIG. 4 illustrates an example packet scheduler operation, in accordance with example embodiments. The packet scheduler modules 230 and 360 both operate in a similar fashion, in that the modules perform traffic shaping of outgoing data. The packet scheduler module 230 shapes outgoing traffic in the uplink direction from VPN router 200 to VPN gateway 300. Conversely, the packet scheduler module 360 shapes outgoing traffic in the downlink direction from VPN gateway 300 to VPN router 200. As shown in FIG. 4, both the VPN router 200 and the VPN gateway 300, using CPUs 210 and 310 respectively, implement quality of service (QOS) using, for example, four priority queues 401, 402, 403, and 404 for the outgoing WAN traffic, thereby classifying and prioritizing the outbound data packets. The priority queue 401 stores the highest priority packets to queue for transmission. The priority queue 402 stores the second-highest priority packets. The priority queue 403 stores the third-highest priority packets. Priority queue 404 stores the lowest priority packets. Since the VPN gateway 300 manages outgoing traffic to both VPN router 200a and VPN router 200b, it maintains four priority queues for each of VPN routers 200a and 200b in the network. In the VPN router 200 priority queues 401-404 are stored in memory 220, while in VPN gateway 300, priority queues 401-404 are stored in memory 320. Real-time traffic, such as voice is mapped to the highest-priority queue 401. Interactive traffic such as POS and hypertext transfer protocol (HTTP) is mapped to the second-highest and third-highest priority queues 402 and 403, respectively, to match the relative priorities. Bulk traffic is mapped to the fourth and lowest-priority queue 404.

The CPUs 210 and 310 classify IP packets based on the fields within the header of the packets (e.g., Differentiated Services Code Point (DSCP) code points in QOS configurations), source and destination addresses, and, for TCP and UDP, by its source and destination ports. A variety of matching mechanisms can be employed to perform the classification including those based combinations of fields and binary masked matching and value range matching. The CPUs 210 and 310 can classify an IP packet based on IP flows and their packet size distribution, packet time, based on deep-packet inspection of the fields within individual packets within an IP flow, and other characteristics of the IP flow.

In the various embodiments, a network manager software program that manages both the VPN router 200 and the VPN gateway 300 allows an operator to map the traffic types to the different priority queues based on individual packet header fields. The network manager software program can allow an operator to program IP selection (e.g., address, port, DSCP, etc.) based rules to map UDP traffic (such as voice). The network manager software program can be executed on the network manager apparatus 164, but alternatively can be executed on any computer or other electronic device at NOC 160 or at any remote site, as long as the device can access VPN router 200 and VPN gateway 300, either directly or indirectly, to issue the mapping. The network manager software program can also allow an operator to classify the traffic of a TCP connection based on TCP PEP rules. In particular, an operator can classify such traffic based on the header fields of SYN packet, with the result being to map TCP connections to backbone connections where each backbone connection operates at a different priority level. The result can be to map different TCP connections carrying different types of traffic (HTTP, FTP, etc.) to a different priority level. For example, HTTP traffic can be mapped to a lower priority backbone connection, while POS traffic can be mapped to a higher priority backbone connection.

Once the CPUs 210 and 310 establish the respective packet traffic classification and prioritization mappings, the next step is to have packet scheduler modules 230 and 360, in VPN router 200 and VPN gateway 300 respectively, process the packets from their respective WAN queues and shape the traffic as per a prioritization scheme. That is, both packet scheduler modules 230 and 360 process the outgoing IP packets in their respective WAN queues, which are filled according to the traffic classification and prioritization rules. In the certain embodiments, the scheduler modules 230, 360 implement a token bucket 410 with a maximum bucket size in bytes corresponding to the respective throughput limit. The packet scheduler modules 230, 360 then process the packets from the WAN queues in a priority order, thereby ensuring that the real-time traffic is typically processed with the least amount of queuing delay. While processing packets, the packet scheduler modules 230 and 360 include (i.e., take into account) the underlying network protocol overhead (on top of the IP packet length) in its available tokens calculations prior to de-queuing a packet from a WAN queue for transmission.

According to certain embodiments, traffic shaping is based on a relatively strict priority queuing. In various other embodiments, the packet scheduler modules 230 and 360 can alternatively utilize other priority schemes such as Weighted Fair Queuing to provide a suitable QOS policy for various situations. Once the traffic classification, prioritization, and shaping is established, what is then configured is the throughput limit (token bucket size) at each VPN peer, such as to match the last-mile link speeds and take into account the appropriate network protocol overhead in the throughput limit calculations and enforcement. Moreover, to configure optimal uplink and downlink throughput, the VPN routers 200a, 200b need to recognize the various link characteristics information (i.e., configuration) from respective DSL modems 122 and 142. The link characteristics information includes, e.g., uplink speed, downlink speed, WAN Protocol (e.g., RFC 2684 Bridged, RFC 2684 Routed, PPPoA, PPPoE, etc.), and ATM Encapsulation Mode (e.g., LLC, VC MUX, etc.), for example.

With reference again to FIG. 1, according to an example embodiment, in initially setting a target transmit and receive rates for data flow in the network, the DSL modem 122 provides information regarding link characteristics, such as uplink and downlink speeds (e.g., a downlink speed of 1.5 Mbps and an uplink speed of 384 Kbps). Once the link characteristics information is obtained, it is stored in memory 220 and is made available to the various applications and/or modules within VPN router 200. The VPN router 200 sets its uplink throughput limit in the uplink direction to match the learned uplink speed of the DSL modem 122. That is, in the example of FIG. 1, VPN router 200 sets its uplink throughput limit to 384 Kbps, for example. The VPN router 200 applies a configurable throughput scale factor to the modem uplink throughput limit. The scale factor ensures that the maximum uplink throughput does not exceed the uplink speed of the DSL modem 122, 142. That is, the intent of the uplink scale factor is to keep the overall link throughput slightly below the uplink line speed of the DSL modem 122, 142, to account for small traffic bursts and to prevent overdriving last-mile link 121, 141 in the uplink direction.

For example, the default scale factor for the uplink may be set at 90%. Thus, the Effective Uplink Throughput Limit equals (Modem-provided uplink speed)*(Uplink Throughput Limit Factor). Accordingly, in remote site 120 (for example), the Effective Uplink Throughput Limit=384 Kbps*90%=345.6 Kbps, which can be rounded down to 345 Kbps. Thus, VPN router 200s sets its uplink throughput limit at 345 Kbps. The VPN router 200 then applies a configurable throughput scale factor to the modem downlink throughput limit. The scale factor ensures that the maximum downlink throughput by VPN gateway 300 does not exceed the downlink speed of the DSL modem 122, 142. Similar to the uplink scale factor, the intent of the downlink scale factor is to keep the overall link throughput slightly below the downlink line speed of the DSL modem 122, 142, to account for small traffic bursts and to prevent overdriving last-mile link 121, 141 in the downlink direction. The downlink scale factor can be the same as, or different from, the uplink scale factor. For example, the default scale factor for the downlink may be set at 90%. Thus, the Downlink Effective Throughput Limit equals (Modem-provided downlink speed)*

(Downlink Throughput Limit Factor). Accordingly, in remote site 120 (for example), the Effective Downlink Throughput Limit=1.5 Mbps*90%=1.35 Mbps. Thus, VPN router 200a sets the effective downlink throughput limit at 1.35 Mbps.

While VPN router 200 does not directly utilize the effective downlink throughput limit to throttle transmissions, VPN gateway 300 incorporates the effective downlink throughput limit for its downlink transmissions from NOC 160 to remote site 120, for example. Thus, VPN router 200 typically follows the effective uplink throughput limit (i.e., the token bucket size for packet scheduler module 230) in the uplink direction. The VPN router 200, using packet scheduler module 230, uses the WAN protocol and ATM encapsulation information to compute the network protocol overhead (e.g., IPSEC, PPP, ATM, etc.) associated with the underlying network in its throughput calculations or determinations. The VPN router 200 uses the computer network protocol overhead to set its path maximum transmission unit (MTU) and its TCP maximum segment size (MSS) to match the underlying network between NOC 160 and remote site 120. That is, for packets sent from VPN router 200 to VPN gateway 300, the path MTU and TCP MSS of the VPN router 200 are dependent upon at least the overhead associated with the WAN protocol and ATM encapsulation information. The maximum transmission unit (MTU) of a communications protocol of an OSI layer comprises the size (e.g., in bytes) of the largest protocol data unit that the layer can pass on. In the TCP protocol, the maximum segment size (MSS) specifies the largest amount of data (e.g., in octets) that a communications device can receive in a single TCP segment, and therefore in a single IP datagram. The TCP MSS does not include the TCP header or the IP header. The IP datagram containing a TCP segment may be self-contained within a single packet, or it may be reconstructed from several fragmented pieces, whereby the MSS limit applies to the total amount of data contained within the final reconstructed TCP segment.

By way of example, an MSS for a TCP connection is negotiated during connection establishment. The TCP SYN packet and the TCP SYN-ACK packet carry an MSS TCP header option, which provides the maximum segment size that the sender is prepared to receive. The VPN router enforces a preferred MSS value by reducing the value found in the MSS header option of a TCP SYN packet and of a TCP SYN-ACK packet to be no larger than the preferred value for packets going to the sender and adjusts the checksums accordingly. This is done either as part of a TCP spoofing PEP optimization, or on un-spoofed TCP connections where only the TCP SYN and TCP SYN-ACK packets are edited. The VPN router 200 then typically sends a ModemInfo message to VPN gateway 300. The ModemInfo message includes the link characteristics information that VPN routers 200a, 200b learned from DSL modems 122, 142, respectively, including, e.g., the modem-provided and the effective uplink and downlink speeds, WAN protocol, and ATM encapsulation modem, along with other information such as, e.g., modem type (DSL, wireless, cable, etc.).

According to a further example embodiment, the VPN gateway 300 sets the per-site throughput limit for VPN router 200 (i.e., the token bucket size for packet scheduler module 360) according to a minimum of: (1) the effective downlink throughput limit; and (2) a NOC-configured maximum downlink throughput limit. In cases where DSL modem speeds are much greater than the throughput available at NOC 160, the NOC-configured limit can restrict the downlink throughput limit to meet the NOC 160 service plan offering. The VPN gateway 300, using packet scheduler module 360, uses the WAN protocol and ATM encapsulation information to compute the network protocol overhead (e.g., IPSEC, PPP, ATM, etc.) associated with the underlying network in its throughput calculations. Alternatively, the overhead information, or other information in relation to regulating a rate of establishing network connections in response to the determined received rate for controlling traffic flow, can be transmitted in the ModemInfo message in accordance with the computation by VPN router 200. The VPN gateway 300 uses the computed overhead to set its path MTU and its TCP PEPs MSS to match the underlying network between NOC 160 and remote sites 120, 140. That is, the path MTU and TCP PEP MSS of the VPN gateway 300 for packets sent to VPN router 200a, 200b are dependent upon at least the overhead associated with the WAN protocol and ATM encapsulation information.

Additionally, variables other than, or in addition to, the path MTU and MSS of the TCP PEP can be adjusted based on the monitored throughput, depending on, e.g., the particular network protocol(s) employed. Further, the setting of network throughput limits, such as by means of determining target transmit and receive rates (e.g., based on measured latency parameters), and the regulation of the establishment of network connections based on the determined target receive rate for controlling the rate of received traffic over a peerless tunnel, can be applied to last-mile link 141 or to other links in systems in a similar manner to that of system 100, for example. Also, the VPN routers 200a, 200b and VPN gateway 300 can adjust network throughput limits, based on a monitored change in speed, such as in the last-mile link speed. Such a change can result from a retraining of the modem by the DSLAM in NAP network 105. Modems typically can retrain for at least two reasons: (1) variations in the signal-to-noise ratio; or (2) if large numbers of errors are detected. When this occurs, the DSLAM in NAP network 105 and the DSL modem 122 (for example) typically can renegotiate the line speeds. Another such change can result from remote site 120 changing its DSL service plan to a higher (i.e., greater throughput) or lower (i.e., less throughput) tier of service.

Such changes can necessitate an updating of the uplink and downlink throughput limits on VPN router 200 and VPN gateway 300, respectively, in order to maintain optimal data throughput, or can necessitate adjusting of transmit and receive rates in the network or system 100. That is, by either updating the throughput limits and/or by dynamically adjusting the transmit and receive rates in the network, or by regulating the rate of establishing network connections based on the determined target receive rate, the system 100 can minimize the over-driving of last-mile links 121, 141 (e.g., when the modem link speed decreases) or the under-utilizing the last-mile links 121, 141 (e.g., when the modem link speed increases), or other system components to minimize packet loss and to enhance quality of service. Such changes may, therefore, also be used in setting or adjusting the target receive rate and the target transmit rate in the network, according to example embodiments.

According to example embodiments, as to determining or adjusting the throughput, or the transmit rates and receive rates, the VPN router 200a, 200b periodically queries DSL modem 122, 142, respectively, for link characteristics information, any periodically measures the latency in the network. Also, the VPN gateway 300 periodically queries DSL modem 122 and VPN router 200a, and DSL modem 142 and VPN router 200b, for link characteristic information, and periodically measures the latency in the network. The VPN router 200a, 200b and/or the VPN gateway 300 also determines if the returned link speed information from the query has changed compared to the previous link speed information, or based on the measured latency, the latency has changed. In various embodiments, a positive determination is made only when the change in link speed is non-trivial (e.g., changed beyond a configurable limit) to avoid unnecessary computations and ModemInfo messages, or the measured latency has significantly changed, such as at or above a predetermined threshold for the latency.

By way of example, if modem link speeds have significantly changed as compared to previous values, or the latency determination indicates a significant increase in the latency, then the VPN router 200a, 200b and/or the VPN gateway 300 (as to the link speeds) may include new uplink and downlink throughput limits with new link speed information, and (as to the determined latency) may dynamically adjust the receive and transmit rates (e.g., based upon the determined latency parameters). Depending on circumstances, one of the two throughput limits may remain unchanged, or both may be changed, or transmit rates and receive rates can be adjusted for various parts of the network. Otherwise, if the modem link speeds have not changed (or if the change is merely trivial), or if the determined latency parameters have not significantly changed, periodic monitoring of link speeds or the latency parameters, the DSL modem 122, 142, the VPN router 200a, 200b or the VPN gateway 300 typically continues periodically monitoring link characteristics information, as well as measuring or determining the latency parameters, or a receive data rate for a network connection.

Based upon the determination, the VPN router 200a, 200b and the VPN gateway 300 sets its uplink throughput limit to correspond to the learned uplink speed of the DSL modem. The VPN router 200a, 200b and the VPN gateway 300 applies a configurable throughput scale factor to the new modem uplink throughput limit, to obtain an effective uplink throughput limit, as well as determines or adjusts the receive rates and transmit rates in the network. As previously noted, the effective uplink throughput limits ensure that the maximum uplink throughput does not exceed the uplink speed of DSL modem 122, 142, or of VPN router 200a, 200b, or of VPN gateway 300, providing consideration for small traffic bursts. The VPN router 200a, 200b and the VPN gateway 300 apply configurable throughput scale factors to the new downlink throughput limit or limits, to obtain the effective downlink throughput limits, as well as maintaining or adjusting the receive rates or transmit raters in the network, based on the determined latency parameters.

By way of further example, the VPN router 200a, 200b sends a ModemInfo message to VPN gateway 300, the ModemInfo message containing at least the new effective uplink and downlink throughput limits, as well as can advise the VPN gateway of any adjustments made in the target or receive rates in the network, such as system 100. The ModemInfo message can also contain other data (e.g., the new modem-provided uplink and downlink throughput limits), and can be sent by being piggy-backed on an existing message, for example. The VPN gateway 300 receives the ModemInfo message from VPN router 200a, 200b and the VPN router 200a, 200b can set an ACK-requested flag to confirm receipt of the ModemInfo message. The VPN gateway 300 sets its new downlink throughput limit for remote site 120, 140, including VPN routers 200a, 200b, in accordance with the effective downlink throughput limit calculated by the VPN router 200a, 200b or by the VPN gateway 300, or both, as well as can set or adjust the transmit and receive rates in the network, such as system 100, based on received or determined information (e.g., contained in the ModemInfo message).

Further, it will be understood that operations performed by VPN router 200 or VPN gateway 300, including those related to determining and adjusting the transmit and receive rates (e.g., based on the latency parameters), related to adjustment of throughput limit settings, and related to regulating a rate of establishing network connections, may be performed using the respective control modules and memory of the VPN router 200 or VPN gateway 300, or may be performed by other quality of service (QOS) components or modules, according to example embodiments. Moreover, other modules or components in a network may be configured to set or adjust the throughput limit settings, as well as the target transmit and receive rates, and the to regulate the rate of establishing network connections, in the network, such as by incorporating or utilizing the same or similar component as described in FIGS. 2 and 3 for the VPN router 200 and the VPN gateway 300, in a similar manner to that described. As such, the setting or adjustment of the throughput limit settings, as well as the target and receive rates in the network, can be extended to various parts of the network, including but limited to any other last-mile links, or other links, in systems similar to that of system 100.

By performing the described process a network, such as the system 100 allows, VPN peers (e.g., VPN router 200, VPN gateway 300, etc.) or other system components or modules, such as the described components or modules, to provide QOS to the end-user traffic while reacting to the changing network conditions by (1) actively monitoring the modem link speeds and automatically adjusting the Throughput Limit settings in both directions; (2) actively monitoring the traffic and scaling back the bulk and inter-active traffic automatically to give priority to the real-time and interactive traffic; and (3) setting and dynamically adjusting transmit rates and receive rates in the network and regulating a rate of establishing network connections, based upon determined latency parameters, to control the traffic flow, according to example embodiments.

The active QOS overlay functionality, according to embodiments of the present invention, are also referred to herein as a targeted extra latency quality of service overlay (TELQO) functionality. TELQO functionality typically operates in private networks (e.g., enterprise IPSEC networks or virtual private networks (VPNs)). As to a peered TELQO operation, such operation generally occurs, for example, over a VPN connection or an IPSEC tunnel, and a peerless TELQO operation can be employed for a split-tunnel, that is traffic over a tunnel directed to a public network (e.g., the Internet). Typically, a peered TELQO operation is more precise than a peerless TELQO operation, and thus provides better performance in terms of fully utilizing broadband capacity.

The TELQO functionality of example embodiments provides advantages over existing quality of service (QOS) applications, including such advantages as: (1) automatic and dynamic measurement and adjustment of available capacity of a broadband connection; (2) support of peerless operation, which allows for active quality of service (QOS) management of data traffic over ordinary-grade broadband connections over conventional broadband networks (including split-tunnel connections—defined below), where traffic moves from servers on a public network (e.g., the Internet) down the broadband connection without being governed by any peer intermediary between the broadband connection and the public network; (3) support of multiple tunnels (e.g., separate streams of traffic), which share a broadband connection and provide prioritization within each stream (e.g., a single IPSEC tunnel (which is peered), and a split-tunnel (which is peerless)); and (4) provisions for an IP-Flow based classifier (generally not requiring any configuration), which automatically classifies (and reclassifies as needed) end-user traffic to provide real-time treatment (as required), and to appropriately classify other applications (e.g., as Light-Interactive, Heavy-Interactive and Bulk-Transfer).

By way of example, a tunnel comprises a collection of data traffic (e.g., data packets) that is individually allocated to bandwidth, where the traffic data packets are classified and prioritized to fit within the allocated bandwidth. A tunneling protocol comprises the encapsulation of one network protocol (e.g., a payload protocol) within or based on a different network protocol (e.g., the delivery protocol). For example, tunneling may be employed to carry a payload over an incompatible delivery-network, or to provide a secure path through an untrusted network. An example of a tunnel includes a virtual private network (VPN) tunnel, which, for example, may comprise a private network that interconnects remote networks through primarily public communications infrastructures (e.g., the Internet). A VPN tunnel provides security through tunneling protocols and security procedures (e.g., encryption). Further, a VPN tunnel may comprise a given broadband connection that carries one or more VPN connections (e.g., a VPN connection to securely connect the branch offices of an organization to a head office network through a public network, such as the Internet, or one enterprise connection to a corporate data center and one to a credit-card authorization service). A further example of a tunnel includes a collection of related-traffic directly transmitted out to a public network (e.g., a split tunnel to the Internet). For example, a split tunnel may comprise a simultaneous network connection to a public network (e.g., the Internet) and to a local area network (LAN) or wide area network (WAN), using the same physical network connection (where the LAN or WAN connection may be via a VPN connection). A given broadband connection may carry multiple split tunnels (e.g., a connection carrying guest WiFi traffic and connections to an explicitly enumerated list of business-related secure web sites).

By way of further example, a peer comprises the node at the other end of a tunnel that includes TELQO capabilities. A peerless tunnel comprises a tunnel where the traffic being received across a broadband connection with TELQO capabilities is not transmitted by a peer, and thus must be indirectly controlled via receive traffic shaping (e.g., a split tunnel where broadband data traffic received from one or more hosts over a public network (e.g., the Internet) via a split tunnel). For example, all split tunnels and some VPN tunnels are peerless. A peered tunnel comprises a tunnel where the traffic being received across a broadband connection with TELQO capabilities is transmitted, and rate limited, by a TELQO peer. For example, according to example embodiments, peered tunnels are preferable to peerless tunnels, because the receive rate of a peered tunnel can be more precisely controlled as compared to the receive rate of a peerless tunnel.

In accordance with example embodiments, the TELQO capabilities may operate according to various example modes, including an over-engineered mode, a single-peer mode, a multi-peer mode, a broadband access mode, a single-peer split tunnel mode, and a multi-peer multi-peerless mode. According to the over-engineered mode, the broadband connection can be assumed to be over-engineered, and thus, typically, there is no need to shape incoming traffic as the broadband connection receive path should not be congested, or to allocate bandwidth to tunnels as the transmit and receive paths should not be congested. In the over-engineered mode, however, there can be a need to rate limit and prioritize traffic transmitted thru the peered tunnels of a node, because the receive capacity of the peer(s) typically can be limited. Further, when in the over-engineered mode, the rate limit of a peered tunnel can be set by the peer via a Set-Rate transaction (further described below).

According to the single-peer mode, a node can have a single, peered tunnel. For example, there are no peerless tunnels with the single-peer mode, and thus there is no need to traffic shape received traffic. In the single-peer mode, one-way latency can be measured with a TELQO server, and transmit and receive target rates can be determined. Also, in the single-peer mode, the traffic comes from a single peer (e.g., ordinarily via a single VPN tunnel) so there is no need to allocate transmit or receive bandwidth among tunnels. In the single-peer mode, however, once target transmit and receive rates are determined, the transmission of a single peered tunnel is prioritized and rate limited, and the transmit rate of the peer is set.

According to the multi-peer mode, the broadband connection is typically not over-engineered and multiple peered tunnels can be supported (e.g., ordinarily one per VPN tunnel). One-way latency can be measured with a TELQO server and target transmit and receive rates can be determined. Transmit and receive bandwidth are allocated among the multiple peered tunnels with each peer being instructed as to its rate limit, and transmission to each peer being limited by the transmit bandwidth allocator and by the peer. Also, in the multi-peer mode, there is no need to traffic shape received traffic in that the received traffic is from a TELQO peer.

According to the broadband access mode, the broadband connection receiving the QOS overlay features does not have any IPSEC VPN tunnels to TELQO-equipped peers. As far as the TELQO functionality is concerned, the traffic is split-tunnel traffic, and that traffic is considered to be a single peerless tunnel.

According to the single-peer split-tunnel mode, one-way latency can be measured with a TELQO server and target transmit and receive rates can be determined. Received split tunnel traffic with the single-peer-split tunnel is traffic shaped, and bandwidth is allocated between the peerless split-tunnel and the single peered tunnel. By way of example, the peer is sent the transmit rate, and split tunnel and peer packet transmission is governed by the allocated transmit bandwidth limits. For the peerless tunnel, the received traffic may be indirectly regulated by shaping the traffic via insertion of extra target latency amounts, adjustment of window sizing, control of new connection establishment and packet dropping (as discussed in further detail below). Further, the bandwidth limits governing the traffic shaping may be set based on one or more of a variety of factors, including the latency measurements based on probe transactions and limits calculated based on other network factors.

According to the multi-peer multi-peerless mode, the broadband connection is typically not over-engineered and multiple peers can be supported (e.g., ordinarily multiple VPN tunnels) along with multiple peerless tunnels (e.g., split-tunnels and/or peerless VPN tunnels). One-way latency can be measured with a TELQO server and target transmit and receive rates can be determined. With the multi-peer multi-peerless modes, transmit and receive bandwidth is allocated among the tunnels (e.g., peered and peerless) with the transmit rate of a tunnel being governed by its assigned rate limit. Peers are sent their transmit rate and peerless tunnel traffic is traffic shaped to match its assigned receive rate limit. Again, as specified above, for the peerless tunnels, such rate limits may be achieved by various receive traffic shaping mechanisms.

According to further example embodiments, a VPN router (e.g., an enterprise branch-office router) may have multiple broadband connections operating in various modes, including high-availability switch-over, high-availability load-balancing and connection bonding. Further, the TELQO functionality may be applied to such broadband connections. By way of example, in the High-Availability Switch-Over mode, data traffic typically runs entirely across one broadband connection at a time, and thus the TELQO functionality can support this mode by either employing one TELQO instance (e.g., bridge or WAP) per broadband connection (where the TELQO instance would recognize when it can carry traffic, and start up and run accordingly), or by employing a single TELQO instance that dynamically adjusts to changed traffic characteristics on switchover. In the High-Availability Load-Balancing mode, traffic runs simultaneously across multiple broadband connections, and thus a TELQO instance can be employed per connection, and status and statistics from the links can be used to assist the classification and routing algorithms that distribute traffic across the broadband connections. In the Connection Bonding mode, a single IP flow may be distributed across multiple broadband connections when throughput exceeding a single broadband connection is required. Such data traffic would be classified as Bulk-Transfer traffic, and thus a TELQO instance could be employed to the connection bonding problem with either of the following architectures: (1) Bonding Inside of the TELQO instance, where the instance addresses a single bonded broadband connection and operates to keep latency in moderation, and it would be the responsibility of the bonding algorithms to distribute the TELQO provided traffic appropriately across connections; or (2) Bonding Outside of the TELQO instance, where there would be a TELQO instance for each broadband connection, and the bonding algorithm would explicitly distribute the data traffic of a high-speed bulk flow across the multiple broadband connections using feedback from the TELQO instances regarding how much capacity is available for such a bonded bulk transfer. The equivalent of High-Availability Load-Balancing can be used for less bandwidth intensive flows.

In accordance with further example embodiments, the TELQO functionality classifies traffic into specific classifications. By way of example, such classifications include: (1) Light-No-Delay, which typically is applied to transmissions relating to TELQO control signaling, controlling the operation of the TELQO functions (e.g., clock synchronization, latency measurements and setting of the transmit rate for a peer); (2) Real-Time, which typically is applied to data traffic of applications that typically require a relatively consistent low latency and jitter and have a relatively predictable and consistent top-speed (e.g., VOIP comprises a typical example of a flagship real-time application); (3) Light-Interactive, which typically is applied to data traffic that typically benefits from relatively low-latency and does not amount to a significant fraction of overall traffic when aggregated together (e.g., domain name system (DNS) look-ups comprise typical examples of Light-Interactive traffic); (4) Heavy-Interactive, which typically is applied to data traffic that typically benefits from relatively low-latency, but may operate at relatively high bit rates (for discrete periods of time), which can amount to a significant fraction of the capacity of a broadband connection (e.g., web browsing, such as hypertext transfer protocol (HTTP) and secure HTTP protocol (HTTPS), comprises a typical example of a dominant form of Heavy-Interactive traffic); and (5) Bulk-Transfer, which typically is applied to data traffic that can be expected to use a considerable amount of traffic over a long period of time (e.g., bulk traffic typically cannot expect to receive low-latency transmission).

Additionally, in accordance with example embodiments, a packet-forwarding classification is dynamically assigned to each traffic class. For example, packet-forwarding classifications include: (1) Governed, where the packets are queued and typically forwarded, such as when a bandwidth governor can allow their forwarding; and (2) Ungoverned, where packets are typically forwarded without a queuing delay regardless of bandwidth limits—typically, a class is assigned to the Ungoverned packet forwarding classification when the total of Ungoverned traffic can be relied upon to remain consistently significantly less than the target rate.

By way of example, the bandwidth allocation module assigns the packet forwarding classification to the traffic classes, as follows: (1) the Light-No-Delay and Real-Time traffic classes are assigned to the Ungoverned packet forwarding classification; (2) when there is no significant real-time activity, the Light-Interactive traffic class is typically assigned to the Ungoverned packet classification—alternatively, when there is real-time activity, the Light-Interactive traffic class is typically assigned to the Governed packet forwarding classification. If the classifier is unreliable, however, and a relatively large fraction of available bandwidth ends up being classified as Light-Interactive (even for a relatively brief period of time) then Light-Interactive traffic class will be assigned classified (at least conditionally) to the Governed packet forwarding classification; and (3) the Heavy-Interactive and Bulk-Transfer traffic classes are typically assigned to the Governed packet forwarding classification.

Figure 5A:
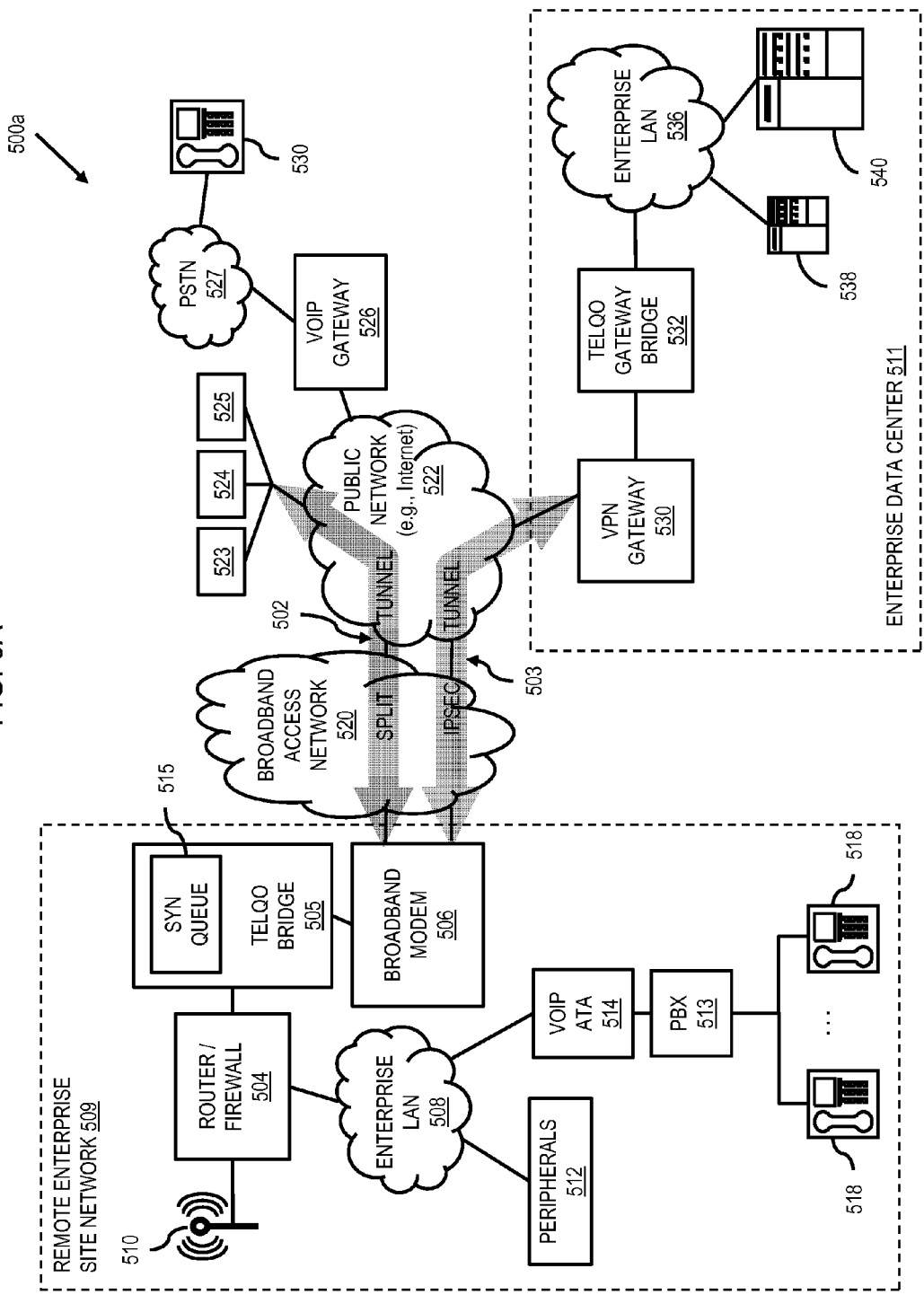
FIG. 5A illustrates a network, including a targeted extra latency quality of service overlay feature, in accordance with example embodiments.

FIG. 5A illustrates a network 500a (e.g., an enterprise or small/medium enterprise (SME) network), including TELQO functionality, in accordance with example embodiments. With reference to FIG. 5A, the TELQO functionality is employed in an existing enterprise network, for example, by inserting a TELQO bridge 505, at the remote enterprise site network 509, between the existing router/firewall 504 and the broadband modem (which provides access to the broadband access network 520). Alternatively, as will be recognized, the TELQO bridge 504 may be employed at different points within the enterprise network (e.g., the TELQO bridge may be implemented within the router firewall 504 via one or more modules composed of software and/or hardware). The router/firewall 504 typically supports one or more conventional broadband connections, each simultaneously supporting one or more tunnels. Such tunnels, for example, may comprise the Internet protocol secure (IPSEC) tunnel 503 to the enterprise data center 511 (e.g., for point of sale and VOIP traffic) and the split tunnel 502 to the public network 522 (e.g., for customer access to the Internet using guest WiFi services via the WiFi equipment 510). The TELQO bridge 505 allows traffic to share the network connection, while maintaining enhanced quality of service for VOIP and other real-time (response time sensitive) applications. At the far end of the IPSEC tunnel 503, the TELQO gateway bridge 532 is positioned, for example, between the data center enterprise LAN 536 and the data center VPN gateway 530.

With respect to the TELQO functionality (and the functionality hereinafter described with respect to the TELQO bridge 505), it will be appreciated that such functionality may alternatively be implemented by any other suitable component of the network (e.g., the router/firewall 504, the TELQO bridge 505, the VPN gateway 530, the TELQO gateway bridge 532, or any suitable combination thereof), for example, without departing from the scope of the embodiments of the present invention. For simplicity, however, the TELQO functionality is described herein with respect to the TELQO bridge 505. Moreover, similarly, with respect to the example networks 600, 700, 800 and 900 (of FIGS. 6, 7, 8 and 9, respectively), while described herein with regard the respective TELQO WAN optimization appliance (WAP) and TELQO WAN optimization server (WOS) (network 600), the TELQO bridge and TELQO peerless server (TPS) (network 700), the TELQO WAP and TPS (network 800), and the TELQO bridge and TPS (network 900), it will be appreciated that the TELQO functionality may alternatively be performed by other components of each of the respective networks (or any suitable combination of such components), without departing from the scope of the embodiments of the present invention. For example: with respect to the network 600 (FIG. 6), the TELQO functionality may be implemented by the router/firewall 604, the WAP 630, the VPN gateway 626, the WOS 632 or the TNMS 634, or any suitable combination thereof; with respect to the network 700 (FIG. 7), the TELQO functionality may be implemented by the router/firewall 704, the TELQO bridge 705, the TPS 724, the TNMS 734, or any suitable combination thereof; with respect to the network 800 (FIG. 8), the TELQO functionality may be implemented by the router/firewall 804, the WAP 830, the TPS 824 or the TNMS 834, or any suitable combination thereof; and with respect to the network 900 (FIG. 9), the TELQO functionality may be implemented by the router/firewall 904, the TELQO bridge 905, the TPS 924 or the TNMS 934, or any suitable combination thereof.

According to example embodiments, the TELQO functionality: (1) dynamically monitors the loading of the broadband connection and controls the traffic rate to avoid overflowing the connection with the result that the broadband connection provides a consistent low latency for data, including control the traffic flow over split tunnel 502 from the public network (e.g., Internet sites 523, 524, 525); (2) classifies and prioritizes traffic so that VOIP and latency sensitive applications are given preference over Bulk-Transfer traffic (e.g., even when the broadband is saturated), such as to promote a relatively reliable VOIP transport, and a relatively consistent and improved responsiveness; and (3) allocates bandwidth so that, when offered traffic exceeds available capacity, the lower priority traffic (e.g., guest WiFi traffic) can be restricted to a configurable percentage of the broadband capacity of the one or more tunnels of the network 500a. Moreover, the TELQO network 500a supports typical terrestrial broadband transports, including DSL, cable modem, FIOS, T1 and 3G/4G wireless, and supports VOIP over any of these transports that provide sufficient capacity and relatively adequate QOS.

By way of example, to enhance quality of service via TELQO functionality, the TELQO bridge 505 may be configured to adjust the transmit rate across its broadband connection, adjust the transmission rate of a TELQO peer to the router/firewall 504 (e.g., the transmit rate for traffic transmitted from the data center VPN gateway 530 via the IPSEC tunnel 503), and perform traffic shaping of received broadband traffic (e.g., broadband traffic received from the Internet via the split tunnel 502). The TELQO bridge 505 thereby minimizes, substantially reduces or substantially prevents data from piling up inside the broadband connection so that the prioritization of traffic and the traffic shaping of received traffic can provide the desired QOS characteristics (e.g., low latency for real time and interactive traffic). In this regard, the TELQO bridge 505 is configured to initiate and manage TELQO Probe Transactions, whereby the one way latency of the network is measured in both directions across the broadband connection. Based on the measured latency, the bridge 505 determines target transmit and target receive rates. Further, based on the determined target transmit and receive rates, the TELQO bridge controls the transmit rate of the traffic transmitted to the peer via the peered tunnel, sets the transmit rate (via a Set-Rate transaction) for traffic transmitted by the peer over the peered tunnel, and allocates the target receive rate across the split tunnel via traffic shaping mechanisms for the receive traffic over the peerless or split tunnel. According to example embodiments, for the peerless tunnel, the TELQO bridge indirectly regulates the receive traffic via one or more traffic shaping mechanisms, including insertion of extra target latency amounts, adjustment of window sizing, control of new connection establishment and packet dropping (as discussed in further detail below). Further, the bandwidth limits governing the traffic shaping may be set based on one or more of a variety of factors, including the latency measurements based on probe transactions and limits calculated based on other network factors, for example.

The target transmit and receive rates are determined, for example, by periodically monitoring one-way latency in both directions across the broadband connection. With respect to network latency measurements, the TELQO bridge 505 need only measure explicit one-way latency when the transmitter is not idle, as it gets a read of the minimum one-way latency as a byproduct of clock synchronization Probe Transactions. Based on the clock synchronization Probe Transaction, a low one-way latency measurement in one direction indicates a light-load scenario, and thus the one-way latency in the opposite direction should substantially equal the measured one-way latency. When the measured latency exceeds a targeted threshold above typical latency experienced when the traffic is light, the target rate is reduced. For example, when a measurement indicates that the extra latency exceeds a threshold, the target rate is reduced by some fixed percentage. Otherwise, when the offered traffic exceeds the target rate, the target rate is increased. This is measured, for example by determining a number of consecutive allocation periods that ended with packets left unsent. The TELQO bridge 505 thereby determines, sets and dynamically adjusts transmit and receive rates, based upon a determination of the latency parameters, and adjusts throughput limits, for the network 500a.

As to the determination or adjustment of the throughput, or the transmit and receive rates, the TELQO bridge 505 periodically queries the LAN 508 or the broadband modem 506 for link characteristics information, as well as periodically measuring one-way latency in the network, via both the transmit and receive directions. For example, the TELQO bridge 505 determines if the returned link speed information from the query has changed compared to the previous link speed information, or based on the measured latency, the latency has changed such as at or above a predetermined threshold for the latency. If link speeds have significantly changed as compared to previous values, or the latency determination indicates a significant increase in the latency in the network 500, then the TELQO bridge 505 (as to the link speeds) includes new uplink and downlink throughput limits with the new link speed information, and (as to the determined latency) dynamically adjusts the receive and transmit rates (e.g., based upon the determined latency parameters). Determining the latency parameters in the network may include, for example, the TELQO bridge 505 adjusting the transmit rate across the broadband connection, adjusting the VPN gateway 530 transmission rate to the router/firewall 504, as well as traffic shaping of received broadband traffic. This is typically done so as to prevent data from piling up inside the broadband connection of the network 500a so that the prioritization of traffic and the traffic shaping provides the desired QOS characteristics (e.g., low-latency for real-time and interactive traffic).

By way of further example, based on the determined network latency parameters, the TELQO bridge 505 determines a target receive data rate to control traffic flow, for example, over one or more peerless tunnels, and regulates, and, based on the determined target receive data rate, regulates the traffic flow of the traffic received via such peerless tunnels (e.g., broadband data received from various hosts via on or more peerless tunnels over the network connection, such as split tunnels to the public network 522). In this regard, according to example embodiments, the TELQO bridge controls the received traffic flow over the peerless tunnels via various methods, either individually or in any suitable combination. According to one example method for controlling received data flow from a split tunnel, the TELQO bridge 505 regulates the rate of establishing new network connections. For example, in the case of accessing a web page of an Internet site via a peerless tunnel 502, each link contained on that web page will initiate a new TCP connection to the web site identified by the link, which can result in dozens of new TCP connections. In order to initiate a TCP connection, TCP uses a three-way handshake. The client or web browser first transmits a TCP SYN packet to the server to initiate the connection, and the server responds by transmitting a SYN-ACK packet back to the client. The client then transmits an ACK packet back to the server, and, at this point, the client and server have each received an acknowledgment of the connection. One component of the packets is a sequence number that is used by to reassemble the data stream. Accordingly, without the initial SYN packet being transmitted to the server, no connection will be initiated, and thus the server cannot transmit the associated web site data back to the client (over the split tunnel). In order to control the traffic flow of the data received over the split tunnel, therefore, the TELQO bridge 505 regulates the rate at which such new network connections are initiated and established. By way of example, the TELQO bridge 505 stores or queues the respective SYN packets in the SYN queue 515, and releases them at a determined rate to control the rate of the establishment of the respective network connections.

According to a further example method for controlling for controlling received data flow from a split tunnel, the TELQO bridge 505 dynamically controls the TCP window sizing. With a TCP connection between a client and a server, the client sets a window size, which reflects the number of bytes the client is willing to receive at one time from the server (or the number of bytes that may remain unacknowledged at any given time. This window size is the receive window for the client, which sets a bound on the number of bytes that the server may send at one time, or the send window size of the server, and thus the window size effectively controls the channel bit rate or traffic flow. Hence, in addition or as an alternative to regulating the rate of establishing new connections, the TELQO bridge 505 controls traffic flow of data received over the split tunnel by setting the window size accordingly.

According to yet a further example method for controlling for controlling received data flow from a split tunnel, the TELQO bridge 505 may employ packet tossing or dropping. By way of example, in order to slow down the rate of data receipt, for example, over a split tunnel, the transmitting hosts can be signaled to slow down their respective transmit rates. This can be accomplished by methodically dropping TCP packets received from a given host, whereby, according to TCP procedures, upon experiencing packet loss the transmit rate is adjusted. Accordingly, when the respective transmitting host experiences packet loss based on the packets dropped by the TELQO bridge 505, the host will adjust the transmit rate accordingly.

According to example embodiments, in controlling receive traffic flow over a peerless tunnel, the TELQO bridge 505 measures one-way network latency in both directions across its network connection, and determines appropriate target receive rates based on the latency determinations. Based on the determined target receive rates, the TELQO bridge 505 regulates the rate for establishing network connections, and determines and sets window sizing to control channel bit rate. The TELQO bridge further determines whether the offered traffic load from the network connections exceeds a target receive rate for the respective tunnels. Where it is determined that the offered traffic load from the one or more network connections does not exceed a target receive rate, the TELQO bridge 505 maintains the target receive rate—the rate of establishing network connections and initial window size settings the one or more TCP connections. Where the offered traffic load exceeds the target receive rate, however, the TELQO bridge 505 adjusts the window sizing and the rate of establishment of network connections, accordingly, and employs packet tossing and injection of targeted extra latency, as necessary, to avoid overloading the network connection (e.g., resulting in jitter, packet loss and intolerable latency) so as not to adversely affect real time traffic over the network.

Figure 5B:
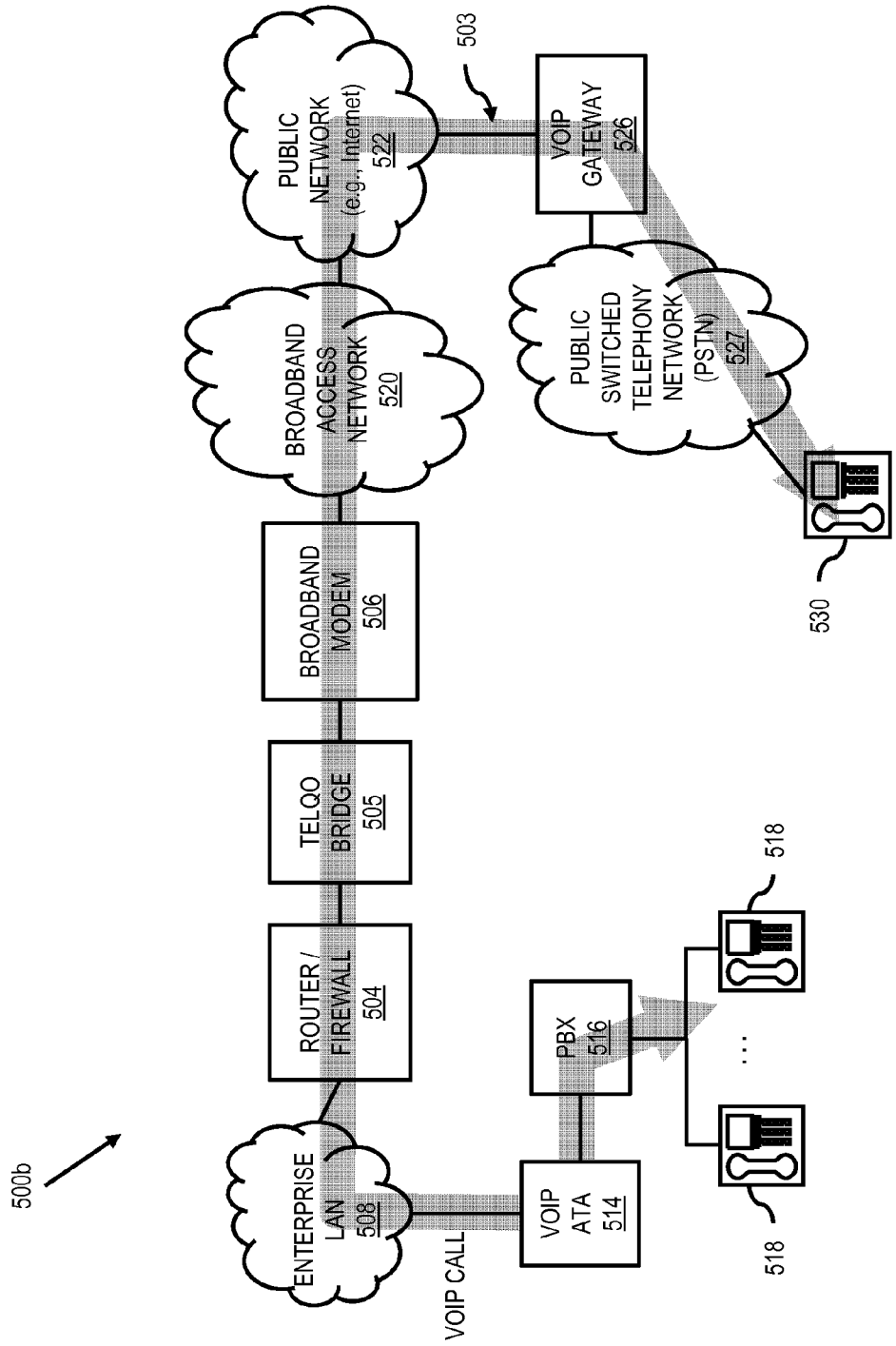
FIG. 5B illustrates a network, including a targeted extra latency quality of service overlay feature, as applied to a voice over Internet Protocol (VOIP) application, in accordance with example embodiments.

FIG. 5B illustrates a network 500b, including a targeted extra latency quality of service overlay feature, as applied to a voice over Internet Protocol (VOIP) application, in accordance with example embodiments. With reference to FIG. 5B, as in the network 500a (FIG. 5A), the TELQO functionality is employed by inserting the TELQO bridge 505 between the existing router/firewall 504 and the broadband modem 506. The TELQO bridge 505 conditions the traffic running across the broadband access network 520 to allow the VOIP traffic to share the broadband connection with existing traffic, whereby no reconfiguration of the router/firewall 504 or the broadband modem 506. Further, a standard VOIP analog telephone adapter (ATA) 514 is installed with connections to the Enterprise LAN 508 and to the private branch exchange (PBX) 513. In some cases, however, the router/firewall 504 may need to be adjusted to permit the ATA 514 to access to the public network 522. Existing phone numbers are ported from the public switched telephone network (PSTN) 527 to the VOIP service, and then voice calls (using the existing phone numbers) take place over the broadband connection (the broadband access network 520) and the public network 522 (e.g., the Internet), and terminate at the PSTN via a VOIP gateway 526. In addition to facilitating VOIP services, the TELQO bridge 505 also proactively monitors the resulting voice quality and broadband connection quality (e.g., to identify service issues), and optimizes voice quality over broadband connections that may suffer from substantial packet loss (e.g., conventional broadband connections under congested network conditions).

FIGS. 6-9 illustrate different network architectures for implementing TELQO functionality and features, in accordance with various example embodiments.

Figure 6:
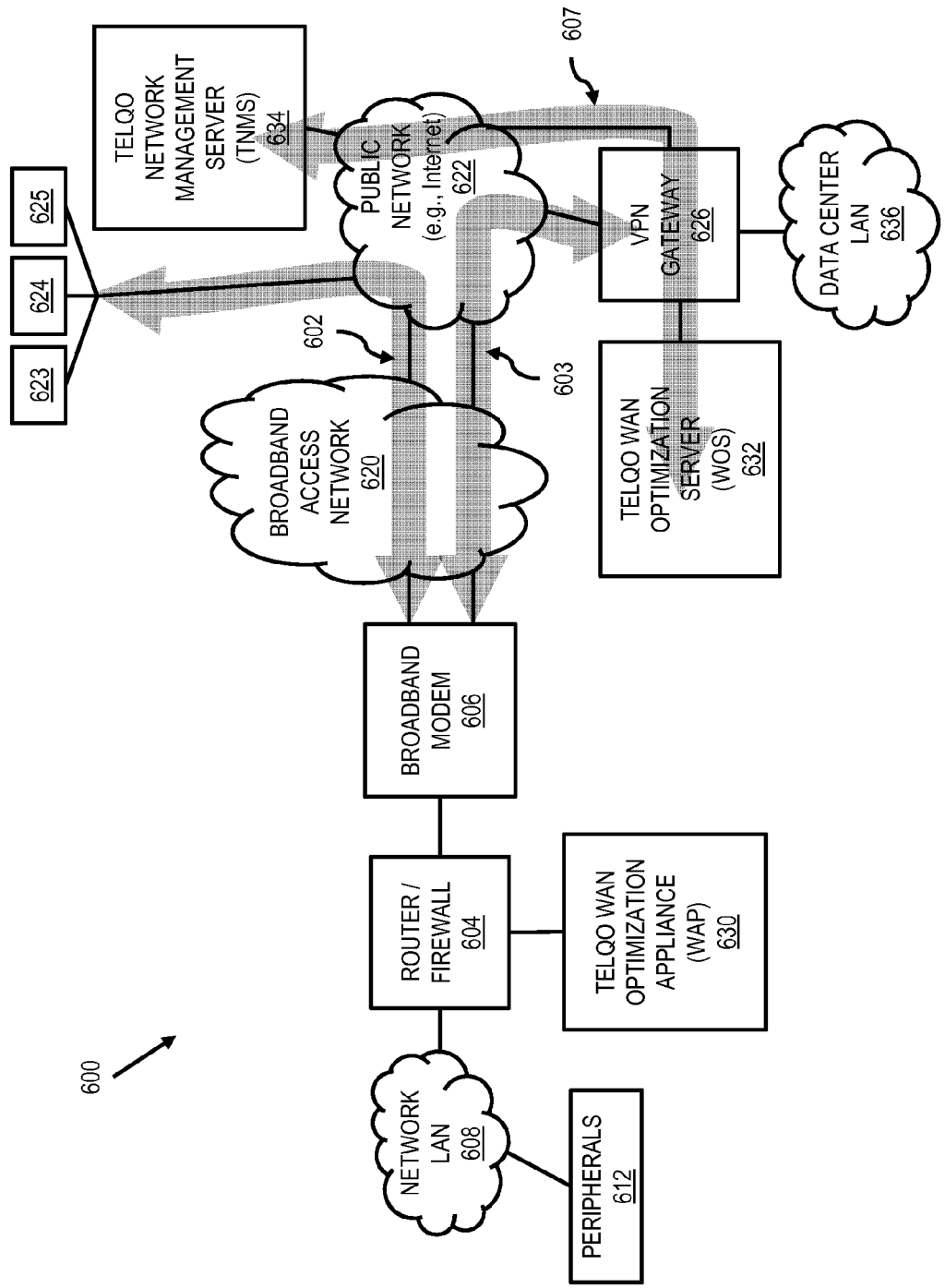
FIG. 6 illustrates a network (e.g., an enterprise or small/medium enterprise (SME) network), including targeted extra latency quality of service overlay functionality that augments an existing broadband network via a WAN optimization appliance, which supports both peered and peerless tunnel connections, in accordance with example embodiments.

FIG. 6 illustrates a network 600 (e.g., an enterprise or small/medium enterprise (SME) network), including TELQO functionality that augments an existing broadband network via a WAN optimization appliance, which supports both peered and peerless tunnel connections, in accordance with example embodiments. With reference to FIG. 6, in accordance with an example embodiment, peered TELQO functionality is added to the router/firewall 604 (e.g., an enterprise-grade branch-office router/firewall), where the network 600 supports one or more peered tunnels 603 (e.g., an IPSEC tunnel), via the public network 622, to the VPN gateway 626. The interface to the VPN gateway 626 can be over-engineered such that the aggregate offered load does not significantly affect end-to-end latency or packet loss. In accordance with a further example embodiment, peerless TELQO functionality may be added to the router/firewall 604, where the network 600 also supports one or more peerless tunnels 602 (e.g., a split tunnel), via the public network 622, to the Internet sites 623, 624, 625. Further, the peerless TELQO functionality may be useful by itself (e.g., where there is no IPSEC VPN, which is basically equivalent to the IPSEC VPN case where all of the traffic is split tunnel traffic).

According to the example network 600, the TELQO WAN optimization appliance (WAP) 630 has a single Ethernet interface connecting the WAP 630 to the router/firewall 604 LAN interface, where a pair of upstream and downstream VLANs (e.g., network LAN 608 and data center LAN 636) are configured on the interface. The network LAN 608 provides network access, for example, to the peripherals 612 (e.g., computer or server, printers, and other such peripherals). Further, the policy based routing of the router/firewall 604 is configured to forward: (1) packets which ordinarily would be forwarded upstream thru an IPSEC tunnel to the TELQO WAP 630 via the downstream VLAN prior to IPSEC encryption; (2) packets received from the upstream VLAN (from the WAP 630) through the IPSEC tunnel (being IPSEC encrypted in the process); (3) packets received via the IPSEC tunnel, which are routed to the WAP 630 via the upstream VLAN (after being IPSEC decrypted); (4) packets received via the IPSEC tunnel, which ordinarily would be forwarded from a LAN port to the WAP 630 via the upstream VLAN (after being IPSEC decrypted); and (5) packets received via the downstream VLAN to the appropriate LAN port. Moreover, when the TELQO WAP 630 cannot or does not respond to the appropriate next hop checks initiated by the VPN router/firewall 604, the router/firewall 604 may be configured to skip such rules of the policy-based routing (e.g., to disable or bypass the TELQO functionality in the event of a failure of the WAP 630).

By way of example, the TELQO WAP 630 functions as a transparent traffic bridge between the upstream and downstream VLANs (e.g., except, potentially, in the case of traffic shaping functions), which may be accomplished by means of raw-mode socket operations. The WAP 630 may also be configured to employ dynamic host configuration protocol (DHCP) on the upstream VLAN to obtain an IP address for communicating with the TELQO WAN optimization server (WOS) 632. Further, the WAP 630 initiates and manages the TELQO Probe Transactions, for example, exchanging probe packets with a TELQO server process on the WOS 632 (e.g., on an as needed basis) to measure the one-way latency in both directions between itself and a TELQO peerless server. Based on the measured latency, the WAP 630 initiates and manages the TELQO Set-Rate Transactions, exchanging set-rate packets with the WOS 632 to control the rate at which the WOS 632 transmits data through the tunnels 602 to the WAP 630. The WAP 630 may also implement a management tunnel protocol, facilitating network management communications, for example, by means of management traffic exchanged with one or more TELQO network management servers (TNMS) 634. For example, the WOS 632 interfaces with the TNMS(S) 634 via one or more network management tunnels 607 (e.g., over the public network 622), which facilitate the exchange of network management traffic between the WOS 632 and the TNMS(S) 634, and between the WAP 630 and the TNMS(S) 634 (via the WOS 632). Other functions of the WAP 630 may comprise generation of performance log files (e.g., ASCII comma separated value files) for network management purposes, periodic generation of status variables (e.g., ASCII comma separated value variables) for simple network management protocol (SNMP) accessibility, and periodic reading of environment configuration files (e.g., in ASCII .INI formats).

The WOS 632 interacts with the VPN gateway 626 in an analogous fashion to the interaction of the WAP 630 with the VPN Router/Firewall 604. In that regard, the WOS 632 has an Ethernet interface connecting the WOS 632 to the VPN gateway 626 (e.g., via an appropriate data-center VLAN 636 Ethernet switch), where a pair of upstream and downstream VLANs are configured on the interface. The policy based routing of the VPN gateway 626 is configured to facilitate access of the WOS 632 to packets before being IPSEC encrypted and transmitted downstream, and after being IPSEC encrypted and upon being received upstream. Further, the VPN gateway 626 may likewise be configured to skip the policy-based routing in the event of a failure of the WOS 632.

Moreover, the WOS 632 can support multiple (e.g., hundreds) of TELQO WAPs 630, each with an associated IPSEC tunnel. By way of example, a TELQO WAP 630 may employ a management interoperability protocol (e.g., signed User Datagram Protocol (UDP) packets carrying initialization file (.INI) file format parameters) to provide the WOS 632 with parameters for identifying the downstream packets that are destined for the WAP 630 via the respective IPSEC tunnel, for identifying the upstream packets that are received from the WAP 630 via the respective IPSEC tunnel, and for classifying and traffic shaping IP flows headed downstream to the WAP 630 via the respective IPSEC tunnel.

By way of example, the WOS 632 may be configured to support multiple private networks and multiple VLAN pairs (e.g., with one process per VLAN pair). The WOS 632 also performs a transparent bridging function (with traffic shaping) between the upstream and downstream VLAN interfaces (e.g., by means of raw-mode socket operations). Further, the WOS 632 handles the TELQO probe and TELQO Set-Rate Transactions from the WAP(s) 630. Additionally, based on initial interaction with the WAP(s) 630, the WOS 632 generates format configuration files for each WAP 630, which may include information that allows the WOS 632 to identify the WAP 630 from which upstream packets are received and to which a downstream packet is destined. Also, the WOS 632 similarly may be configured to periodically generate performance log files (e.g., for network management purposes), periodically generate ASCII CSV status variables (e.g., for simple network management protocol (SNMP) accessibility), and periodically read environment format configuration files.

Figure 7:
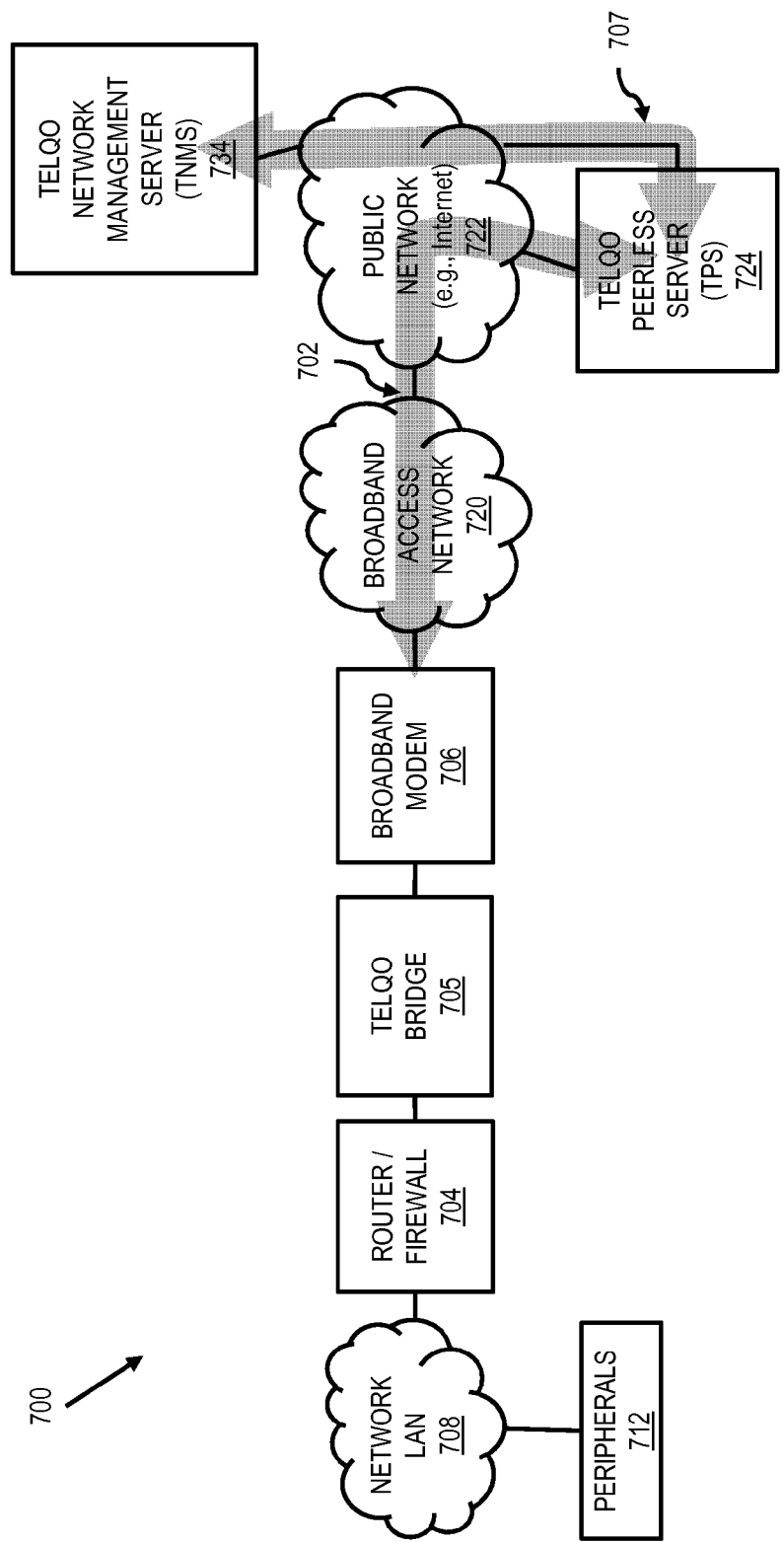
FIG. 7 illustrates a network (e.g., an enterprise or small/medium enterprise (SME) network), including targeted extra latency quality of service overlay functionality that augments an existing broadband network via a network bridge, which supports peerless tunnel connections, in accordance with example embodiments.

FIG. 7 illustrates a network 700 (e.g., an enterprise or small/medium enterprise (SME) network), including TELQO functionality that augments an existing broadband network via a network bridge, which supports peerless tunnel connections, in accordance with example embodiments. With reference to FIG. 7, in accordance with an example embodiment, peerless TELQO functionality is added to an existing broadband network connection, where the network 700 supports one or more peerless tunnels 702 to the TELQO peerless server (TPS) 724, via the public network 722. As in the networks 500a and 500b (FIGS. 5A and 5B), a TELQO bridge 705 is positioned between the existing router/firewall 704 and the broadband modem 706. The network LAN 808 provides network access, for example, to the peripherals 812 (e.g., computer or server, printers, and other such peripherals).

The TELQO bridge 705 functions in similar respects as to the WAP 630 of the network 600 (FIG. 6). The bridge 705 transparently bridges (except, possibly, for traffic shaping functions) packets between the router/firewall 704 and the broadband access modem 706, handling ordinary IP over Ethernet. Additionally, the TELQO bridge 705 may also handle point-to-point protocol over Ethernet (PPPoE). The TELQO bridge 705 employs DHCP, when appropriate, to obtain an IP address for communication with the TPS 724, and, when this is not feasible, the bridge 705 alternatively determines a working IP address, and uses that IP address for the exchange of UDP packets with the TPS 724. Further, as with the WAP 630, the TELQO bridge 705 initiates and manages TELQO probe and Set-Rate Transactions. For Probe Transactions, the bridge 705 exchanges probe packets with the TPS 724 to determine the latency to and from the TPS 724. The TELQO bridge 705 also implements a management tunnel protocol, facilitating network management communications with one or more TELQO network management servers (TNMS) 734. For example, as with the network 600 (FIG. 6), the TPS 724 interfaces with the TNMS(S) 734 via one or more network management tunnels 707 (e.g., over the public network 722), which facilitate the exchange of network management traffic between the bridge 705 and the TNMS(S) 734 (via the TPS 724). Additionally, according to an example embodiment, the TELQO bridge 705 is configured with a list of TPSs, whereby, on startup, the bridge 705 interacts with all of the configured TPSs to determine the one with the lowest round-trip latency. The TELQO bridge 705 can thereby fall back to other TPSs in the list should interactions fail with the selected TPS.

Figure 8:
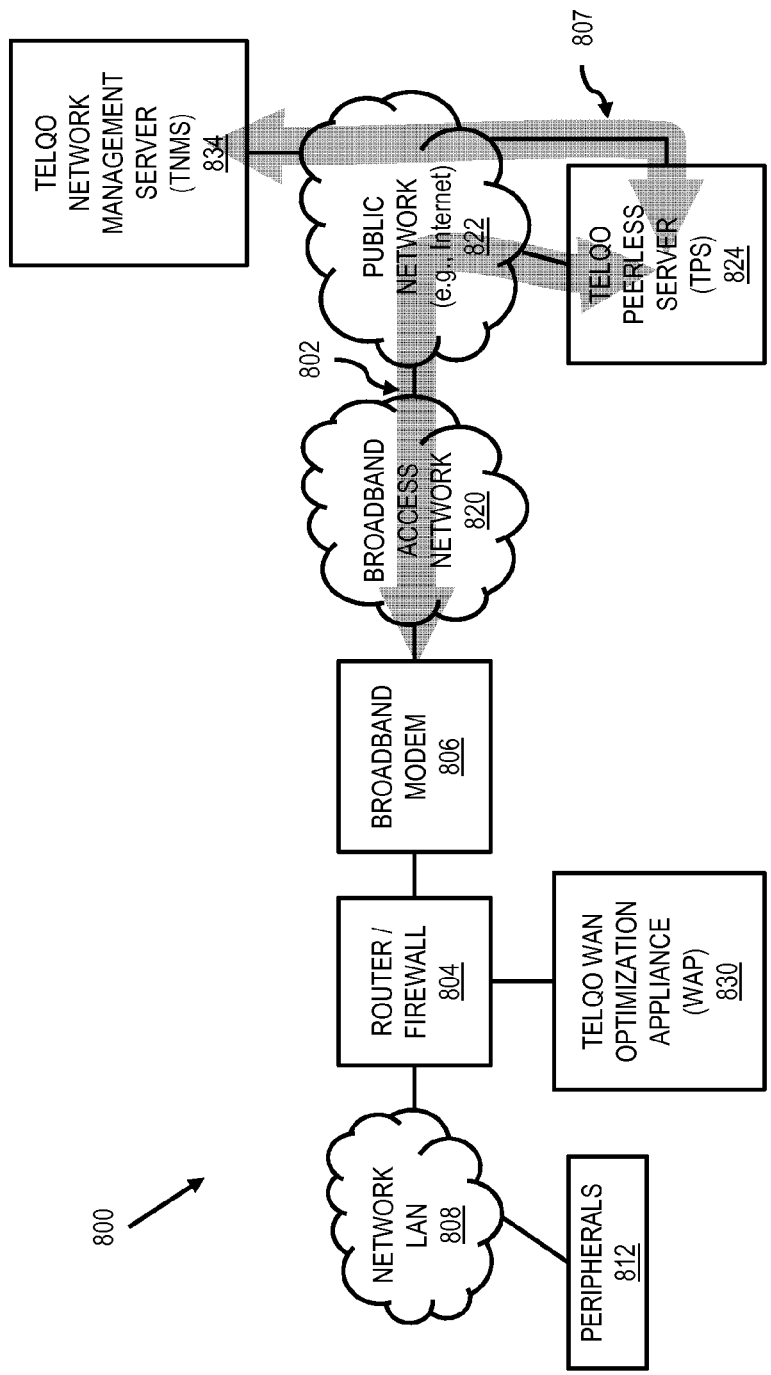
FIG. 8 illustrates a network (e.g., an enterprise or small/medium enterprise (SME) network), including targeted extra latency quality of service overlay functionality that augments an existing broadband network connection via a WAN optimization appliance, which supports peerless tunnel connections, in accordance with example embodiments.

FIG. 8 illustrates a network 800 (e.g., an enterprise or small/medium enterprise (SME) network), including TELQO functionality that augments an existing broadband network connection via a WAN optimization appliance, which supports peerless tunnel connections, in accordance with example embodiments. With reference to FIG. 8, in accordance with an example embodiment, peerless TELQO functionality is added to an existing broadband network connection, where the network 800 supports one or more peerless tunnels 802 to the TELQO peerless server (TPS) 824, via the public network 822. As in the network 600 (FIG. 6), a TELQO WAN optimization appliance (WAP) 830 augments the router/firewall 804. The TELQO WAP 830 comprises a single Ethernet interface which communicates with a LAN interface of the router/firewall 804, where, as in the network 600, a pair of upstream and downstream VLANs are configured on the interface. The network LAN 808 provides network access, for example, to the peripherals 812 (e.g., computer or server, printers, and other such peripherals). Further, the policy based routing of the router/firewall 804 is configured to forward: (1) packets which ordinarily would be forwarded from the WAN port of the router/firewall 804 to the WAP 830 via the downstream VLAN; (2) packets received from the WAN port of the router/firewall 804 via the upstream VLAN; (3) packets received by the WAP 830 from the WAN port of the router/firewall 804 via the upstream VLAN; (4) packets received by the WAP 830 from the WAN port of the router/firewall 804, which are ordinarily forwarded from a LAN port to the WAP via the upstream VLAN; and (5) packets received from the downstream VLAN to the appropriate LAN port.

By way of example, similar to the WAP 630 and the bridge 705, the WAP 830 transparently bridges (except, possibly, for traffic shaping functions) packets between the upstream and downstream VLANs, employs DHCP on the upstream VLAN to obtain an IP address for communication with the TPS 824, initiates and manages TELQO probe and Set-Rate Transactions, and implements a management tunnel protocol, facilitating network management communications with the network management server(s). For example, as with the network 600 (FIG. 6), the TPS 824 interfaces with the TNMS(S) 834 via one or more network management tunnels 807 (e.g., over the public network 722), which facilitate the exchange of network management traffic between the WAP 830 and the TNMS(S) 834 (via the TPS 824). Additionally, according to an example embodiment, similar to the TELQO bridge 705, the WAP 830 is configured with a list of TPSs, whereby, on startup, the bridge 705 interacts with all of the configured TPSs to determine the one with the lowest round-trip latency. The TELQO bridge 705 can thereby fall back to other TPSs in the list should interactions fail with the selected TPS.

The TELQO WAP 830 comprises a single Ethernet interface which communicates with a LAN interface of the router/firewall 804, where, as in the network 600, a pair of upstream and downstream VLANs are configured on the interface. The network LAN 808 provides network access, for example, to the peripherals 812 (e.g., computer or server, printers, and other such peripherals). Further, the policy based routing of the router/firewall 804 is configured to forward: (1) packets which ordinarily would be forwarded from the WAN port of the router/firewall 804 to the WAP 830 via the downstream VLAN; (2) packets received from the WAN port of the router/firewall 804 via the upstream VLAN; (3) packets received by the WAP 830 from the WAN port of the router/firewall 804 via the upstream VLAN; (4) packets received by the WAP 830 from the WAN port of the router/firewall 804, which are ordinarily forwarded from a LAN port to the WAP via the upstream VLAN; and (5) packets received from the downstream VLAN to the appropriate LAN port.

Figure 9:
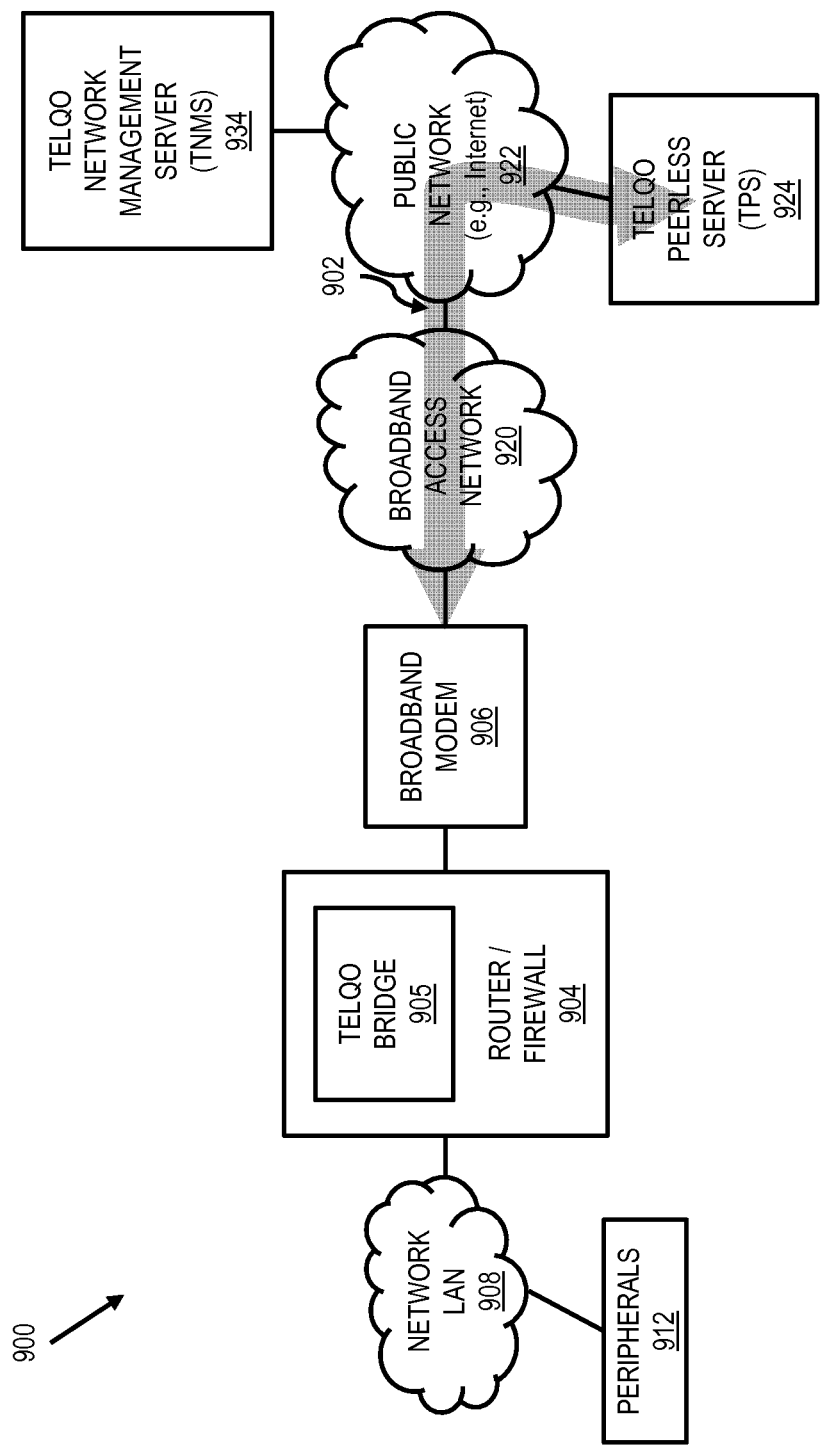
FIG. 9 illustrates a network (e.g., an enterprise or small/medium enterprise (SME) network), including targeted extra latency quality of service overlay functionality that augments an existing broadband network connection via a network bridge integrated within a network router/firewall, which supports peerless tunnel connections, in accordance with example embodiments.

FIG. 9 illustrates a network 900 (e.g., an enterprise or small/medium enterprise (SME) network), including TELQO functionality that augments an existing broadband network connection via a network bridge integrated within a network router/firewall, which supports peerless tunnel connections, in accordance with example embodiments. With reference to FIG. 9, in accordance with an example embodiment, peerless TELQO functionality is added to an existing broadband network connection, where the network 900 supports one or more peerless tunnels 902 to the TELQO peerless server (TPS) 924, via the public network 922. In the network 900, the TELQO bridge 905 is integrated into the router/firewall 904. Moreover, when integrated with the router/firewall 904, the TELQO bridge software management functions are integrated with the router/firewall management, and thus no tunneling of management traffic occurs through the TPS 924.

Figure 10:
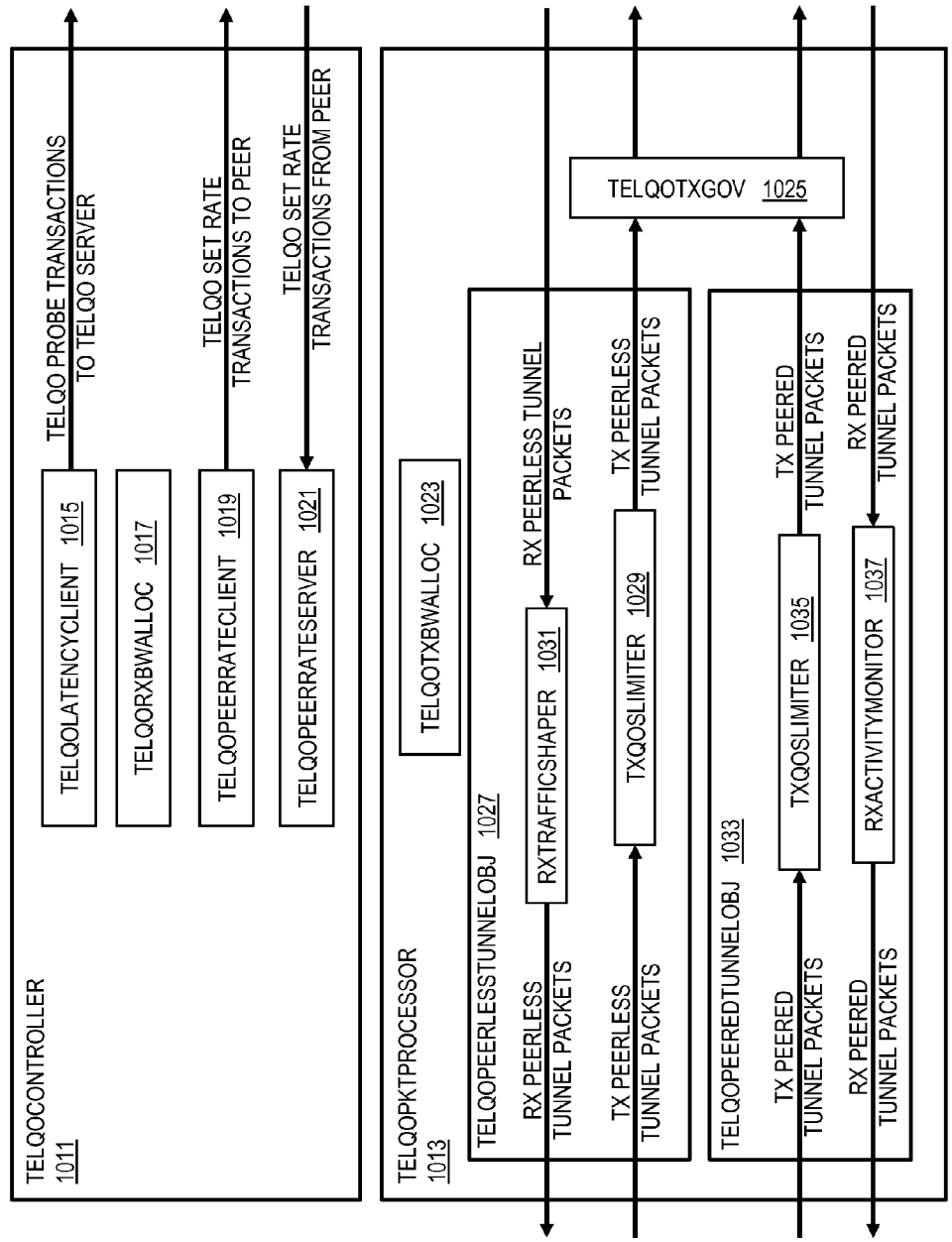
FIG. 10 illustrates an example structure for the organization of various components or modules (e.g., software components or objects) for implementing the TELQO functionality, according to example embodiments.

FIG. 10 illustrates an example structure for the organization of various components or modules (e.g., software components or objects) for implementing the TELQO functionality, according to example embodiments. With reference to FIG. 10, at a high level, the TELQO functionality is implemented, for example, within a TELQO bridge (e.g., bridge 505, 705, 905) or TELQO WAP (e.g., WAP 630, 830) via two components (e.g., modules or software/firmware objects, or a combination thereof)—a control module (e.g., the TelqoController 1011) and a packet processing module (e.g., the TelqoPktProcessor 1013). The TelqoController module is typically less real-time sensitive (e.g., no per-packet processing), and thus may run as an operating system user process (e.g., a LINUX user process). The TelqoPktProcessor is typically relatively real-time sensitive (e.g., including per packet processing, such as prioritization, rate governing, etc.), and thus may run either within the same process as the TelqoController, and (when appropriate—e.g., for more real-time sensitive processes) run within a kernel module (e.g., as a set of NetFilter hooks). By way of example, the TelqoController may consist of a socket application that exchanges TELQO probe packets with a TELQO gateway bridge (e.g., bridge 532), TELQO WOS (e.g. WOS 632), or TPS (e.g., TPS 724, 824, 924). The TelqoController initiates network latency measurements, and determines and adjusts target transmit and receive rates. By way of further example, the TelqoPktProcessor may be composed of LINUX NetFilter type modules, which operate in real time on packets prior to transmission and after receipt via the WAN interface of the router/firewall (e.g., router/firewall 504, 604, 704, 804, 904). Further, the TelqoPktProcessor may operate as a transparent raw-mode socket bridge application (e.g., between a virtual WAN Ethernet interface and the actual WAN Ethernet interface).

By way of further example, the TelqoController 1011 includes a TELQO Latency Measurement Client (TelqoLatencyClient 1015), a TELQO Receive Bandwidth Allocator (TelqoRxBwAlloc 1017), a TELQO Set-Peer-Rate-Limit Client (TelqoPeerRateClient 1019), and a TELQO Set-Peer-Rate-Limit-Server (TelqoPeerRateServer 1021). The TelqoLatencyClient interacts with a TELQO server to maintain clock synchronization, measure one-way network latency, and determine the target transmit rate and target receive rate and provide these rates to the bandwidth allocators. This module may be optional when in the Over-Engineered mode, wherein the target transmit rate would default to an infinite rate. The TelqoRxBwAlloc allocates receive bandwidth among the multiple tunnels. This module may also be optional when the broadband connection is Over-Engineered. There typically would be one TelqoPeerRateClient per peered tunnel, where each such module sets the transmit limit for the respective peer, such as by initiating TELQO Set-Peer-Rate-Limit transactions, on an as needed basis. This module may be optional when the peer is operating in an Over-Engineered mode. There typically would also be one TelqoPeerRateServer module per peered tunnel, where each such module obtains from the peer the transmit rate that will govern transmissions to the peer.

The TelqoPktProcessor 1013 includes a TELQO Transmit Bandwidth Allocator (TelqoTxBwAlloc 1023), a TELQO Peerless Tunnel module (TelqoPeerlessTunnelObj 1027), a TELQO Peered Tunnel module (TelqoPeeredTunnelObj 1033), and a TELQO Transmit Governor (TelqoTxGov 1025). The TelqoTxBwAlloc allocates transmit bandwidth among the multiple tunnels. It is also typically real-time intensive, operating periodically at a high frequency (such as 100 to 1000 times per second), where each such period typically requires interactions with each TxQOSLimiter module and with the TelqoTxGov. The TelqoPeerlessTunnelObj 1027 is responsible for transmit QOS prioritization and throughput limiting, and for receive traffic shaping for the traffic of a single peerless tunnel, where there typically would be one such module for each peerless tunnel. Further, the TelqoPeerlessTunnelObj 1027 will include a TxQOSLimiter 1029, which performs transmit limiting and prioritization of traffic being sent to the device to the limit provided by the TelqoTxBwAlloc, and a RxTrafficShaper 1031, which performs traffic shaping for received traffic to keep it under the limit assigned by the TelqoRxBwAlloc. The TelqoPeeredTunnelObj 1033 is responsible for transmit QOS prioritization and throughput limiting for traffic being carried by the broadband connection across a single peered tunnel (e.g., a VPN tunnel), where there typically would be one such module for each peered tunnel. Further, the TelqoPeeredTunnelObj 1033 will include a TxQOSLimiter 1035, which performs transmit limiting and prioritization of traffic being sent to the device to the limit provided by the TelqoTxBwAlloc, and a RxActivityMonitor 1037, which classifies received packets and counts packets and bytes by classification (which counts can be used by the TelqoRxBwAlloc)—this module is optional when operating in an Over-Engineered mode. The TelqoTxGov 1025—this module is typically a final check that is responsible for keeping the transmission rate under the Target Transmit Rate, and is optional and typically only required when there are multiple tunnels and the broadband connection is not Over-Engineered.

According to one example embodiment, the TELQO functionality operates to measure network latency and to set network target transmit and receive rates via Probe and Set-Rate Transactions. Probe transactions are initiated to obtain/maintain clock synchronization and to measure one-way network latency. Set-Rate Transactions are initiated to set the transmit rate limit of a TELQO peer, and to set its maximum ungoverned classification. Relatively frequent initiation of Probe Transactions enhances synchronization performance, and provides relatively frequent network latency measurements. On the other hand, initiating Probe Transactions relatively frequently adversely affects available bandwidth, and may result in the transmission of probe requests when either direction of the link is asymmetrically congested, which can drive the Os(t) off in the direction of the asymmetry. Therefore, according to example embodiments, typically results of a timing request Probe Transaction which have a s relatively short round trip time are used for adjusting Os(t).

By way of example, a Probe Transaction and a Set-Rate transaction typically utilizes two UDP packets operating according to a client/server model. A TELQO Probe Transaction, for example, provides a client with a Cl(req), a Cr(req) and a Cl(resp) measurement. These measurements are used to obtain/maintain clock synchronization and to determine one-way latency in both the transmit and receive directions. Further, typically there are no retransmissions of packets within a Probe or Set-Rate Transaction, and a timeout can be used to determine the loss of a Probe Reply. A TELQO peer, upon completing initialization of a tunnel, or upon finding that its peer has changed its incarnation number, needs to relatively expeditiously obtain its transmit rate limit. Accordingly, such a TELQO peer periodically sends initiate Set-Rate Transaction requests until it receives a valid Set-Rate Request packet. The reception of an Initiate Set-Rate Transaction packet triggers a TELQO peer to initiate a Set-Rate Transaction.

By way of further example, for the Probe Transactions, probe packet format can be used both for probe-transaction packets (e.g., between a TelqoLatencyClient and a TelqoServer) and for set-peer-rate packets (e.g., between a TelqoPeerRateClient and TelqoPeerRateServer). A probe packet, for example, can be a UDP packet carrying certain fields compacted together in network byte order as with a similar packet structure for a QOS packet, where the fields of such a probe packet may comprise:

(1) a Tag field (e.g., 4 bits), which provides an indication as to whether the packet is a TELQO probe packet;
(2) a Sender ID field (e.g., 32 bits), which uniquely identifies the sender of the packet (e.g., ordinarily an IPv4 address that is unique to the sender), which (for a TelqoLatencyClient) comprises the management IP address of the node, and (for a TELQO Server on the public network) comprises a public IP address, and (for a TELQO Server residing within a data-center node) comprises the management IP address for that node;
(3) an Incarnation Number field (e.g., 32 bits), which uniquely identifies when the Timestamp field was last initialized (e.g., ordinarily this is the UNIX time_t value of when the sending application (TelqoLatencyClient or TELQO Server) was started), whereby, when the incarnation number of a server changes, the receiving TelqoLatencyClient restarts synchronization;
(4) a Timestamp field (e.g., a free-running, roll-over timestamp, such as a 32 bit millisecond timer), containing the time when the respective packet was transmitted—e.g., for a Set-Rate-Request packet, the Timestamp field comprises the required transmit bit rate (e.g., bits-per-second) and the maximum traffic classification to be transmitted ungoverned, and, for a Set-Rate-Reply packet, the Timestamp field comprises the Timestamp field from the corresponding set-rate request packet;
(5) a Request/Reply Flag field (e.g., 8 bits), which indicates whether the packet is a request or a reply;
(6) a Peer OoS/Lost field (e.g., 8 bits), which comprises a rollover counter reflecting the number of packets from a peer that were lost or arrived out-of-sequence, with respect to the particular transaction;
(7) a Transaction Sequence Number field (e.g., 8 bits), which comprises a rollover counter identifying the transaction, where the same value is used for each of the request, reply and reply acknowledge for a one transaction; and
(8) a Security Checksum field (e.g., 64 bits), which is used by the recipient to detect unauthorized packets and to identify and defend against denial of service attacks.

In a Probe Transaction, for example, the TelqoLatencyClient controller regulates its transmission of request probes that are sent to maintain clock synchronization and to ensure that clock synchronization typically utilizes no more than 1% overall bandwidth over the long-term, for example. Also, while the first-order clock drift parameter is being characterized (e.g., for the first hour of operation), the usage typically can be higher. In a Probe Transaction, except after link initialization, the TelqoLatencyClient, controller typically tracks the number of bytes transmitted and sends and initiates a probe request for clock synchronization purposes typically when the following has occurred: it has been at least a certain predetermined number of milliseconds since the previous clock synchronization transaction completed (or timed out), and there has been at least a minimum clock slip-poll-traffic to poll-usage ratio (e.g., default=100 times) of as many bytes transmitted as those of a request probe packet (e.g., including estimated IPSEC and link level overhead) since the previous transaction. Also, the inter-transaction wait timer for measuring Probe Transactions typically is restarted whenever the TelqoLatencyClient, controller has a set of Cl and Cr measurements to process, that is, when a Probe Transaction has completed. Also, TelqoLatencyClient, controller typically maintains the minimum clock request/reply time (or reply/reply acknowledge time) over the last hour and can utilize measurements of a transaction for the purpose of updating clock synchronization, such as when that measurement is within a margin (e.g., default=20 ms) of the minimum clock request/reply time.

Depending on the variability of the measured first-order drift D values, a TelqoLatencyClient, controller typically can force accurate low-latency measurements whenever a relatively sufficient predetermined time has progressed without a usable set of measurements being taken that the expected error of the first order clock synchronization exceeds a target clock error period before a next clock sync probe (e.g., default=5 ms). The expected error due to second order effects can be considered to be a default test Dn error percent (e.g., default=5%) of the first-order Dn value. The TelqoLatencyClient, controller in Probe Transaction latency measurements can also target the next usable clock sync Probe Transaction in a similar fashion. The TelqoLatencyClient controller typically targets kicking off such a transaction when a duration of a default target next measurement percent (e.g., default=24%) of the time to the next force low latency time has elapsed since the previous usable measurement. Transactions are typically initiated once every unusable measurement gap period (e.g., default=3000 ms) when measurements are unusable and the target time for a measurement has occurred.

Further, a TelqoLatencyClient controller typically can force relatively accurate low-latency measurements, such as by reducing its target transmit rate and target receive rate to a crawl. Probe packets, set-rate packets and real-time packets, however, are typically exempt from these rate limits. The TelqoLatencyClient controller typically maintains these reduced rates as long as needed for it to attempt ten quick time synchronization Probe Transactions, for example. As a result, the TelqoLatencyClient controller typically uses the transaction with the lowest round trip time to adjust Os and to be its new minimum round-trip time, such as for determining the latency parameters.

In accordance with example embodiments, in order to measure one-way latency, such as for Probe Transactions, the clocks used to timestamp packets measuring one way latency in the VPN router and VPN gateway must be synchronized, to the extent that relatively large one-way latency can be identified and adjusted, such as to control the rate of traffic flow over tunnels. For example, the clocks typically should be adjusted to be accurate to within approximately 20 milliseconds. As to clock synchronization for probe and rate setting in networks, the following explanation of terminology for clock synchronization is provided, such as in relation to determining the latency parameters, although the relations and terminology are by way of example only, and should not be construed in a limiting sense. Such example terminology used for the described relations as can be used to quantitatively determine clock synchronization, are as follows (a lower case t indicates a specific point of time):

(1) Cl(t): The local router/gateway maintains a 32-bit millisecond counter (Cl) that counts the number of milliseconds since the router/gateway was rebooted (rolling over as necessary), and the counter must not be adjusted by changes to the calendar clock, and the value Cl(t) holds the value of that counter at time t.

(2) Cr(t): The TELQO Server maintains a 32-bit millisecond counter (Cr) that counts the number of milliseconds since the router/gateway was rebooted, and the value Cr(t) holds the value of that counter at time t.

(3) Cs(t): The TelqoLatencyClient maintains a 32-bit millisecond counter which is synchronized (Cs) as well as possible to the clock of the TELQO Server (Cr).

(4) Os(t): The TelqoLatencyClient maintains a 32-bit timer offset (Os) which when added to Cl(t) produces the synchronized time (Cs(t)), and thus Cs(t)=Cl(t)+Os(t), and when Os(t) is substantially perfect (such as relatively zero) then Cs(t)=Cr(t).

The initialization and maintenance of Os(t), by the TelqoLatencyClient, reflects an important part of the clock synchronization. Also, if the clocks of the router and gateway have not drifted, Os(t) can be a constant after being properly initialized. By way of example, the TelqoLatencyClient initializes its Os(t), such as by transmitting multiple request probe packets to its TELQO Server and processing the responses, where Cl(req) reflects the value of Cl when the request is sent by the gateway/router, Cl(resp) reflects the value of Cl when the response is received by the gateway/router, and Cr(req) reflects the value of Cr when the request is received by the gateway. Ideally, the one-way latency for the request typically can be equal to the one-way latency for the response and, thus, the time of Cr(req) is half way between Cs(req) and Cs(resp). Accordingly, $$Cr(req)=Cs(req)+(Cs(resp)-Cs(req))/2, \text{and} \qquad (1)$$

$$Cr(req)=Cl(req)+Os(req)+(Cl(resp)+Os(resp)-Cl(req)-Os(req))/2 \qquad (2)$$

Further, because Os typically changes slowly over time (e.g., as the clocks drift), effectively Os(resp)=Os(req), and as such:

$$Cr(req)=Cl(req)+Os(req)+(Cl(resp)-Cl(req))/2 \qquad (3)$$

$$Cr(req)=Cl(req)/2+Os(req)+Cl(resp)/2 \qquad (4)$$

$$Os(req)=Cr(req)-(Cl(req)+Cl(resp))/2 \qquad (5)$$

In the case of a relatively instantaneous network (where Cl(req)=Cl(resp)), the relations for clock synchronization can be expressed, for example, as follows:

$$Os(req)=Cr(req)-Cl(req), \text{and} \qquad (6)$$

$$Cr(t)=Cl(t)+Os(t). \qquad (7)$$

If the two clocks did not drift significantly, then for clock synchronization, updating Os(t) can be implemented with a zero-th order difference equation, for example, as follows:

$$Os(t_{n+1})=Os(t_n)+F(Os(t_n),Cr(req),Cl(req),Cl(resp)), \qquad (8)$$

where Cr(req), Cl(req) and Cl(resp) reflect their most recent values, and where the F function addresses any measurement error and the minor drift.

If the two clocks drift significantly, but the rate of drift is relatively constant, then for clock synchronization updating Os(t) can be with a first-order difference equation, for example, as follows:

$$Os(t_{n+1})=Os(t_n)+D_n*(t_{n+1}-t_n)+F(Os(t_n),Cr(req),Cl(req),Cl(resp)), \qquad (9)$$

where Cr(req), Cl(req) and Cl(resp) reflect their most recent values, and where the F function addresses any initial error and the minor drift, and where $D_n$ (based on long term measurements coming from the timing requests) addresses the constant drift.

If the two clocks drift significantly, but the rate of drift changes by a slow constant, then for clock synchronization updating Os(t) can be with a second order difference equation, for example, as follows:

$$Os(t_{n+1})=Os(t_n)+D_n*(t_{n+1}-t_n)+A_n*(t_{n+1}-t_n)^2+F(Os(t_n),Cr(req),Cl(req),Cl(resp)), \qquad (10)$$

where Cr(req), Cl(req) and Cl(resp) reflect their most recent values, where the F function addresses any initial error and the minor drift, where $D_n$ (based on long term measurements coming from the timing requests) addresses the constant drift, and where $A_n$ (based on medium term measurements coming from timing requests) addresses changes in D over time.

The existence of clocks with a drift of hundreds of parts per million typically can necessitate the use of a first-order relations model and the long term tracking of the D value to validate the relations model. Also, the level and complexity of relations for clock synchronization can depend on various factors, such as required accuracy for clock synchronization, extent of the drift of each clock and the extent of changes of that drift over time, and the frequency of complete usable clock synchronization Probe Transactions.

In measuring latency, the Os(t) is typically adjusted between usable Probe Transactions. Such adjustment can use, for example, the first order difference equation (9) to adjust Os(t) between timing requests, and to reduce the timing request frequency for the Probe Transactions, for example, as follows:

$$Os(t_{n+1})=Os(t_n)+D(t_n)*(t_{n+1}-t_n)+F(Os(t_n),Cr(req),Cl(req),Cl(resp)), \qquad (11)$$

where Cr(req), Cl(req) and Cl(resp) reflect their most recent values, where the F function addresses any initial error and the minor drift, and where $D(t_n)$ reflects measured drift relative to a previous time period (e.g., a one hour time period); and where, between timing measurements, the relation can typically be simplified, for example, to:

$$Os(t_{n+1})=Os(t_n)+D(t_n)*(t_{n+1}-t_n)+F(Os(t_n),Cr(req),Cl(req),Cl(resp)), \qquad (12)$$

where $t_n$ reflects the time of the most recent usable Cr(req), Cl(req) and Cl(resp).

Following startup, $D(t_n)$ can be calculated or determined relative to the first measurement, and measurements are required more frequently (e.g., at least once a minute, for example) during the first hour. As $D(t_n)$ is more accurately characterized, the frequency of Probe Transactions can be reduced. Typically, when a branch office router is first provisioned Probe Transactions are relatively frequent up until D is sufficiently well characterized.

By way of example, as to clock synchronization, various state machines can implement the processing of a TELQO controller component. The TelqoLatencyClient or Clock Synchronization state can monitor the status of the clock synchronization of a TelqoLatencyClient, such as with a TELQO Server. Further, the TelqoLatencyClient, for example, takes on one of the following states:

(1) Unreachable Server—when in this state, the TELQO server, if one is required, is not responding to Probe Requests. In this state, a TelqoLatencyClient sets its target transmit rate and target receive rate an effectively unlimited rate and periodically initiates Probe Transactions. Upon successful completion of three consecutive Probe Transactions a TelqoLatencyClient transitions to the Initial Clock Synchronization state;

(2) Initial Clock Synchronization—when in this state, a TelqoLatencyClient clamps its target transmit rate and target receive rate to a very low value (thus inducing a lightly-loaded condition) and initiates a series of Probe transactions. Upon completion of a large enough fraction of the Probe Transactions, a TelqoLatencyClient transitions to the Uncalibrated Drift State, and a direct transition can be allowed to the steady state provided persistent storage of the Dn is available and the Dn has been stable over long periods of time;

(3) Uncalibrated Drift State—when in this state, a TelqoLatencyClient keeps a reasonably steady stream of clock synchronization transactions going (e.g., once every 20 seconds) and forces low-latency transactions should no transactions complete which allow for clock synchronization updates within a relatively short period of time (e.g., once every 2 minutes). Also while in this state, when traffic is flowing, TelqoLatencyClient initiates latency measurement Probe Transactions, on an as needed basis, to properly control the target transmit and target receive rates. A TelqoLatencyClient transitions to the steady state a long enough period of time with clock synchronization updates has completed to allow operation in Steady State;

(4) Steady State—when in this state, a TelqoLatencyClient keeps a relatively sufficient amount of clock synchronization transactions going to keep the clocks adequately synchronized and to avoid, where possible, a transition to the Forced Low Latency state. The actual period between such clock synchronization (and if need be forced low-latency transactions) can be a function of the measured clock drift and changes over time from linear clock drive. Also while in this state, when traffic is flowing, TelqoLatencyClient initiates latency measurement Probe Transactions as can be needed to properly control the target transmit and target receive rates; and (5) Forced Low Latency—when in this state, a TelqoLatencyClient clamps its target transmit and target receive rate to a relatively very low value (thus inducing a lightly-loaded condition) and initiates a series of Probe transactions. Upon completion of a relatively large number of the Probe Transactions, a TelqoLatencyClient transitions back to the state it came from (Uncalibrated Drift State or Steady State).

The TelqoLatencyClient maintains a single state machine for Probe Transactions, where the Probe Transaction State, for example, takes on one of the following states:

(1) Idle—there is no Probe Transaction currently underway. A transition from Idle to Awaiting Reply occurs when a Probe Request is transmitted; and (2) AwaitingReply—a Probe Transaction was initiated and the TelqoLatencyClient is awaiting the probe reply, and if no reply is received, the timeout (ProbeTransactionTimeout) can be a large timeout (e.g., default=3000 ms).

A TelqoPeerClient maintains a single state machine for its Peer Tunnel summarizing the status of Set-Rate transactions to the respective peer, where the Set-Rate Transaction State, for example, takes on one of the following states:

(1) Idle—there is no Probe Transaction currently underway. A transition from Idle to Awaiting Reply ordinarily only occurs on when the Set-Rate Transaction State is Idle and a Set-Rate Request is transmitted to the peer;

(2) AwaitingReply—a Set-Rate Transaction was initiated and the TelqoPeerClient is awaiting the set-rate reply. Should no reply come, the timeout (SetRateTransactionTimeout) is a large timeout (default=3000 ms); and (3) Peer Unreachable—when a Set-Rate Transaction has been attempted and failed after multiple timeouts. When in this state, Set-Rate Transactions are initiated at a relatively low, background rate.

A TelqoPeerServer server maintains a state machine for its Peer Tunnel summarizing whether the respective tunnel requires a peer initiated Set-Rate Transaction, where the state machine, for example, takes on one of the following states:

(1) Not Needed—a tunnel is in this state when either the tunnel is within an Over-Engineered TelqoPeerServer server or when a Set-Rate transaction has been received since tunnel initialization or since the previous time the peer's incarnation number changed; and (2) Trans Needed—a tunnel is in this state after the tunnel has completed initialization or the peer's incarnation number has changed up until it receives its first Set-Rate Request packet. While in this state, the TelqoPeerServer server periodically sends Initiate Set-Rate Transaction Request packets.

The TelqoLatencyClient monitors the traffic being transmitted and received by its broadband connection, and maintains a Transmit Status state and a Receive Status state to summarize traffic transmission and reception status, where the transmit and receive status states, for example, each may take on one of the following states:

(1) Idle—while idle, the transmitter or receiver of a TelqoLatencyClient has not been carrying any packets recently. Only clock synchronization Probe Transactions are typically performed while idle and their transmission does not count as far as moving the transmitter (or receiver) out of the idle state;

(2) Lightly Loaded—while lightly loaded (e.g., typically less than 15% of the most recent target rate with no real-time traffic) relatively infrequent latency Probe Transactions are performed and are done as to keep the over TelqoLatencyClient overhead under 1% of overall load, for example;

(3) Actively Loaded—when actively loaded, (typically more than 15% of the most recent throughput limiter setting with no real-time traffic), relatively frequent latency Probe Transactions can be performed, on an as needed basis, to measure one-way latency and to tune the target rate;

(4) Real-Time Active—the traffic status state can be Real-Time Active whenever real-time traffic is active. TelqoLatencyClient typically backs-off the target rate to provide a margin of safety against overloading its link and can perform relatively frequent latency Probe Transactions, on an as needed basis, to measure one-way latency and to back-off the target rate relatively aggressively and expand it slowly, to relatively safely carry the real-time traffic with high quality of service; and (5) ForcedLowLatency—whenever the Clock Synchronization state is in the force low-latency state.

The TelqoLatencyClient maintains a set of state variables to monitor force-low latency activity, where, for example, one such state variable exists for each tunnel, and the state variable comprises one of the following values:

(1) Unforced—when in this state there can be relatively no effort being expended to force a low-latency condition;

(2) ForceInitiated—when the tunnel should be running in a forced low-latency state, but it is not yet known yet whether the tunnel has in-fact cut its rate. For a Split Tunnel, the Receive Traffic Shaper's rate has been cut down, but the flow of received split-tunnel traffic has yet to fall to a low enough rate. For a Peer Tunnel, the Set-Rate Transaction has been initiated but the reply has yet to be received; and (3) ForceConfirmed—when the tunnel has confirmed low-latency operation. For a Split Tunnel this is typically after a low rate of split-tunnel traffic has been achieved. For a Peer Tunnel this is typically when the low-rate Set-Rate Transaction has been relatively successfully completed or the Set-Rate transaction state has typically entered the Peer Unreachable state, for example.

The TelqoLatencyClient maintains a similar state variable for its broadband connection as a whole, where the state variable, for example, may comprise one of the following values:

(1) Unforced—when in this state there typically is no effort being expended to force a low-latency condition;

(2) ForceInitiated—when a forced low-latency state has been commanded or requested, but one or more of the tunnels remains in the ForceInitiated state; and (3) ForceConfirmed—when all or substantially all of the tunnels are in a ForceConfirmed state.

Figure 11A:
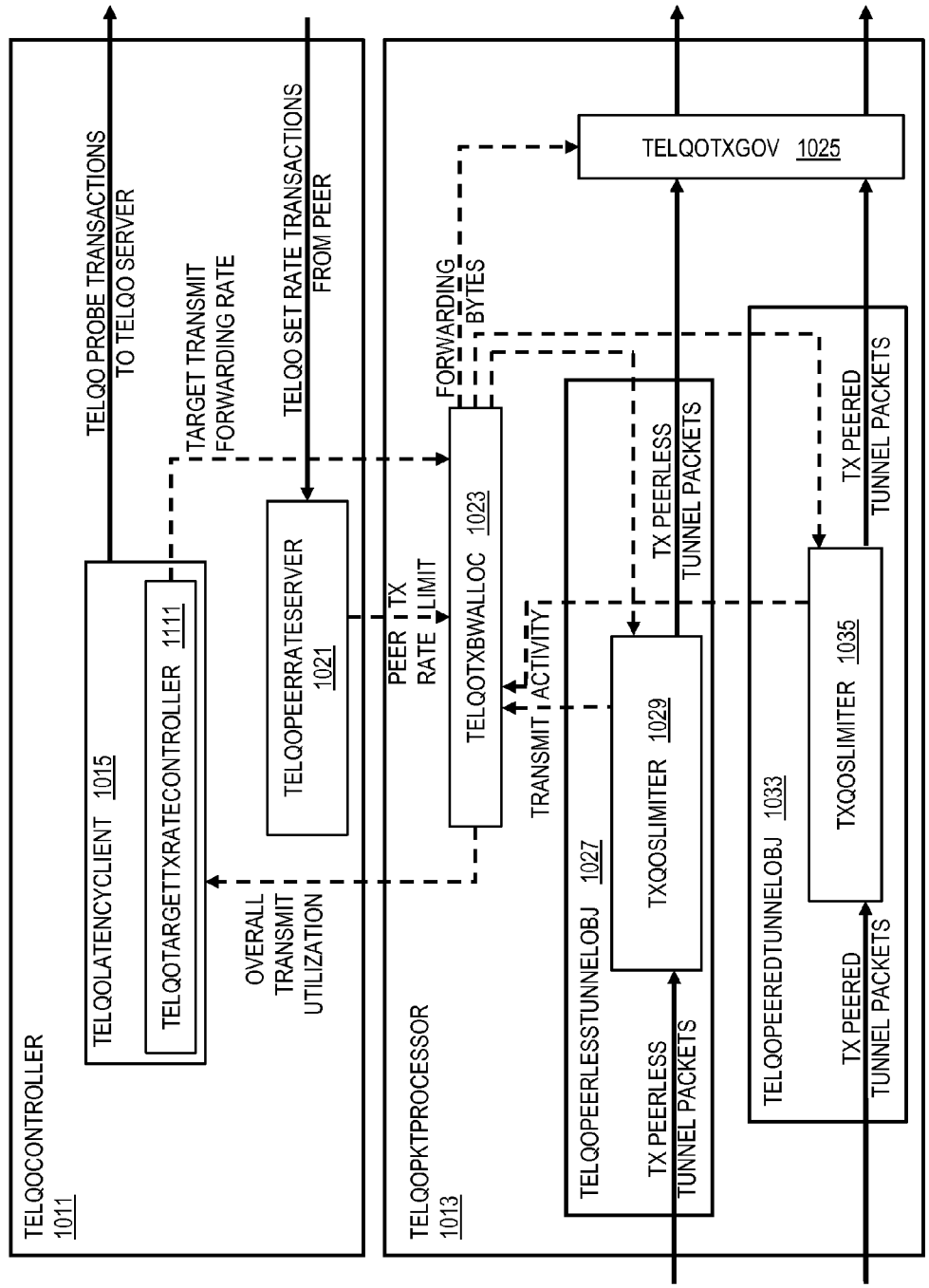
FIG. 11A illustrates a block diagram depicting a process for the generation of a target data transmit rate, based on network latency measurements, in accordance with example embodiments.
Figure 11B:
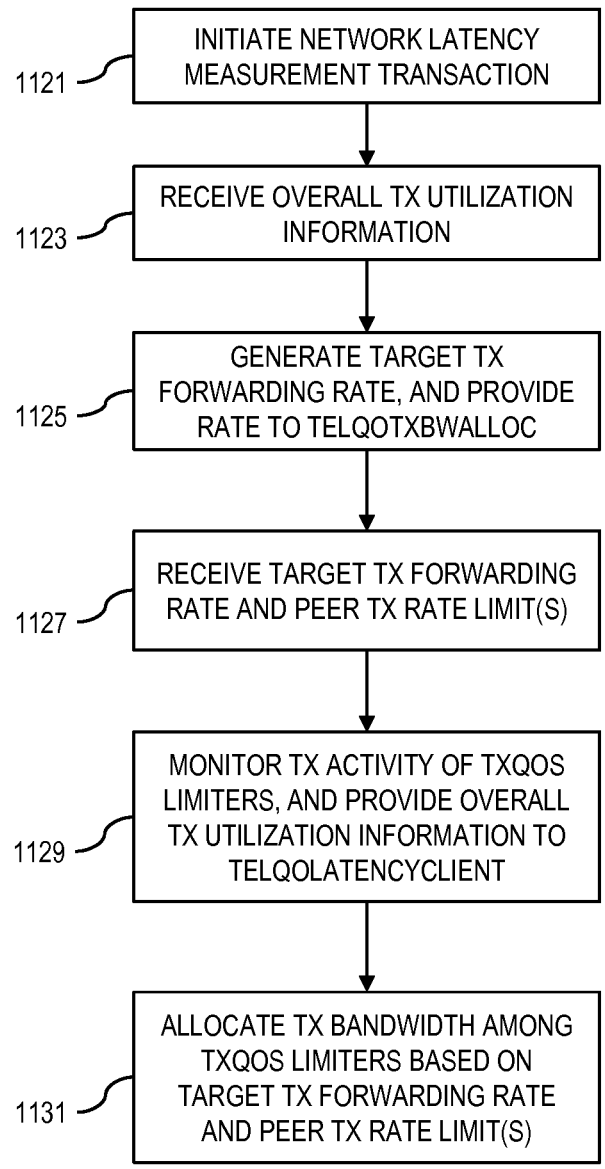
FIG. 11B illustrates a flow chart depicting a process for the generation of a target data transmit rate, based on network latency measurements, in accordance with example embodiments.
Figure 12A:
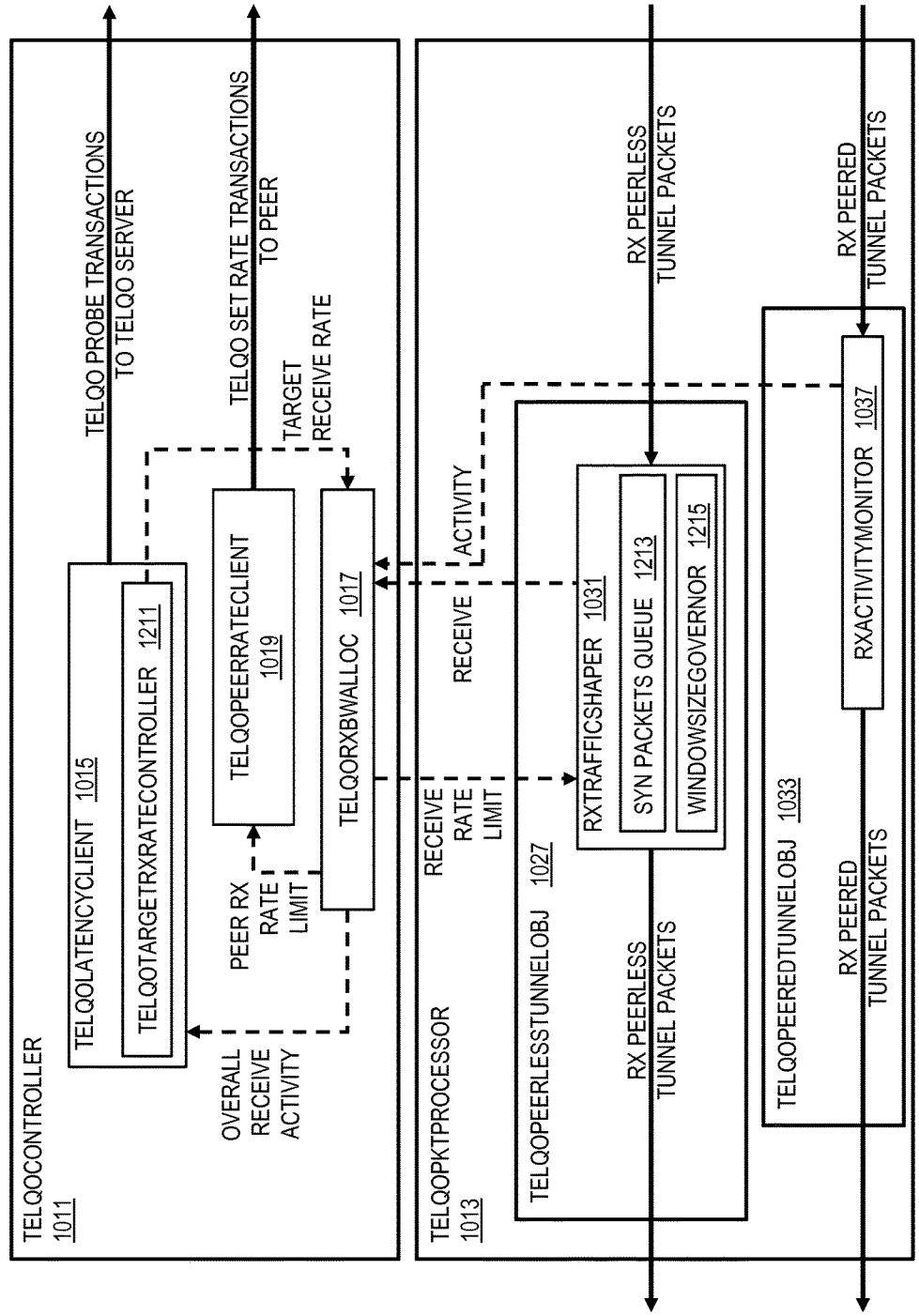
FIG. 12A illustrates a block diagram depicting a process for the generation of a target data receive rate, based on network latency measurements, in accordance with example embodiments.
Figure 12B:
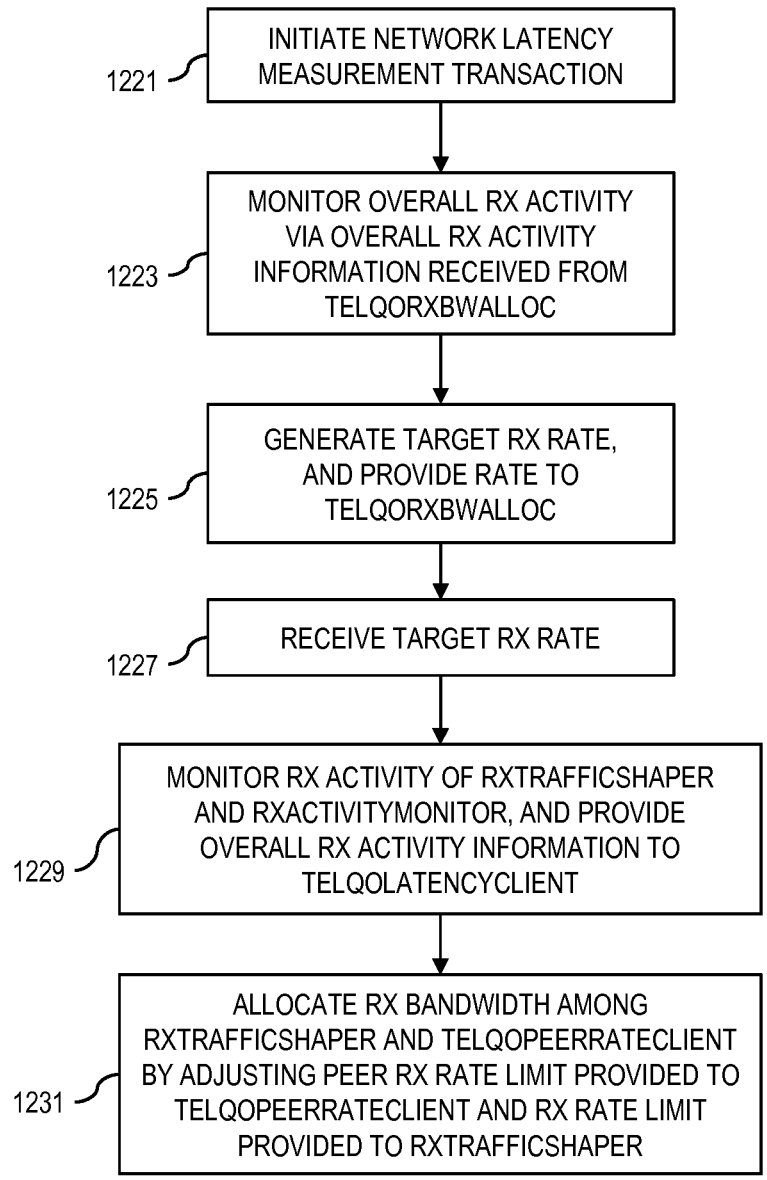
FIG. 12B illustrates a flow chart depicting a process for the generation of a target data receive rate, based on network latency measurements, in accordance with example embodiments.

FIGS. 11A and 11B illustrate a block diagram and flow chart depicting a process for the generation of a target data transmit rate, based on network latency measurements, in accordance with example embodiments. Further, FIGS. 12A and 12B illustrate a block diagram and flow chart depicting a process for the generation of a target data receive rate, based on network latency measurements, in accordance with example embodiments. As previously discussed, the TelqoLatencyClient module 1015 obtains clock synchronization with a TELQO server, obtains one-way latency measurements, monitors the overall transmit and receive activity (in conjunction with the TelqoTxBwAlloc 1023) and generates the target transmit rate (also referred to as the target transmit forwarding rate) for the TelqoTxBwAlloc, monitors the overall transmit and receive activity (in conjunction with the TelqoTxBwAlloc) and generates the target receive rate for the TelqoRxBwAlloc.

According to example embodiments, with reference to FIGS. 11A and 11B, with respect to the determination and setting of a target transmit forwarding rate, the TelqoLatencyClient module initiates a latency measurement transaction with a TELQO server or WOS (S1121), for example, to measure the transmit one-way latency and establish or maintain clock synchronization. The TelqoLatencyClient module also receives overall transmit utilization information from the TelqoTxBwAlloc 1023 (S1123). The transmit utilization information guides the TelqoLatencyClient regarding the required frequency for performing latency measurements to control transmission across the broadband connection. The information also guides the TelqoLatencyClient regarding when it is appropriate to increase the Target Forwarding Rate. Based on the latency measurement and the transmit utilization information, the TelqoLatencyClient module generates a target transmit forwarding rate and provides the target rate to the TelqoTxBwAlloc (S1125).

The TelqoTxBwAlloc 1023 receives the target transmit forwarding rate from the TelqoLatencyClient, and receives a peer transmit rate limit from each TelqoPeerRateServer module 1021 (S1127). Further, the TelqoTxBwAlloc monitors the transmit activity of each of the TxQOSLimiter modules 1029, 1035 within the TelqoPeerlessTunnelObj module 1027 and TelqoPeeredTunnelObj module 1033, respectively (S1129). Based on the monitoring, the TelqoTxBwAlloc provides the overall transmit utilization information back to the TelqoLatencyClient 1015. The TelqoTxBwAlloc then allocates transmit bandwidth among the TxQOSLimiter modules by allocating forwarding bytes, with precise timing (e.g., based on the target transmit forwarding rate received from the TelqoLatencyClient, and the peer transmit rate limits received from the TelqoPeerRateServer modules), to the TxQOSLimiter 1029 and TxQOSLimiter 1035 modules, and to the TelqoTxGov 1025 (S1131).

The resulting transmit rate aggregated from the TxQOSLimiter modules should be such that the broadband connection is not overloaded, so that the prioritization of packets by the TxQOSLimiters result in acceptable latency for real-time and interactive data traffic. For example, the resulting overall transmit rate should be such that the queue of the broadband modem for packets awaiting transmission across the broadband connection remains loaded to the extent that bulk transmission data traffic uses substantially all of the capacity of the broadband connection, while the high-priority data packets are transmitted within tolerable delay limits. Further, this overall transmit rate should accommodate for changes in available network bandwidth capacity and some level of network jitter.

The TelqoLatencyClient module 1015 includes the TelqoTargetTxRateController module 1111, via which the TelqoLatencyClient controls the target transmit rate. The TelqoTargetTxRateController module comprises has two main outputs, the target forwarding rate, and a command line back to the TelqoLatencyClient module to initiate a latency measurement probe transaction (not shown). The TelqoTargetTxRateController module controls the target rates to control throughput limits based on certain information at its disposal. The TelqoTargetTxRateController can obtain notifications of packet transmissions, and time-stamped transmitted packet and byte counts by priority level, from the TelqoTxBwAlloc object. The notification of packet transmission, for example, may be used to detect an idle/lightly loaded connection going active. The TelqoTargetTxRateController also receives the one-way latency measurement data.

The TelqoTargetTxRateController only requires explicit one-way latency measurements when the transmitter is not idle, as it receives an indication of the minimum one-way latency as a byproduct of clock synchronization probe transactions. With regard to the frequency of latency measurements, for example, the TelqoLatencyClient 1015 aggressively measures one-way latency when either real-time data traffic (e.g., VOIP data) is flowing, or when the overall data traffic being offered for transmission flows fast enough to nearly saturate the target transmit rate. According to one embodiment, the TelqoTxBwAlloc 1023 provides guidance to the TelqoLatencyClient regarding the required latency measurement frequency. For example, such guidance provided by the TelqoTxBwAlloc may reflect three potential different modes—Aggressive, where measurements are desired at a high frequency (e.g., on the order of once every 200 ms); Light, where measurements are desired at a relatively low frequency (e.g., on the order of once a second), when traffic is flowing but there is no real-time traffic and the offered load is nowhere near the throughput limit; and Idle, where no latency measurements are required beyond what is required for maintaining clock synchronization, when there is basically very little traffic.

According to example embodiments, the target extra latency is a function of the inherent jitter in the underlying network (e.g., default=30 ms), and the propagation delay of a large packet (e.g., considering a default max size of 1600 bytes). This is because, for a broadband connection operating at a relatively low rate, the propagation delay of even a single large lower-priority packet impacts the one-way latency of higher-priority (real-time) packets and the latency measurement packets. For example, the target extra latency would equal the Underlying Jitter (ms)+Large Packet Size (bytes)*8/Current Target Transmit Rate.

By way of example, considering a rate reduction, when a latency measurement indicates that the extra latency exceeds a threshold, the target transmit rate is reduced by a predetermined fixed percentage (e.g., default=10%) down to a minimum value (e.g., default=50 kbits/sec). Further, the period between reductions would be limited to a value greater than the current round-trip time so that a subsequent reduction is only invoked after the first reduction has had a chance to take effect. By way of further example, considering a rate increase, an increase in the target transmit rate is implemented when the offered data traffic exceeds the target transmit rate. The TelqoTxBwAlloc 1023 determines when this condition occurs by determining how many consecutive allocation periods have ended with packets left unsent. How aggressively the throughput limit is increased depends on whether real data time traffic is flowing, which controls the extent of the extra latency that can be tolerated. For example, when real-time data traffic is flowing, the throughput limit is increased gradually to avoid significant impact on the real-time data traffic. The TelqoTxBwAlloc 1023 object provides the real-time activity to the TelqoLatencyClient 1015 along with the other overall transmit utilization information so that the TelqoLatencyClient is aware as to when real-time data traffic is flowing.

For example, if the network throughput is 1 Mbit/sec, a transmit rate increase of 10% (resulting in a new rate of 1.1 Mbit/sec) for one second will result in an extra 10% of 1 Mbit/sec traffic (100,000 bits) buffered by the network. That 100,000 bits will take 0.1 seconds to be transmitted, indicating that the latency will increase by 100 ms. In other words, determining a percentage for increasing the target transmit rate or overdriving the network, for example, would be as follows: $E=(P/100)*D$, or $P=100*E/D$; where R=the network rate in bits/second, P=percentage overdrive of the network, D=duration of the overdriving of the network in seconds, and E=the extra latency in seconds at the end of the duration of overdriving. According to an example embodiment, therefore, where the desired result of a throughput increase is no more than 10 ms of extra latency, after persisting for one second, the target transmit rate increase would be 1%.

According to example embodiments, with reference to FIGS. 12A and 12B, with respect to the determination and setting of a target receive rate, the TelqoLatencyClient module 1015 initiates a latency measurement transaction with a TELQO server or WOS (S1221), for example, to measure the receive one-way latency and establish or maintain clock synchronization. The TelqoLatencyClient module also monitors overall receive activity information provided by the TelqoRxBwAlloc 1017 (S1223). Based on the latency measurement and the receive activity information, the TelqoLatencyClient module generates a target receive rate and provides the target rate to the TelqoRxBwAlloc (S1225). As with the target transmit rate, the TelqoLatencyClient module 1015 controls the target receive rate via a TelqoTargetRxRateController module 1211. The TelqoTargetRxRateController module functions substantially as does the TelqoTargetTxRateController module 1111 employed for generating the target transmit rate, but instead works with receive objects rather than transmit objects.

The TelqoRxBwAlloc 1017 receives the target receive rate from the TelqoLatencyClient (S1227). Further, the TelqoRxBwAlloc monitors tunnel receive activity via the RxTrafficShaper module 1031 and the RxActivityMonitor module 1037 (S1229). Based on the monitoring, the TelqoRxBwAlloc provides the overall receive activity information back to the TelqoLatencyClient 1015 (S1229). The TelqoTxBwAlloc then allocates receive bandwidth among the RxTrafficShaper module 1031 and the TelqoPeerRateClient module 1019 by adjusting the receive rate limit for each tunnel (e.g., based on the target receive rate received from the TelqoLatencyClient, and the receive activity information the received from the RxTrafficShaper and RxActivityMonitor modules) (S1231). The receive rates are controlled by the peer receive rate limit provided to the TelqoPeerRateClient module and the receive rate limit provided to the RxTrafficShaper module (S1231). For the peered tunnel, the rate of receive traffic is controlled via a set rate transaction between the TelqoPeerRateClient and the Telqo peer from which the receive traffic is received over the tunnel (e.g., initiated via a set rate request transmitted to the peer). For the peerless tunnel, the RxTrafficShaper module 1031 regulates the receive traffic, based on the receive rate limit provided by the TelqoRxBwAlloc 1017 via one or more traffic shaping mechanisms, including insertion of extra target latency amounts, adjustment of window sizing, control of new connection establishment and packet dropping (as discussed in further detail below). Further, the TelqoRxBwAlloc employs a moving average receive rate to produce the overall receive activity information used as guidance for latency measurements and target receive rate increases, and as indicating whether there is real-time data traffic activity over the broadband connection.

The resulting receive rate aggregated across the tunnels should be such that the broadband connection is not overloaded, so that low-latency data packets (e.g., real-time, light interactive and heavy interactive data) obtain low latency and low jitter across the broadband connection. For example, the resulting peer receive rate limit and receive rate limit be such that the queue of the modem (e.g., the broadband equivalent of a DSLAM) for packets awaiting transmission across the broadband connection to the broadband modem remains loaded to the extent that bulk transmission data traffic uses substantially all of the capacity of the broadband connection, while the high-priority data packets are transmitted within tolerable delay limits. Further, the receive rate limits should accommodate for changes in available network bandwidth capacity and some level of network jitter.

As previously discussed, with respect to a peerless tunnel, because there is no peer, there is no way to directly control the receive rate of broadband traffic over the peerless tunnel by means of the direct control of the transmit rate by which a peer transmits such traffic. According to example embodiments, therefore, the rate by which broadband data traffic is received over a peerless tunnel is indirectly controlled via a TELQO Receive Traffic Shaper (RTS) (e.g., the RxTrafficShaper module 1031). The TELQO RTS is configured to control receive throughput, provided that all significant low-priority traffic has a flow control mechanism, and that the flow control mechanism reduces flow in response to increased delay and/or packet loss (which is the case for almost all popularly used applications). There are, however, two cases which might be exceptions—one exception being web browsing, which utilizes multiple parallel TCP connections, and the second being UDP-based teleconferencing and video chat applications. The TELQO functionality is configured to deal with such applications (e.g., web browsing) by means of flow control measures that involve adjusting the receive window size and pacing connection establishment.

According to example embodiments, the TELQO RTS is IP flow aware (e.g., IP protocol, source/destination address and port), whereby the RTS appropriately adjusts delays and packet drops for each flow according to its priority. The RTS classifies each flow by priority, such as one of: (1) Light-No-Delay (e.g., TELQO probe packets); (2) Real-Time (e.g., VOIP); (3) Light-Interactive (e.g., DNS lookup); (4) Heavy-Interactive (e.g., web browsing); and (5) Bulk-Transfer. By way of example, Light-No-Delay and Real-Time packets are always passed thru without delay or intentional packet drop. The classifier may be configured, on a per-tunnel basis, to avoid Real-Time classification of flows on a per-subnet basis, which would typically be done for guest-WiFi subnets to keep their real-time traffic from interfering with more important flows. When there is no Real-Time traffic flowing, flow control is initially performed on the remaining traffic by priority queuing the traffic up to a maximum latency (e.g., default=2300 ms), as limited by the throughput limit. Random packet dropping can be employed on a packet removed from a priority queue as it is about to be forwarded, depending on how long it was queued. The random drop, for example, occurs with increasing intensity (e.g., linearly from 0 to 100%) as the throughput limited priority queue induced latency exceeds a predetermined baseline threshold (e.g., default=1000 ms) and moves to the maximum latency. Further, when Real-Time data traffic is actively flowing over the broadband connection, Bulk-Transfer and Heavy-Interactive traffic may be subjected to a fixed delay (e.g., default=200 ms for Bulk-Transfer, and default=50 ms for Heavy-Interactive), prior to being processed. This ensures that TCP packet loss induced shrinking of the transmit window has a dramatic effect on TCP throughput. PEP Terrestrial Backbone Protocol (TBP) traffic is delayed as needed, but is never dropped intentionally, as the flow control of the TBP protocol is latency based.

According to further example embodiments, the TELQO functionality controls receive window sizing to regulate the network throughput of broadband traffic received over a peerless tunnel. For example, the throughput of a TCP connection is generally a function of its window size and its round-trip time as follows: Throughput=WindowSize(in bits)/RoundTripTime. For example, when the window size is 50 kbytes and the round trip time is 10 ms, Throughput=50 kbytes*8 bitsperbyte/0.01 sec=40,000 kbits/sec. The TELQO functionality is further configured to regulate the network throughput of broadband traffic received over a peerless tunnel by controlling the rate for the establishment of new network connections (e.g., for parallel TCP connection intensive applications, such as web browsing). For example, accessing a web page with multiple links contained within that page would result in virtually instantly opening multiple connections for the various links. Once established, each connection could immediately dump a full window size of data (e.g., with window sizes of 64K typically not being uncommon), resulting in half a million bits, which (over a 500 kbits/sec connection), for example, would cause the round trip time to run up to a full second. Further, where there are multiple such connections, the result scales from there, accordingly.

By way of example, with respect to controlling window sizing, when operating in a latency sensitive mode (carefully controlling latency and jitter, such as for Real-Time data traffic), the TelqoRxTrafficShaper module 1031 actively adjusts the receive window size provided to hosts beyond the broadband connection (e.g., by the TxQOSLimiter module associated with the respective tunnel). The TelqoRxTrafficShaper module also carefully controls window size increases (as an increase in the window size for a TCP connection allows a spike of traffic—e.g., up to the increase in the window size). Further, in such latency sensitive modes, the TelqoRxTrafficShaper module carefully controls the establishment of new TCP connections (as a new TCP connection would also result in a spike of data traffic—e.g., up to the respective initial receive window size). By way of example, as previously described with respect to FIG. 5A, new TCP connection establishment can be controlled by means of queuing SYN packets, and releasing them in a controlled manner to regulate the rate of new connection establishment. Further, as will be appreciated, a spike in data traffic would then result in an associated spike in network latency. For example, the size of the expected latency spike when a new TCP connection is established or a window size is increased may be calculated as:

Increase=window size increase(bytes)*8/RxTrafficShaper receive rate limit(bps).

The TelqoRxTrafficShaper module 1031 accordingly maintains an initial window size for all new TCP connections (e.g., default=500 bytes), a SYN Packets Queue 1213 for the queue and release of SYN packets, and a WindowSizeGovernor module 1215 for controlling window size increases. For example, the WindowSizeGovernor module maintains window size increases at a rate (e.g., default=500 bytes) that limits latency impact to a predetermined level (e.g., default=25 ms) every second. If the receive rate limit is 1.5 Mbit/sec and the target spike is 25 ms in a second, then window size increases of 37,500 bits are permitted per second, which equates to approximately 9 increases (or new connections) per second. Further, TelqoRxTrafficShaper module also allocates window size rate increases to queued SYN packets first and to existing TCP connections second.

In accordance with example embodiments, with respect to the allocation of bandwidth where there are multiple tunnels over the broadband connection, the TELQO controller allocates bandwidth for both transmission and reception over the respective broadband connection associated with that controller. The bandwidth allocation, for example, is performed by the TelqoTxBwAlloc 1023 for transmission bandwidth, and by the TelqoRxBwAlloc 1017 for the reception bandwidth. The objectives for the bandwidth allocation policy, according to example embodiments, are as follows: (1) Real-Time and Light-Interactive Traffic are afforded relatively high QOS service (e.g., low-latency transmission), especially after the network has had a chance to adjust to the initiation of a real-time data traffic flow; and (2) when offered traffic exceeds broadband connection capacity, the capacity is either fully or nearly fully utilized, every tunnel with data traffic to send is allocated at least some bandwidth, and preferred tunnels receive a larger fraction of available bandwidth (after Real-Time and Light-Interactive traffic has been carried) than less preferred tunnels, according to per-tunnel priority and weighting parameters.

While the objectives for bandwidth allocation are identical for both transmit and receive, the example processes employed differ. For example, with respect to bandwidth allocation for transmit data traffic, the TelqoController 1011 and TelqoPktProcessor 1013 directly control the target transmit rates and the transmit packet forwarding, whereas received data traffic is either paced by TELQO peers on the far side of peered tunnels, which can only be adjusted by a transaction across the network, or received data traffic is being indirectly paced by the Receive Traffic Shaper (RxTrafficShaper 1031). By way of example, transmit bandwidth allocation operates directly on transmit rates at a very fine granularity (e.g., approximately 1 to 10 ms, allocating individual bytes for transmission), based on direct knowledge of the offered data traffic loads. On the other hand, receive bandwidth allocation operates based on relatively imprecise and delayed knowledge of the offered data traffic loads, and thus operates by adjusting rate limits and analyzing results. For peered tunnels, the peer receive rate limit is set via Set-Rate transactions performed by the TelqoPeerRateClient 1019 over the network. For peerless tunnels, the receive rate limit provided to the RxTrafficShaper module 1031 is adjusted, whereby the RxTrafficShaper performs the associated traffic shaping functions (as previously described), and then some time is required for the flow control of the individual data packet flows to take effect and reduce the aggregate receive data rate.

According to example embodiments, a tunnel may be configured based on certain parameters. By way of example, a Tunnel ID uniquely identifies a tunnel over a given broadband connection (e.g., an alphanumeric string of up to 20 characters). A Peer Sender ID (e.g., a 32-bit unsigned integer of default=0) uniquely identifies the far end peer of the tunnel, where certain values can be reserved for peerless tunnels (e.g., 0-255). The Peer Sender ID would be expected for set-rate transaction packets sent by the near-end peer, and echoed by the associated set-rate transaction reply packets returned by the far-end peer, and the Peer Sender ID should be unique as among all tunnels over a given broadband connection (e.g., the node management IP address of the far-end peer). Similarly, a My Sender ID (e.g., a 32-bit unsigned integer of default=0) uniquely identifies the near-end peer of the tunnel, where certain values can be reserved for peerless tunnels (e.g., 0-255). The My Sender ID would be expected in set-rate transaction packets sent to the near-end peer, and should be unique among all tunnels carried by the near-end peer (e.g., the management IP address of the near-end peer). Preferably, there should be a limit of one peered tunnel between a pair of TELQO-capable nodes, and both the Peer Sender ID and My Sender ID would generally be required for peered tunnels across non-over-engineered connections (e.g., where the tunnel will be initiating TELQO Set-Rate transactions). A Peer IP provides the IP address for the far-end peer of the tunnel with respect to the destination for the first packet of a set-rate transaction, where, for a peerless tunnel, the Peer IP may be set at a reserved value (e.g., 255.255.255.255, which could be the default value). The Peer IP would generally be required for all peered tunnels. A Peer Port (e.g., default=0 for a peerless tunnel) provides the destination port for a Set-Rate transaction request for the tunnel. The Peer Port would generally be required for peered tunnels over non-over-engineered connections. A Number-Users parameter provides an estimated number of users/applications with data traffic over the tunnel. The Number-Users is used to adjust the number of flows that can be supported by the classifiers of the tunnel (thereby adjusting the amount of memory consumed by the tunnel). A Tx Minimum Share parameter provides the minimum share (e.g., percentage share) of Governed bandwidth (the total available bandwidth not including bandwidth used by Ungoverned traffic) that the tunnel should receive when needed and when the broadband connection is fully utilized. A Tx Tunnel Priority (e.g., with 1 reflecting the highest priority and 10 the lowest priority) identifies a strict priority of the tunnel relative to other tunnels, with respect to access to bandwidth beyond the minimum share bandwidth. Multiple tunnels may share the same priority level. A Tx Weight (e.g., an integer between 1 and 1000), for the allocation of bandwidth beyond the Minimum Share for the group of tunnels at the same priority level, reflects the amount of bandwidth the tunnel should receive relative to other tunnels of the same priority. An Rx Minimum Share parameter provides the minimum share (e.g., percentage share) of Governed bandwidth (the total available bandwidth not including bandwidth used by Ungoverned traffic), that the tunnel should receive when needed and when the broadband connection is fully utilized. Similarly, an Rx Tunnel Priority (e.g., with 1 reflecting the highest priority and 10 the lowest priority) identifies a strict priority of a tunnel relative to other tunnels as far as access to after-minimum share bandwidth is concerned. An Rx Weight (e.g., an integer between 1 and 1000), for the allocation of bandwidth beyond the Minimum Share for the group of tunnels at the same priority level, reflects the amount of bandwidth that the tunnel should receive relative to other tunnels of the same priority. With respect to the Tx Weight and the Rx Weight, for example, given a pair of tunnels at the same priority level, with large backlogs of data traffic waiting to be transmitted, a tunnel with a weight of 200 will receive twice as much bandwidth (beyond its minimum share) as a tunnel with a weight of 100.

By way of further example, in the event that overhead calculations are handled by the TELQO functionality (as opposed to being handled prior to the introduction of the data packets into the TELQO system), the tunnel configuration can include two additional parameters. A Packet Overhead Bytes parameter (e.g., an integer between 0 and 300) provides the number of bytes of overhead (e.g., link level headers, IPSEC headers, other tunneling headers, etc.) to be included, for calculating how much capacity (in bits) the transmission or reception of a packet costs against rate limits. Further, an isatmed parameter (e.g., an integer either 0 or 1), when non-zero, signifies that a packet should be assumed to be carried by an ATM circuit. The packet size is rounded up to an ATM cell boundary (e.g., a 48-byte boundary) and a penalty of 5 bytes per cell would be charged when calculating how much capacity (in bits) the transmission or reception of a packet costs against rate limits. The default can be set to 1, whereby, in the event of the initiation of a stream of small packets, they will be charged with the worst-case overhead and thereby prevent the broadband connection from becoming congested.

The following reflects an example of the configuration for a pair of tunnels being passed as a two command lines of text: (1) Tunnel 1—tunnelid=66.82.20.28, peersenderid=1719803944, mysenderid=1719803945, peerip=66.82.20.28, peerport=20023, txminshare=5, txtunnelpriority=3, txweight=100, rxminshare=5, rxtunnelpriority=3, rxweight=100; and (2) Tunnel 2—tunneled=SplitTunnelGuestWifi, txminshare=20, txtunnelpriority=5, rxminshare=20, rxtunnelpriority=5, numusers=20. Accordingly, these command lines configure a peered tunnel to 66.82.20.28, port 20023, and a peerless tunnel (apparently for guest WiFi) which has lower priority but still gets 20% of the bandwidth when it can use it. When processing a tunnel configuration command line, the TelqoController object can ignore any command line parameters for flags that are not relevant to the tunnel configuration it does not use, which could be used to allow other parameters (e.g., a broadband connection ID, classifier parameters, etc.) to also be held in the command line.

With respect to transmit bandwidth allocation, according to example embodiments, as introduced above, the transmit bandwidth allocator (TelqoTxBwAlloc 1023) directly controls the rate of transmission, and maintains the transmit rate at or under target transmit rate (e.g., provided Ungoverned Traffic remains well under that target transmit rate). While each tunnel includes a forwarding governor that controls the transmission of Governed packets, Ungoverned packets are transmitted without delay. By way of example, the transmit bandwidth allocator periodically monitors Ungoverned packet transmissions, determines the remaining number of forwarding bytes that can be allocated, and allocates the remaining forwarding bytes to the tunnels. The forwarding governor of a tunnel (TelqoTxGov 1025) forwards the front packet from its priority queue as soon as it has accumulated enough forwarding bytes to match the size of that front packet with overhead. The transmit bandwidth allocator handles two different kinds of tunnels: (1) Tx Peered Tunnel—where transmission across such a tunnel is bound by both the target transmit rate for the broadband connection as a whole, and by the transmit peer rate limit (which exists to protect the broadband connection of the peer against overloading); and (2) Tx Peerless Tunnel—where there is no transmit peer rate limit (e.g., can be implemented as a virtually infinite peer rate limit). The activity of a tunnel impacts its bandwidth allocation in that only an active tunnel is allocated bandwidth, where an active tunnel is one with Governed packets waiting to be transmitted. The TelqoTxBwAlloc 1023 is relatively tightly coupled with the TelqoTxGov 1025 and the TxQOSLimiter modules 1029, 1035, and when they reside within the TelqoPktProcessor module 1013, the TelqoTxBwAlloc should reside within the same kernel module.

Figure 13:
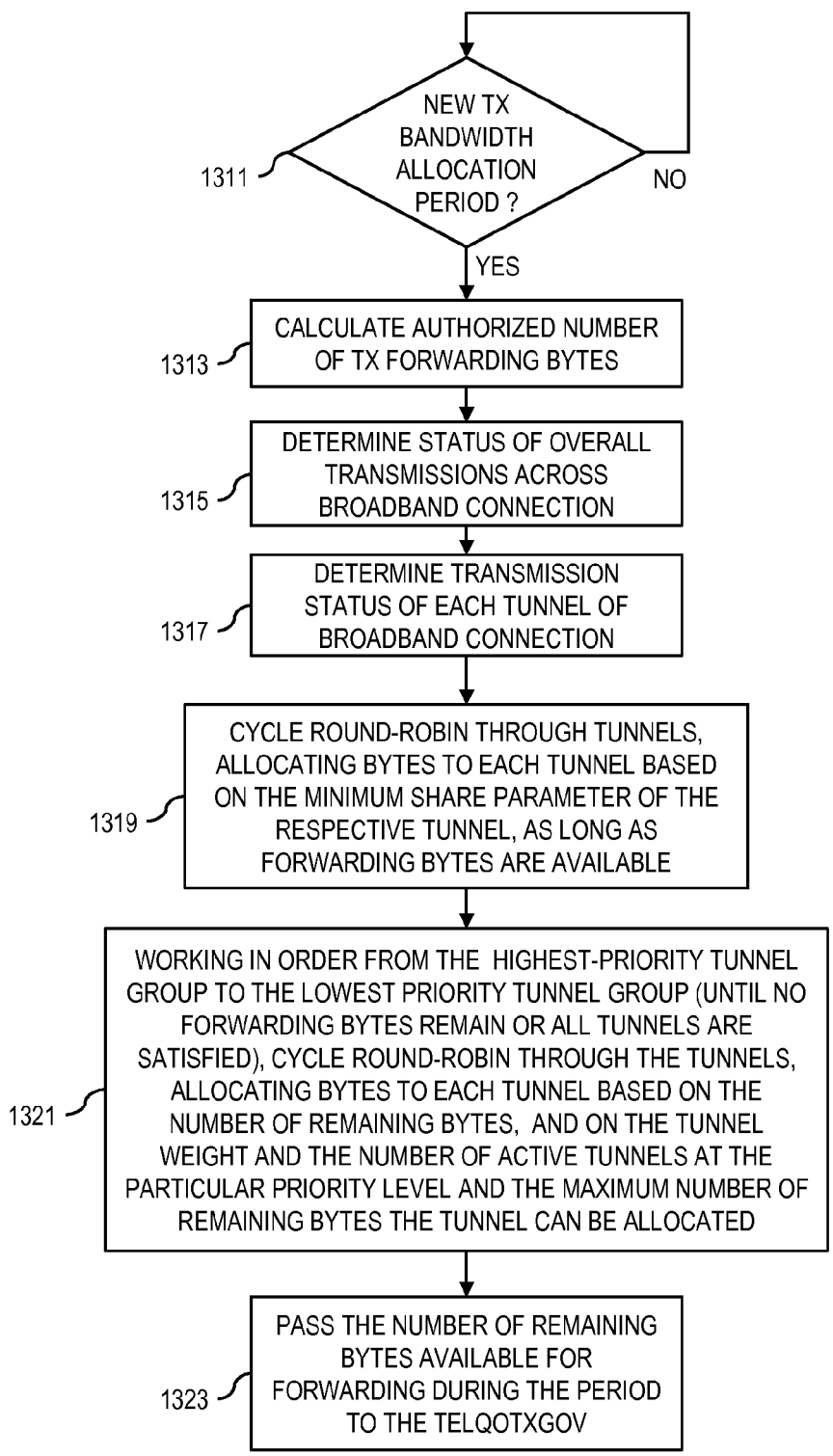
FIG. 13 illustrates a flow chart depicting a transmit bandwidth allocation process, in accordance with example embodiments.

FIG. 13 illustrates a flow chart depicting the transmit bandwidth allocation process, in accordance with example embodiments. The transmit bandwidth allocation process occurs on a periodic basis (e.g., every 10 ms) (S1311), whereby, each period, the TelqoTxBwAlloc 1023 performs the following steps:
- (1) (S1313) calculates the number of bytes it is authorized to forward (the number of forwarding bytes) based on the current target transmit forwarding rate and the period duration, where all allocations are made from this number of forwarding bytes—According to certain embodiments, unused forwarding bytes from the previous period are not carried forward;
- (2) (S1315) updates its knowledge of the overall status of transmissions across its broadband connection, including (a) the number of ungoverned bytes overall that were already transmitted during the period, and (b) the number of remaining bytes available for forwarding this period;
- (3) (S1317) updates its knowledge of the status of each tunnel, including (a) the number of ungoverned bytes forwarded during the period, (b) the number of bytes the tunnel is permitted to forward during the period (e.g., based on its transmit peer rate limit, where, according to certain embodiments, an unlimited number of bytes are permitted when no Peer Rate Limit has been set), (c) the number of Governed bytes that the tunnel is permitted to forward during the period (e.g., based on its minimum share parameter), (d) the number of bytes that remain queued, waiting to be forwarded, and (e) the maximum number of bytes the tunnel can be allocated this period (e.g., based on items 3a, 3b and 3d), where, for example, the tunnel should not be able to forward more bytes than 3d, or more bytes than 3b–3a;
- (4) (S1319) cycles round-robin through the tunnels (starting where it left off the previous period), allocating bytes to each tunnel based on the minimum share parameter of the respective tunnel, as long as forwarding bytes are available;
- (5) (S1321) starting with the highest-priority group of tunnels and proceeding thru lower priority groups of tunnels until all of the forwarding bytes are used up or all of the tunnels are satisfied, cycles round-robin through the tunnels (starting with the previous tunnel that was not fully satisfied during the previous period, or, if all tunnels were satisfied, starting with the tunnel after the previously satisfied tunnel), allocating bytes to each tunnel based on the number of remaining bytes, and on the tunnel weight and the number of active tunnels at the particular priority level and the maximum number of remaining bytes the tunnel can be allocated (per step 3e above), and then moves onto the next priority level if there is one and there remain bytes to be allocated;
- (6) (S1323) passes the saved remaining bytes value (per step 2b) to the TelqoTxGov, permitting the governor to forward as many packets as authorized by that number of bytes; and
- (7) if there are no unallocated forwarding bytes left at the end of step 5, or if the TelqoTxGov is non-empty at the end of step 6, with respect to the TelqoTargetTxRateController 1111, the target transmit forwarding rate is considered as being saturated during the period.

According to example embodiments, the TelqoTxGov 1025 comprises a first-in-first-out (FIFO) queue of Governed packets provided by the TxQOSLimiter modules 1029, 1035. Ungoverned packets bypass the TelqoTxGov. As will be appreciated, based on the foregoing transmit bandwidth allocation process, multiple tunnels are capable of transmitting or forwarding large packets in a manner whereby, while a spike in the instantaneous transmit rate occurs, the longer term transmission rate remains or under the target transmit forwarding rate. The TelqoTxGov 1025, however, operates as a pacing queue, and thereby protects against such instantaneous transmit rate spikes. Once a period, once the TelqoTxBwAlloc has completed its bandwidth allocations for the period, the TelqoTxBwAlloc provides to the TelqoTxGov the number of bytes it may transmit (e.g., the number of forwarding bytes for the period minus the number of Ungoverned bytes already forwarded during the period). Further, the TelqoTxGov maintains a counter (an available bytes counter) reflecting the remaining number of bytes it may forward left over from the previous period (e.g., generally this will be between zero and the size of the first packet, but it may be negative if there recently has been a spike of Ungoverned transmissions). The TelqoTxGov adds the number of forwarding bytes for the period received from the TelqoTxBwAlloc to the available bytes counter, and begins forwarding frames. Each time the TelqoTxGov forwards a frame it reduces its available bytes counter by the size of that frame. The TelqoTxGov continues forwarding frames until either no frames remain (when this occurs it zeroes its available bytes counter), or the available bytes counter is less than the size (including overhead) of the front frame.

The following examples provide general overviews of the transmit bandwidth allocations for certain example tunnel scenarios: (1) single tunnel—the tunnel will be allocated the full target transmit rate whenever the offered data traffic for the tunnel meets or exceeds the rate; (2) multiple tunnels (where the cumulative offered load does not exceed the target transmit rate)—each tunnel will be allocated as much bandwidth as it can use; (3) multiple tunnels (where the cumulative offered load exceeds the target transmit rate)—each active tunnel with a large backlog of data traffic will receive at least its minimum share of the overall capacity left (not including what was already used up by Ungoverned traffic); (4) multiple tunnels (where the cumulative offered load exceeds the target transmit rate, and every active tunnel can use as much bandwidth as it might be allocated)—the bandwidth allocated to each active tunnel (beyond its minimum share) will substantially meet the appropriate allocation, based on the priority and weight parameters for the tunnel.

According to example embodiments, as introduced above, the receive bandwidth allocator (TelqoRxBwAlloc 1017) indirectly controls/shapes the rate of data traffic reception to match the target receive rate. With an Rx peered tunnel, the TelqoRxBwAlloc sets the maximum rate at which the far-end peer transmits via the peer Rx rate limit provided to the TelqoPeerRateClient 1019 and forwarded to the far-end peer. Whether the data traffic is actually offered for transmission over the broadband connection by the far-end peer at the provided peer Rx rate limit, depends on limitations with respect to the broadband connection of the far-end peer (if it is not over-engineered), and whether the offered data traffic exceeds the limit. Additionally, based on the indirect control, at least one round-trip delay is required to perform a Set-Rate transaction and have it take effect. With an Rx peerless tunnel, while the TelqoRxBwAlloc may precisely control the forwarding of data traffic out of the RxTrafficShaper 1031, this only indirectly affects the rate at which traffic is received across the broadband connection and enters the RxTrafficShaper (e.g., based on window sizing, control of new connections establishment, packet dropping and injection of intentional delay, as discussed above). Again, based on the indirect control, at least one minimum round-trip delay is required for an adjustment to the RxTrafficShaper to take effect. Further, the status of a tunnel directly impacts bandwidth allocation (e.g., the status of a tunnel as "Governed Active" or "Long Term Active"). For example, a tunnel is deemed Governed Active where it has passed any Heavy-Interactive or Bulk-Transfer data traffic within the last predetermined number of N periods (e.g., N=3), and is deemed Long Term Active where it has passed any traffic in the last N seconds (e.g., N=120 seconds). With respect to expected bandwidth consumption, a Long Term Inactive tunnel may be treated as a zero expected consumption, where it is allocated its minimum share of bandwidth, but that bandwidth is not taken from other tunnels.

FIGS. 14A and 14B illustrate a flow chart depicting a receive bandwidth allocation process, in accordance with example embodiments. By way of example, receive bandwidth allocation takes place on a periodic basis (S1411), such as every N recent round trip times (e.g., N=3), as measured by probe transactions rounded up to a predetermined boundary (e.g., 100 ms), with the period always being at least M milliseconds (e.g., 100 milliseconds). Each period, the TelqoRxBwAlloc 1017 recalculates the receive rate limit for each tunnel (e.g., in bits per second), based on the target receive rate and the respective receive activity of the tunnel. By way of further example, the receive rate limit for a tunnel is comprised of the sum of the following components (each also specified in bits per second) (S1413):
 (1) Ungoverned Rate, which comprises the maximum of the Ungoverned Rate from the tunnel over the previous N periods;
 [The Total Governed Target Rate (for step 2) comprises the target receive rate (the total of the Ungoverned Rate of each tunnels.]
 (2) Minimum Share Increment, which comprises: (a) the minimum share of the Total Governed Target Rate for a Long Term Inactive tunnel (but this allocation is not included in the Total Weighted target rate calculation); (b) the minimum share of the Total Governed Target Rate for Governed Inactive tunnels (but this allocation is only included in the Total Weighted Target Rate calculation (below) when the broadband connection as a whole is real-time active, and the broadband connection as a whole is real-time active when any of its tunnels are real-time active); (c) the minimum share of the Total Governed Target Rate when the tunnel is Governed Active (this allocation is included in the Total Weighted Target Rate calculation (below);
 [The Total Weighted Target Rate (for step 3) comprises the difference between the Governed Target Rate and the sum of the Minimum Share Increment values from Governed Active or real-time active tunnels plus the Minimum Share Increment value from the Governed Inactive (but Long Term Active) tunnels, when the broadband connection as a whole is real-time active.]
 (3) Weighted Share Increment, which comprises a calculated value that is based on the priority and weight parameters of the tunnel, the Target Weighted Share of the tunnel, and the Total Weighted Target Rate, where the Target Weighted Share of a tunnel comprises the difference between a percentage of the Governed Traffic Rate for the tunnel (the number of Governed Bits forwarded during the period divided by the period duration) and its minimum share (calculated per step 2). The Target Weighted Share should be clamped and not less than zero. The tunnel Weighted Share Increment values are calculated by performing the following on each priority group of tunnels (starting with the highest priority): (a) determine the set of tunnels at the particular priority level that have not yet been allocated their Target Weighted Share, where, when there are no such tunnels, there remains bandwidth to be allocated and there remains a lower priority group of tunnels, move on to the next lower priority group of tunnels, and when there remains no bandwidth to be allocated move on to step 4; (b) determine the Weighted Share of the remaining unallocated part of the Total Weighted Target Rate bandwidth for each such tunnel; (c) increase the Weighted Share Increment value with its Weighted Share value from 3b, but increased only up to its Target Weighted Share, for each such tunnel; and (d) go back to step 3a;
 (4) Unused Share, which, when step 3 has completed and there remains unused bandwidth, the bandwidth allocator allocates that bandwidth equally to all active tunnels, and, when there are no active tunnels, the bandwidth is allocated equally to all tunnels, where, with respect to the TelqoTargetRxRateController 1211, the Target Receive Rate is considered to be saturated during this period when there is no unused bandwidth to be allocated by step 4; and (5) Inactive Share, which, when a tunnel is either inactive or Long Term Inactive and has been allocated no bandwidth, should be the Minimum Share of the Total Governed Target Rate for the tunnel, where the Inactive Share is non-zero only when the receive channel is real-time inactive, and having a non-zero Inactive Share leaves the receive channel susceptible to a momentary latency spike should an inactive or Long-Term Inactive tunnel suddenly go active with a burst of traffic.

Each period, (for each peerless tunnel) the TelqoRxB-WAlloc provides an updated receive rate limit to the respective RxTrafficShaper when the receive rate limit for that traffic shaper has changed from a prior period (S1415). Further, each period, (for each peered tunnel) the TelqoRx-BwAlloc determines whether to initiate a Set-Rate transaction (S1417), where a transaction is initiated if (S1429): (1) the calculated receive rate limit for the tunnel is less than the previous acknowledged Set-Rate transaction receive rate limit (which clamps rates down as soon as possible) (S1419); or (2) the calculated receive rate limit for the tunnel is at least a predetermined threshold percentage (e.g., 5%) higher than the previous acknowledged Set-Rate transaction receive rate limit (where the use of a threshold percentage should filter out excessive transactions caused by a calculated dithering value) (S1421); or (3) the lowest Ungoverned classification for a tunnel has changed since the previous acknowledged Set-Rate transaction (which typically occurs when real-time traffic activity changes) (S1423); or (4) a timeout (e.g., 3000 ms) has occurred waiting for a reply to the previous Set-Rate transaction (S1425), in which case a retry transaction should be attempted (S1427).

The following examples provide general overviews of the receive bandwidth allocations for certain example tunnel scenarios: (1) single peerless tunnel—the RxTrafficShaper for that tunnel will be set to run at the target receive rate; (2) single peered tunnel—the peer for the tunnel will have its rate set to the target receive rate; (3) multiple tunnels (where all but one are completely idle and with or without real-time activity)—the receive rate limit for the one active tunnel will have its receive rate limit set to the target receive rate, and the receive rate limit for each of the idle tunnels will be set to its minimum share of the Governed available bandwidth; (4) multiple tunnels (where only one is active with some real-time activity)—each of the inactive tunnels will have its receive rate limit set to its minimum share of the Governed available bandwidth, and the one active tunnel will have its receive rate limit set to the target receive rate minus the sum of the minimum share allocations of the idle tunnels; (5) multiple active tunnels (where each has an offered load that exceeds what it is being allocated and there is no real-time traffic)—bandwidth will be allocated among those tunnels such that each will receive a bandwidth allocation to accommodate its Ungoverned traffic or its minimum share of the Governed traffic bandwidth (whichever is larger), plus its prioritized weighted share of the remaining bandwidth; (6) multiple active tunnels (where the offered traffic exceeds the target receive rate and the offered load of an active tunnel comprises a fraction of what it could receive based on its minimum share, and priority and weight parameters)—the tunnel will be allocated an amount over its minimum share to the extent that there is a reasonable expectation that the bandwidth will be utilized.

According to further example embodiments, the performance of a network employing TELQO functionality, such as system 100 (FIG. 1) and networks 500-900 (FIGS. 5-9), can be further enhanced and improved by incorporating a TCP Performance Enhancing Proxy (PEP), optimized with an enhanced terrestrial backbone protocol (e.g., as compared to a network employing a standard TCP protocol). The details of such a TCP PEP are summarized below, such as in relation to example embodiments, and are more fully described in the '323 application. The enhancements include the use of an enhanced backbone protocol, referred to as the Terrestrial-Broadband Backbone Protocol (TBP) used by a TCP PEP mechanism to carry TCP traffic across a terrestrial broadband network in an optimized fashion.

The TBP automatically measures and adjusts to varying network capacity, latency and jitter, providing for significant performance gains. No parameter tuning is required to achieve TBP performance improvements specific to the network in question. The enhanced TCP PEP also provides for the spoofing of MSS negotiation thereby allowing the maximum sized TCP packet to be appropriately sized to allow efficient transport by the underlying network. The TBP can typically be performed by VPN router 200 and VPN gateway 300, or by the various TELQO modules or components (e.g., as described and illustrated in networks 500-900 of FIGS. 5-9). However, it will be appreciated that TBP could alternatively be constructed as hardware components or a combination of hardware and software components.

The TBP monitors transmit bulk transfer throughput of a connection as a way of monitoring general network performance. The bulk transfer throughput measurement produces a valuable metric of network performance. The basic idea is to measure the throughput when one has found a 10 second interval where TerrB has been consistently sending packets while a backlog of packets waiting to be sent exist. This is an indication that a bulk transfer has been occurring during that interval and that the backbone connection has been going as fast as it can. The conditions for an accurate measurement are further qualified by having an average packet size that is greater than THRUMEASUREMENT-MINPKTSIZEINBYTES (compile time constant, 800 bytes) and by having the neighbor TBP connections idle throughout the interval. A neighbor connection is a connection that shares the same end-points. The most recent measurement and the 8 period exponential moving average of past measurements is exported as a performance statistic.

As to TBP Latency-Based Flow Control, the TBP measures network conditions, and adjusts its transmissions based on such measured conditions. TBP provides higher-performance than other transport protocols (including TCP) (e.g., in the presence of significant packet loss). The TBP Flow-Control Mechanism operates on a per-backbone connection basis. The mechanism is based on creating an estimate of network capacity based on pair of round-trip time measurements, referred to as the lightly-loaded round-trip time (LLRTT) and the last-packet round-trip time (LPRTT). These two measurements are taken as frequently as conditions allow. For example, no measurements can be taken when the connection is idle. When an LPRTT measurement is made, the resulting estimate is used to control transmissions by establishing a peak transmission rate, which limits the rate (in bits/sec) that a connection can transmit, and a transmit window, which limits, in bytes, number of unacknowledged bytes the connection can have outstanding at any given time.

As to Last-Packet Round-Trip Time Measurements, a last-packet is a packet which fills the transmit window. After this packet is transmitted, no further full-sized packets can be transmitted until at least one is acknowledged. As such, a last-packet round-trip time is able to measure the round-trip time when the link is fully loaded. No further data will be buffered in the network causing greater buffer delays. When a packet is permitted to be transmitted by the transmit window (but perhaps not by the transmit rate limiter), it is checked to see if it fills the transmit window. When that is case it is flagged as a last packet and the ACK_FLAG flags bit of the packet header is set to trigger an immediate acknowledgement of the packet thus facilitating an accurate round-trip time measurement. Further, an ordinary transmit window update occurs only when there have been no TBP poll requests sent or poll responses received as the acknowledgement of the LPRTT candidate can be due to an TBP poll transaction (triggered by loss of Ack-bearing packets from the peer) which gives an incorrectly large round-trip time measurement. An ordinary transmit window update also does not occur while Forced LLRTT measurements are underway as these LPRTT measurements do not measure a truly heavily loaded network.

The basic idea of the TBP flow control mechanism is to control transmission so that enough data is buffered up in the network to ensure that the network's capacity is saturated, but not so much data that it either overflows network buffers or causes undue latency increases. Network buffer overflows are more likely (and the limiting factor) at when the network is operating at high-bit-rates while latency increases are more likely (and the limiting factor) at low rates. Therefore, in various embodiments, the optimized TCP PEP can use round trip delay, instead of packet loss, to perform TCP flow control. If a pause occurs in the transmission of a large burst, the initial burst of traffic upon re-transmission of the large burst ruins the latency in the network, and if extreme, can cause packet loss. The optimized TCP PEP solves this problem by using a flow control mechanism that measures round-trip packet delay and determines an optimal TCP window size and pacing rate (e.g., transmission rate).

The present invention, according to certain example embodiments, provides an efficient system for data traffic transmissions across networks, and, while certain example embodiments may be applied to certain network systems (e.g., VPN networks), applications of embodiments of the present invention are not limited to such networks. Accordingly, the present invention, according to example embodiments, can be applied to other types of networks or communications systems, which can benefit therefrom. While example embodiments of the present invention may provide for various implementations (e.g., including hardware, firmware and/or software components), the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

performing, by a first network device at a first node of a broadband network, a probe transaction over a tunnel within the broadband network, wherein the probe transaction comprises one or more of transmission and reception of a probe packet over the tunnel;

measuring, based on the probe transaction, one or more parameters reflecting performance of the probe transaction over the tunnel;

determining, based on one or more of the determined parameters, a target transmit rate and a target receive rate for the data communications over the tunnel;

regulating, based on the target transmit rate, the rate of data communications transmitted over the tunnel from the first node; and regulating, based on the target receive rate, the rate of data communications received over the tunnel by the first node;

wherein the tunnel comprises one of a peered tunnel and a peerless tunnel, wherein (1) in the case of a peered tunnel, the peered tunnel is configured for data communications between the first node and a peer second node of the broadband network, and (2) in the case of a peerless tunnel, the peerless tunnel is configured for data communications between the first node and a non-peer second node;

wherein, when the tunnel comprises the peered tunnel, the regulation of the rate of data communications received over the tunnel by the first node comprises performing a set rate transaction with the peer second node, wherein the set rate transaction establishes a rate for data communications transmitted over the tunnel by the peer second node to the first node;

wherein, when the tunnel comprises the peerless tunnel, the regulation of the rate of data communications received over the tunnel by the first node comprises shaping data communications traffic received over the tunnel, wherein the shaping of the data communications traffic received over the tunnel is accomplished by one or more of increasing latency for data traffic received over the tunnel, adjustment of window sizing, control of new connection establishment, and packet dropping;

wherein the adjustment of the window sizing comprises actively controlling receive window sizes for transmission of data by remote hosts over the peerless tunnel to regulate throughput for the data communications received over the peerless tunnel;

wherein the control of new connection establishment comprises actively controlling the establishment of parallel connections via which remote hosts transmit data over the peerless tunnel to regulate throughput for the data communications received over the peerless tunnel; and wherein the packet dropping comprises a systematic dropping of packets received from a respective host to signal the host to adjust its associated transmit rate.

2. A method according to claim 1, wherein the probe transaction and set rate transaction are performed as part of an active quality of service (AQoS) function implemented by the first network device, and wherein the peer second node is configured to operate in accordance with the AQoS function.

3. A method according to claim 2, wherein the set rate transaction is performed between the first network device and a peer second network device deployed at the peer second node, and the peer second network device is configured to implement the AQoS function at the peer second node.

4. A method according to claim 1, wherein the non-peer second node is not configured to operate in accordance with the AQoS function.

5. A method according to claim 1, wherein the parameters determined based on the probe transaction comprise a measured one-way network latency in one or both directions over the tunnel.

6. A method according to claim 5, wherein the measured one-way network latency is determined based on a timestamp field included in a probe transaction packet indicating a time at which the packet was transmitted.

7. A method according to claim 1, wherein the probe transaction is performed on a periodic basis for continued monitoring of data communications performance over the tunnel, and the parameters determined based on the probe transaction comprise a measured one-way network latency in a transmit direction over the tunnel, and wherein the method further comprises:
when the measured one-way transmit latency parameter indicates that the latency exceeds a predetermined threshold, decreasing the target transmit rate; and
when offered data traffic exceeds the current target transmit rate, increasing the target transmit rate.

8. A method according to claim 1, wherein the probe transaction is performed on a periodic basis for continued monitoring of data communications performance over the tunnel, and the parameters determined based on the probe transaction comprise a measured one-way network latency in a receive direction over the tunnel, and wherein the method further comprises:
when the measured one-way receive latency parameter indicates that the latency exceeds a predetermined threshold, decreasing the target receive rate; and
when offered data traffic exceeds the current target receive rate, increasing the target receive rate.

9. A method according to claim 1, wherein the tunnel comprises the peerless tunnel, the probe transaction is performed on a periodic basis for continued monitoring of data communications performance over the peerless tunnel, and the parameters determined based on the probe transaction comprise a measured one-way network latency in a receive direction over the peerless tunnel, and wherein the method further comprises:
determining, based on the measured one-way network latency in the receive direction, the target receive rate for data communications over the peerless tunnel;
controlling new connection establishment, and determining and setting receive window sizing, for data communications traffic being transmitted by one or more remote hosts over the peerless tunnel, based on the determined target receive rate for data communications over the peerless tunnel;
determining whether an offered traffic load for transmission over the peerless tunnel by the one or more remote hosts exceeds the determined target receive rate for data communications over the peerless tunnel; and
when the offered traffic load exceeds the determined target receive rate, increasing the target receive rate for data communications over the peerless tunnel, and adjusting the control of new connection establishment and the receive window sizing, for the data communications traffic being transmitted by the one or more remote hosts over the peerless tunnel, based on the increased target receive rate for data communications over the peerless tunnel.

10. An apparatus, comprising:
at least one processor; and
at least one memory including computer program code for one or more programs, the at least one memory and the computer program code configured to, with the at least one processor, cause the apparatus to perform at least the following:
performing a probe transaction over a tunnel within a broadband network, wherein the probe transaction comprises one or more of transmission and reception of a probe packet over the tunnel;
measuring, based on the probe transaction, one or more parameters reflecting performance of the probe transaction over the tunnel;
determining, based on one or more of the determined parameters, a target transmit rate and a target receive rate for the data communications over the tunnel;
regulating, based on the target transmit rate, the rate of data communications transmitted over the tunnel from a first node of the broadband network; and
regulating, based on the target receive rate, the rate of data communications received over the tunnel by the first node;
wherein the tunnel comprises one of a peered tunnel and a peerless tunnel, wherein (1) in the case of a peered tunnel, the peered tunnel is configured for data communications between the first node and a peer second node, and (2) in the case of a peerless tunnel, the peerless tunnel is configured for data communications between the first node and a non-peer second node;
wherein, when the tunnel comprises the peered tunnel, the regulation of the rate of data communications received over the tunnel by the first node comprises performing a set rate transaction with the peer second node, wherein the set rate transaction establishes a rate for data communications transmitted over the tunnel by the peer second node to the first node; and
wherein, when the tunnel comprises the peerless tunnel, the regulation of the rate of data communications received over the tunnel by the first node comprises shaping data communications traffic received over the tunnel, wherein the shaping of the data communications traffic received over the tunnel is accomplished by one or more of increasing latency for data traffic received over the tunnel, adjustment of window sizing, control of new connection establishment, and packet dropping;
wherein the adjustment of the window sizing comprises actively controlling receive window sizes for transmission of data by remote hosts over the peerless tunnel to regulate throughput for the data communications received over the peerless tunnel;

wherein the control of new connection establishment comprises actively controlling the establishment of parallel connections via which remote hosts transmit data over the peerless tunnel to regulate throughput for the data communications received over the peerless tunnel; and wherein the packet dropping comprises a systematic dropping of packets received from a respective host to signal the host to adjust its associated transmit rate.

11. An apparatus according to claim 10, wherein the probe transaction and set rate transaction are performed as part of an active quality of service (AQoS) function implemented by the first apparatus, and wherein the peer second node is configured to operate in accordance with the AQoS function.

12. An apparatus according to claim 11, wherein the set rate transaction is performed between the apparatus and a peer network device deployed at the peer second node, and the peer second network device is configured to implement the AQoS function at the peer second node.

13. An apparatus according to claim 10, wherein the non-peer second node is not configured to operate in accordance with the AQoS function.

14. An apparatus according to claim 10, wherein the parameters determined based on the probe transaction comprise a measured one-way network latency in one or both directions over the tunnel.

15. An apparatus according to claim 14, wherein the measured one-way network latency is determined based on a timestamp field included in a probe transaction packet indicating a time at which the packet was transmitted.

16. An apparatus according to claim 10, wherein the probe transaction is performed on a periodic basis for continued monitoring of data communications performance over the tunnel, and the parameters determined based on the probe transaction comprise a measured one-way network latency in a transmit direction over the tunnel, and wherein the apparatus is caused to further perform the following:
when the measured one-way transmit latency parameter indicates that the latency exceeds a predetermined threshold, decreasing the target transmit rate; and
when offered data traffic exceeds the current target transmit rate, increasing the target transmit rate.

17. An apparatus according to claim 10, wherein the probe transaction is performed on a periodic basis for continued monitoring of data communications performance over the tunnel, and the parameters determined based on the probe transaction comprise a measured one-way network latency in a receive direction over the tunnel, and wherein the apparatus is caused to further perform the following:
when the measured one-way receive latency parameter indicates that the latency exceeds a predetermined threshold, decreasing the target receive rate; and
when offered data traffic exceeds the current target receive rate, increasing the target receive rate.

18. An apparatus according to claim 10, wherein the tunnel comprises the peerless tunnel, the probe transaction is performed on a periodic basis for continued monitoring of data communications performance over the peerless tunnel, and the parameters determined based on the probe transaction comprise a measured one-way network latency in a receive direction over the peerless tunnel, and wherein the apparatus is caused to further perform the following:
determining, based on the measured one-way network latency in the receive direction, the target receive rate for data communications over the peerless tunnel;
controlling new connection establishment, and determining and setting receive window sizing, for data communications traffic being transmitted by one or more remote hosts over the peerless tunnel, based on the determined target receive rate for data communications over the peerless tunnel;
determining whether an offered traffic load for transmission over the peerless tunnel by the one or more remote hosts exceeds the determined target receive rate for data communications over the peerless tunnel; and
when the offered traffic load exceeds the determined target receive rate, increasing the target receive rate for data communications over the peerless tunnel, and adjusting the control of new connection establishment and the receive window sizing, for the data communications traffic being transmitted by the one or more remote hosts over the peerless tunnel, based on the increased target receive rate for data communications over the peerless tunnel.

* * * * *